(12) United States Patent
Chang et al.

(10) Patent No.: US 12,506,262 B2
(45) Date of Patent: Dec. 23, 2025

(54) PROXIMITY SENSING USING AN ANTENNA FRONT END MODULE

(71) Applicant: DELL PRODUCTS L.P., Round Rock, TX (US)

(72) Inventors: Ching Wei Chang, Cedar Park, TX (US); Suresh Ramasamy, Cedar Park, TX (US); Changsoo Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 18/203,460

(22) Filed: May 30, 2023

(65) Prior Publication Data
US 2023/0299484 A1  Sep. 21, 2023

Related U.S. Application Data

(60) Division of application No. 16/915,071, filed on Jun. 29, 2020, now Pat. No. 11,710,899, which is a continuation-in-part of application No. 16/734,276, filed on Jan. 3, 2020, now Pat. No. 11,469,799.

(51) Int. Cl.
*H01Q 5/335* (2015.01)
*G01S 13/04* (2006.01)
*H01Q 1/22* (2006.01)

(52) U.S. Cl.
CPC ............. *H01Q 5/335* (2015.01); *G01S 13/04* (2013.01); *H01Q 1/22* (2013.01)

(58) Field of Classification Search
CPC ........ H01Q 5/335; H01Q 1/22; H01Q 1/2266; G01S 13/04; H04B 1/3838
See application file for complete search history.

(56) References Cited

U.S. PATENT DOCUMENTS

| | | | |
|---|---|---|---|
| 8,515,496 B2 * | 8/2013 | Cheng | H01Q 1/243 343/702 |
| 10,128,924 B2 | 11/2018 | Chang et al. | |
| 2011/0250928 A1 | 10/2011 | Schlub et al. | |
| 2013/0315076 A1* | 11/2013 | Zhao | H04B 7/082 370/252 |

(Continued)

FOREIGN PATENT DOCUMENTS

WO  WO-2006014795 A1 *  2/2006  ............. H01Q 21/30

*Primary Examiner* — William Kelleher
*Assistant Examiner* — Kenneth W Good
(74) *Attorney, Agent, or Firm* — Larson Newman, LLP

(57) ABSTRACT

An antenna front-end module, a method, and an information handling system are provided. An antenna front-end module comprises a circuit board. The circuit board comprises an antenna tuning circuit adapted to tune a feed impedance of an antenna, the antenna electrically connected to the circuit board, and an antenna proximity sensing circuit adapted to obtain proximity sensing information indicative of proximity of a part of a human body to the antenna. A method comprises obtaining, at an antenna proximity sensing circuit on a circuit board, proximity sensing information indicative of proximity of a part of a human body to an antenna, the antenna electrically connected to the circuit board, and, in response to the obtaining, providing, to an antenna tuning circuit on the circuit board, a tuning parameter value to adapt antenna tuning for the proximity of the part of the human body to the antenna.

20 Claims, 30 Drawing Sheets

(56) References Cited

U.S. PATENT DOCUMENTS

| | | | |
|---|---|---|---|
| 2014/0269977 A1* | 9/2014 | Yang | H04B 7/0413 |
| | | | 375/295 |
| 2017/0279186 A1* | 9/2017 | Xia | H01Q 1/245 |
| 2019/0372205 A1* | 12/2019 | Ruaro | H01Q 13/10 |
| 2020/0192438 A1* | 6/2020 | Chang | G06F 1/1616 |
| 2020/0403311 A1* | 12/2020 | Yu | H01Q 23/00 |

\* cited by examiner

Power Table 1 902

| | | NB Mode 903 | | TB Mode 904 | |
|---|---|---|---|---|---|
| P-sensor 907 | Ant 1 913 | Inactive | Active | Inactive | Active |
| | Ant 2 914 | Inactive | Inactive | Active | Active |
| Mode detection pin 908 | ISH | Inactive | Active | Inactive | Active |
| Tx Power 909 | 4G Standalone | No backoff | 18 dBm | 23 dBm | No backoff |
| | | 18 dBm | 23 dBm | 16 dBm | 16 dBm |

Example: Power Table 2 902

| | | NB Mode 905 | | TB Mode 906 | |
|---|---|---|---|---|---|
| P-sensor 910 | Ant 1 917 | Inactive | Active | Inactive | Active |
| | Ant 2 918 | Inactive | Inactive | Active | Active |
| Mode detection pin 911 | Pin #22 | Inactive | Active | Inactive | Active |
| Tx Power 912 | 5G ENDC Type ID | No backoff | 14 dBm | 23 dBm | No backoff |
| | | 14 dBm | 23 dBm | 10 dBm | 10 dBm |

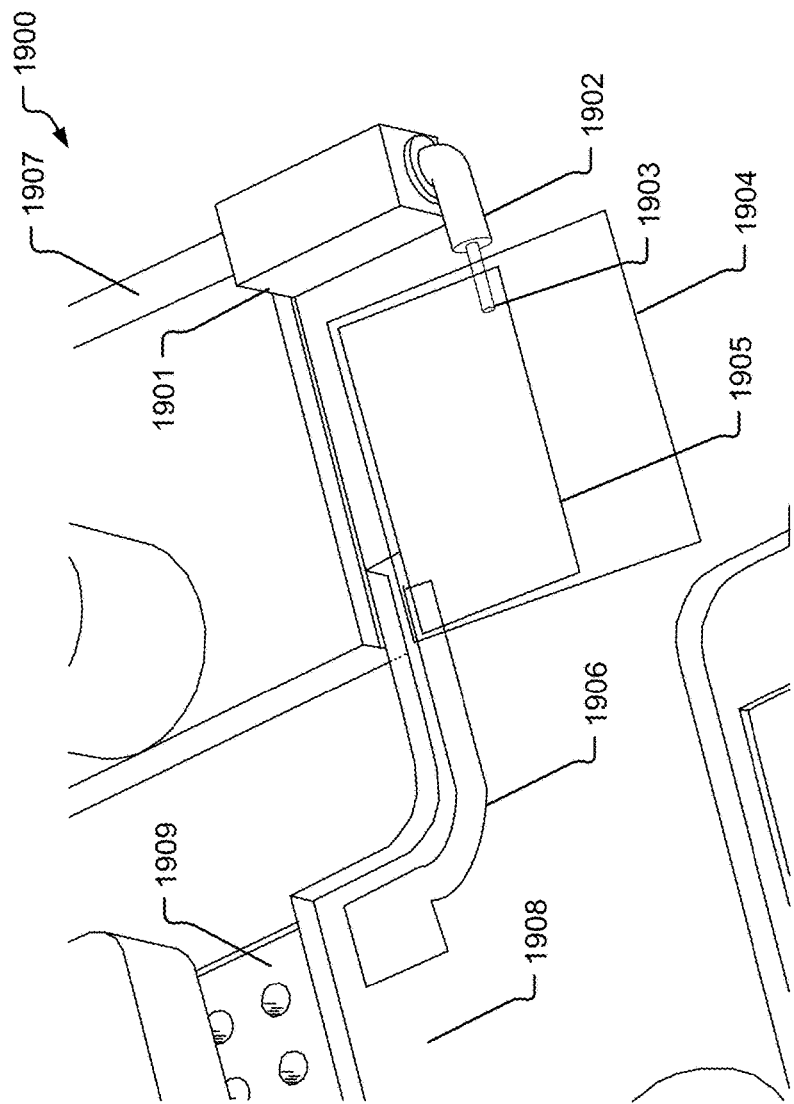
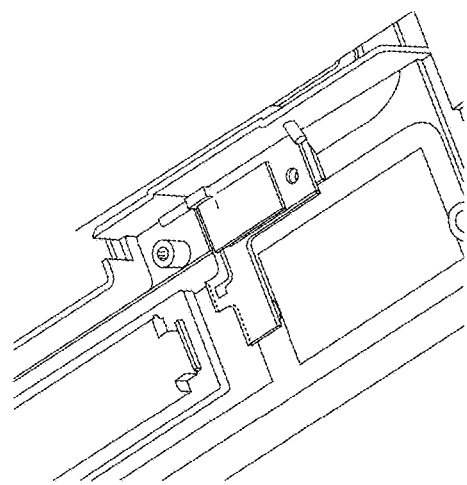
FIG. 19

PROXIMITY SENSING USING AN ANTENNA FRONT END MODULE

CROSS-REFERENCE TO RELATED APPLICATIONS

This application is a Divisional of U.S. patent application Ser. No. 16/915,071, filed Jun. 29, 2020, entitled "PROXIMITY SENSING USING AN ANTENNA FRONT END MODULE," which is a continuation-in-part of U.S. patent application Ser. No. 16/734,276, filed Jan. 3, 2020, entitled "UNIFIED ANTENNA SYSTEM AND METHOD SUPPORTING 4G AND 5G MODEMS IN SAME DEVICE," which is incorporated in its entirety herein by reference.

FIELD OF THE DISCLOSURE

The present disclosure generally relates to information handling systems, and more particularly relates to a unified antenna system and method supporting 4G and 5G modems in single device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may also include telecommunication, network communication, and video communication capabilities. The information handling system may also include one or more buses operable to transmit communications between the various hardware components. The information handling system may also include telecommunication, network communication, and video communication capabilities. Information handling system chassis parts may include case portions such as for a laptop information handling system including the C-cover over components designed with a metal structure. The information handling system may be configurable with one or more antenna systems located within the chassis.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 9 is a tabular diagram of a configuration table for an information handling system having a device-and-user-physical-configuration-responsive multiple transmit antenna system according to an embodiment of the present disclosure;

FIG. 19 is a prospective view diagram of a direct contact feed structure on the speaker grill with a tuner module according to an embodiment of the present disclosure;

The use of the same reference symbols in different drawings may indicate similar or identical items.

DETAILED DESCRIPTION OF THE DRAWINGS

Figure 1:
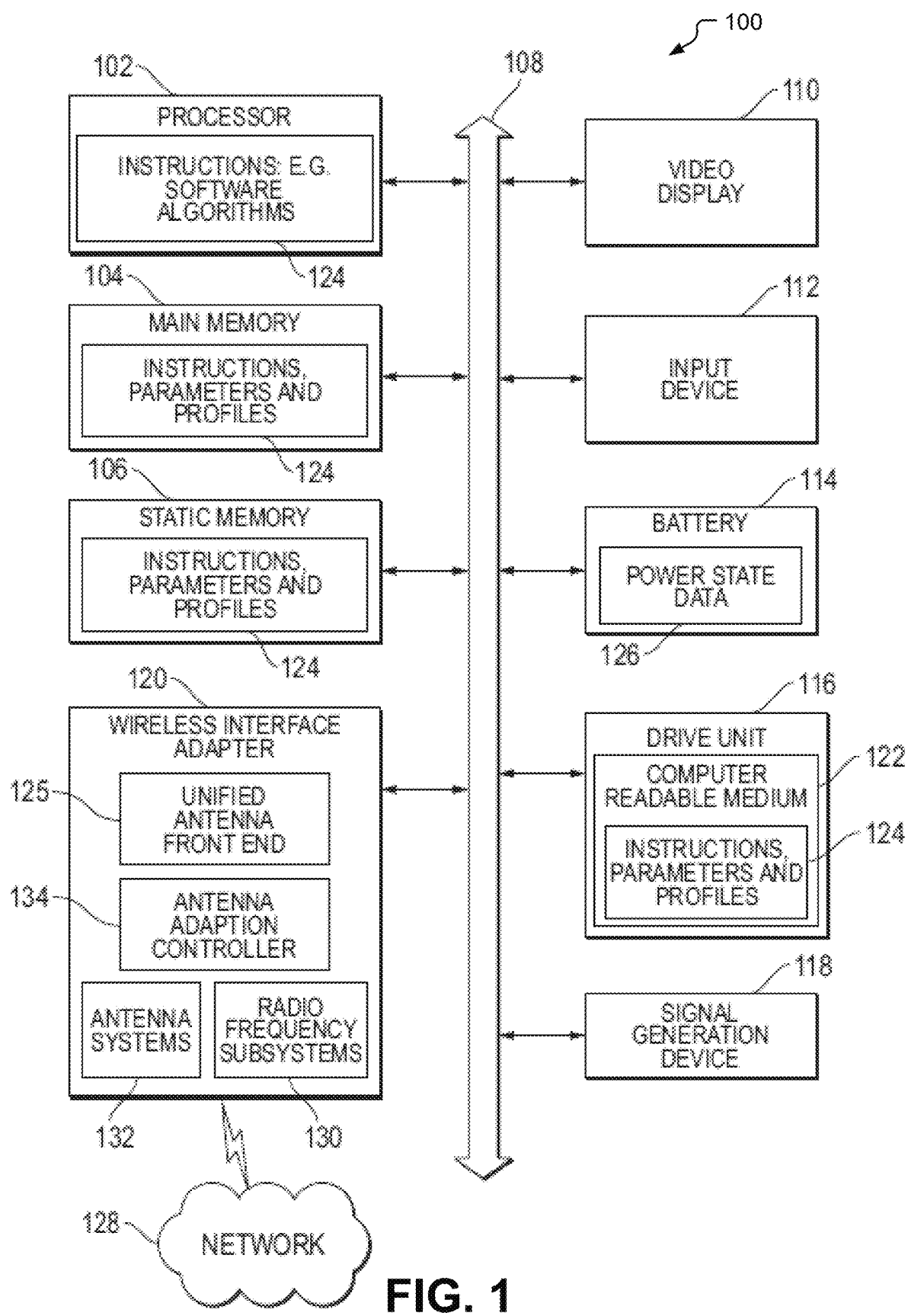
FIG. 1 illustrates an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts may be designed with a metal structure. In an embodiment, a laptop information handling system, for example, may include a plurality of covers for the interior components of the information handling system. In these embodiments, a form factor case may include an "A-cover" which serves as a back cover for a display housing and a "B-cover" which may serve as the bezel, if any, and a display screen of the convertible laptop information handling system in an embodiment. In a further example, the laptop information handling system case may include a "C-cover" housing a keyboard, touchpad, and any cover in which these components are set and a "D-cover" base housing for the laptop information handling system.

With the need for utility of lighter, thinner, and more streamlined devices, the use of full metal portions for the outer covers of the display and base housing (e.g., the A-cover and the D-cover) is desirable for strength as well as aesthetic reasons. At the same time, the demands for wireless operation also increase. This includes addition of many simultaneously operating radiofrequency (RF) systems, addition of more antennas, and utilization of various antenna types. In the present specification and in the appended claims, the term "radio frequency" is meant to be understood as the oscillation rate of an electromagnetic wave. A specific frequency of an electromagnetic wave may have a wavelength that is equal to the speed of light (~300,000 km/s) divided by the frequency.

With new types of networks being developed such as 5G networks, additional antennas that operate on frequencies related to those 5G networks (i.e., high frequency (HF) band, very high frequency (VHF) band, ultra-high frequency (VHF) band, L band, S band, C band, X band, Ku band, K band, Ka band, V band, W band, and millimeter wave bands). So as to communicate with the existing networks as well as the newly developed networks, additional antennas may be added to an information handling system. However, the thinner and more streamlined devices have fewer locations and area available for mounting RF transmitters on these mobile information handling systems. Within the information handling system, suitable locations for these RF systems and antennas besides the A-cover and B-covers are sought. This may lead to placing the RF systems and antennas in the C-cover or D-cover of the information handling systems.

Another consequence of using metal covers is the excitation of the metal surfaces of the covers described herein. This excitation of the metal surfaces leads to destructive interference in the signals sent by the antenna. Thus, a streamlined, full metal chassis capable of meeting the increasing wireless operation demands is needed.

Some information handling systems would address these competing needs by providing for cutout portions of a metal outer chassis cover filled with plastic behind which RF transmitters/receivers would be mounted. The cutouts to accommodate radio frequency (RF) transmitters/receivers are often located in aesthetically undesirable locations and require additional plastic components to cover the cutout, thus not fully meeting the streamlining needs. The plastic components may add a component to be manufactured and can be required to be seamlessly integrated into an otherwise smooth metal chassis cover to achieve a level of aesthetics. Further, the plastic portions included may be expensive to machine, and may require intricate multi-step processes for integrating the metal and plastic parts into a single chassis. This requirement could require difficult and expensive processes to manufacture with a less aesthetically desirable result. Other options include, for aperture type antenna transmitters, creation of an aperture in the metal display panel chassis or base chassis and using the metal chassis as a ground plane for excitation of the aperture.

In addition, in the case of the convertible laptop information handling system, 360-degree configurability may be a feature available to a user during use. Thus, often an antenna such as an aperture antenna system would be located at the top (e.g., A-cover) with a plastic antenna window in a metal chassis cover to radiate in 360-degree mode (such as closed mode), or at the bottom (e.g., C-cover) to radiate in 360-degree mode (such as open mode). Such a configuration could make the display panel housing (e.g., A-cover) or even the base panel housing (e.g., C-cover) thicker, to accommodate antennas and cables behind the plastic panel at the top (or bottom) of either housing. Overall, an addition of a plastic antenna window in an A-cover or C-cover may not meet the streamlining needs. A solution is needed that does not increase the thickness of the metal chassis, and does not require additional components and manufacturing steps such as those associated with installation of extra RF transparent windows to break up the metal chassis in evident locations.

Embodiments of the present disclosure may decrease the complexity and cost of creating chasses for information handling systems by forming the outer chassis (e.g., the A-cover or the D-cover) of metal and implementing a speaker grill, in a C-cover, for example, that has a portion of its perimeter that has been physically and operatively disassociated from the C-cover. The use of the speaker grill as an antenna aperture allows for the co-location of an antenna aperture with a speaker of the information handling system thereby decreasing the size of the information handling system. Additionally, the use of an excited speaker grill at a location by a speaker provides for additional space at the B-cover to expand the size of any video display device of the information handling system by removing an antenna or antennas from the B-cover. This increases the usability of the information handling system by allowing for the dual use of a speaker cavity as an antenna cavity. Additionally, the cavity-backed aperture created by the speaker grill may be used to direct the RF electromagnetic (EM) radiation up and away from the information handling system. In embodiments where the information handling system is to communicate with a wider network, the RF EM signals may be directed towards the horizon up through the C-cover increasing the efficiency of data transmission between the information handling system and any access point in an open configuration.

The metal chassis in embodiments described herein may include a hinge operably connecting the A-cover to the D-cover such that the keyboard, touchpad, and speaker grill enclosed within the C-cover and attached to the D-cover may be placed in a plurality of configurations with respect to the digital display enclosed within the B-cover and attached to the A-cover. The plurality of configurations may include, but may not be limited to, an open configuration in which the A-cover is oriented at a right or obtuse angle from the D-cover (similar to an open laptop computer) and a closed configuration in which the A-cover lies substantially parallel to the D-cover (similar to a closed laptop computer), or other orientations. Despite these different configurations, however, the antenna vent co-located with an audio speaker and its metallic vent provides for the streamlining of the information handling system without compromising the ability of the antenna to transmit and receive data from and to the information handling system.

Manufacture of embodiments of the present disclosure may involve fewer extraneous parts than previous chassis by forming the exterior or outer portions of the information handling system, including the bottom portion of the D-cover and the top portion of the A-cover, from metal in some embodiments. In order to allow for manufacture of fully or nearly fully metallic outer chasses including the A-cover and the D-cover, embodiments of the present disclosure form the full form factor case enclosing the information handling system such that one or more transmitting antennas may be formed within the speaker grill integrated into the C-cover of the information handling system.

The transmitting antennas of embodiments of the present disclosure may include a portion of a speaker grill formed into a cavity-backed dynamically tunable aperture by forming a slot around a portion of the speaker grill and forming a cavity below the speaker grill. The cavity-backed dynamically tunable aperture in embodiments of the present disclosure may be a highly effective improvement on wireless antennas employed in other information handling systems. In embodiments of the present disclosure, the cavity-backed dynamically tunable aperture may be cavity-backed due to the formation of a cavity behind the speaker grill that allows RF EM radiation to resonate within this cavity so as to increase the signal power of the transmitted RF EM radiation. Some or all of the speaker cavity may also be used as the antenna cavity in some embodiments. A cavity-backed dynamically tunable aperture in embodiments of the present disclosure may cause the edges of the speaker grill to act as an RF excitable structure. Such a method of placing the cavity-backed dynamically tunable aperture at the speaker grill of the form factor case may hide the integration of any RF transparent plastic windows around the speaker grill eliminates the placement of a window elsewhere within the exterior of the A-cover, B-cover, C-cover, or the D-cover, thus decreasing the complexity and cost of manufacture. In some embodiments, a plastic trim ring may be used to visually hide the slot formed around the speaker grill. The antenna may then effectively transmit communications signal perpendicularly from the surface of the C-cover.

In embodiments described herein, the speaker grill may be excited using a wireless interface adapter that includes a tuning module. The tuning module may, in the embodiments presented herein, be operatively coupled to the speaker grill to excite the speaker grill via an antenna element, and dynamically switch frequencies based on the target frequency to be emitted by the speaker grill. In order to switch between frequencies to be emitted from the excited speaker grill, the tuning module may include a tunable capacitor. The tunable capacitor may be used to alter the ratio of impedance to capacitive reactance at the speaker grill.

In embodiments described herein, the speaker grill may be flush with a surface of the C-cover, which is the surface most likely to interface with human body parts and be visible to the user. In such embodiments, the plastic trim ring may be visually innocuous to the user while preventing objects from passing through the slot formed between the excited portion of the speaker grill and the remainder of the C-cover. Still further, the plastic trim ring may be held within the slot through the use of an undercut formed by the slot and the remaining border of the speaker grill that prevents the plastic trim ring from being removed. In an embodiment, the plastic trim ring may be compression molded into the slot so as to create a mechanical fit between the compression molded trim ring and the undercut. Because the plastic trim ring is made of plastic, any RF EM waves may be passed therethrough during operation of the information handling system while still preventing foreign objects from entering the C-cover via the slot formed.

In embodiments described herein, the dimensions of the slot formed around the portion of the speaker grill may be selected based on the frequencies to be emitted by the cavity-backed dynamically tunable aperture at the speaker grill. In an embodiment, a length of the slot along a single edge of the speaker grill is 70 mm. The slot may wrap around a width of the speaker grill for 20 mm, and return along a third side for 70 mm as well to provide a slot length of 160 mm in an example embodiment. In another embodiment, the length of the slot along a single edge of the speaker grill is 40 mm along a first side. In this embodiment, the slot may wrap around a width of the speaker grill and return along the third side. Each of first and third sides may be the same length, or may be different lengths and a shunt may be used to bifurcate the slot lengths as well. These specific lengths may allow the speaker grill to emit lower and higher frequencies (i.e., the 70 mm embodiment) or higher frequencies (i.e., the 40 mm embodiment). In one example embodiment, presented herein, the width of the slot formed between the speaker grill and the C-cover may be 1.5 mm. In the embodiment, the 1.5 mm width may be sufficient to electrically isolate that portion of the speaker grill from the C-cover thereby preventing any excitation currents being formed at the C-cover and causing electric noise during RF EM transmission by the speaker grill.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a microcontroller unit (MCU) operating both firmware instructions or hardwired instructions for the antenna adaptation controller 134 to achieve WLAN or WWAN antenna optimization according to embodiments disclosed herein. The application programs operating on the information handling system 100 may communicate or otherwise operate via concurrent wireless links, individual wireless links, or combinations over any available radio access technology (RAT) protocols including WLAN protocols. These application programs may operate in some example embodiments as software, in whole or in part, on an information handling system while other portions of the software applications may operate on remote server systems. The antenna adaptation controller 134 of the presently disclosed embodiments may operate as firmware or hardwired circuitry or any combination on controllers or processors within the information handing system 100 for interface with components of a wireless interface adapter 120. It is understood that some aspects of the antenna adaptation controller 134 described herein may interface or operate as software or via other controllers associated with the wireless interface adapter 120 or elsewhere within information handling system 100. In an embodiment, the antenna adaptation controller 134 may control a tuning module used to excite the speaker grill as described herein. The tuning module may, in the embodiments presented herein, be operatively coupled to the speaker grill, for example via an antenna element, to excite the speaker grill and dynamically switch frequencies based on the target frequency to be emitted by the speaker grill. In order to switch between frequencies to be emitted from the excited speaker grill, the tuning module may include a tunable capacitor. The tunable capacitor may be used to alter the ratio of impedance to capacitive reactance at the speaker grill.

Information handling system 100 may also represent a networked server or other system from which some software applications are administered or which wireless communications such as across WLAN or WWAN may be conducted. In other aspects, networked servers or systems may operate the antenna adaptation controller 134 for use with a wireless interface adapter 120 on those devices similar to embodiments for WLAN or WWAN antenna optimization operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, or a solid-state display. Display 110 may include a touch screen display module and touch screen controller (not shown) for receiving user inputs to the information handling system 100. Touch screen display module may detect touch or proximity to a display screen by detecting capacitance changes in the display screen. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a wearable computing device, or a mobile smart phone.

The information handling system 100 can include sets of instructions 124 that can be executed to cause the computer system to perform any one or more desired applications. In many aspects, sets of instructions 124 may implement wireless communications via one or more antenna systems 132 available on information handling system 100. In embodiments presented herein, the sets of instructions 124 may implement wireless communications via one or more antenna systems 132 formed as part of a speaker grill formed within a C-cover of a laptop-type information handling system. Operation of WLAN and WWAN wireless communications may be enhanced or otherwise improved via WLAN or WWAN antenna operation adjustments via the methods or controller-based functions relating to the antenna adaptation controller 134 disclosed herein. For example, instructions or a controller may execute software or firmware applications or algorithms which utilize one or more wireless links for wireless communications via the wireless interface adapter as well as other aspects or components. The antenna adaptation controller 134 may execute instructions as disclosed herein for monitoring wireless link state information, information handling system configuration data, specific absorption rate (SAR) proximity sensor detection, or other input data to generate channel estimation and determine antenna radiation patterns. In the embodiments presented herein, the antenna adaptation controller 134 may execute instructions as disclosed herein to transmit a communications signal from an antenna system formed as part of a speaker grill that is excited to resonant a target frequency at a slot formed around a portion of the speaker grill in order to transmit an electromagnetic wave at the target frequency or harmonics thereof. The term "antenna system" described herein is meant to be understood as any object that emits a RF electromagnetic (EM) wave therefrom. According to some embodiments described herein an "antenna system" includes a speaker grill that is excited by an excitation circuit that includes a tuning module. This excitation of the speaker grill may cause RF EM waves to be emitted at edges of portions of the speaker grill where a slot has been formed around the speaker grill to both physically and operatively uncoupled at least a portion of the speaker grill from a C-cover of the information handling system.

Additionally, the antenna adaptation controller 134 may prevent noise sourced beyond the speaker grill from creating interference with the determined frequency, or harmonics thereof. In the embodiments presented herein, the antenna adaptation controller 134 may execute instructions as disclosed herein to adjust, via a parasitic coupling element, change the directionality and/or pattern of the emitted RF signals from the antenna.

The antenna adaptation controller 134 may implement adjustments to wireless antenna systems and resources via a radio frequency integrated circuit (RFIC) front end 125 and WLAN or WWAN radio module systems within the wireless interface device 120. The antenna adaptation controller 134, in an embodiment, may implement adjustments to wireless antenna systems that operate on frequencies related to those 5G networks (i.e., high frequency (HF) band, very high frequency (VHF) band, ultra-high frequency (VHF) band, L band, S band, C band, X band, Ku band, K band, Ka band, V band, W band, and millimeter wave bands). Aspects of the antenna optimization for the antenna adaptation controller 134 may be included as part of an antenna front end 125 in some aspects or may be included with other aspects of the wireless interface device 120 such as WLAN radio module such as part of the radio frequency (RF) subsystems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns emitted by the speaker grill, an antenna element, and any parasitic coupling element operations in various embodiments.

Multiple WLAN or WWAN antenna systems that include the speaker grill may operate on various communication frequency bands such as under IEEE 802.11a and IEEE 802.11g (i.e., medium frequency (MF) band, high frequency (HF) band, very high frequency (VHF) band, ultra-high frequency (VHF) band, L band, S band, C band, X band, $K_u$ band, K band, $K_a$ band, V band, W band, and millimeter wave bands) providing multiple band options for frequency channels. In some embodiments, the antenna systems may operate as 5G networks that implement relatively higher data transfer wavelengths such as high frequency (HF) band, very high frequency (VHF) band, ultra-high frequency (VHF) band, L band, S band, C band, X band, Ku band, K band, Ka band, V band, W band, and millimeter wave bands. Further antenna radiation patterns and selection of antenna options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects WWAN or WLAN antenna adaptation controller may execute firmware algorithms or hardware to regulate operation of the one or more antenna systems 132 such as WWAN or WLAN antennas in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used.

Various software modules comprising software application instructions 124 or firmware instructions may be coordinated by an operating system (OS) and via an application programming interface (API). An example operating system may include Windows®, Android®, and other OS types known in the art. Example APIs may include Win 32®, Core Java® API, Android® APIs, or wireless adapter driver API. In a further example, processor 102 may conduct processing of mobile information handling system applications by the information handling system 100 according to the systems and methods disclosed herein which may utilize wireless communications. The computer system 100 may operate as a standalone device or may be connected such as using a network, to other computer systems or peripheral devices. In other aspects, additional processor or control logic may be implemented in graphical processor units (GPUs) or controllers located with radio modules or within a wireless adapter 120 to implement method embodiments of the antenna adaptation controller and antenna optimization according to embodiments herein. Code instructions 124 in firmware, hardware or some combination may be executed to implement operations of the antenna adaptation controller and antenna optimization on control logic or processor systems within the wireless adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless adapter 120. Further, the instructions 124 that embody one or more of the methods or logic as described herein. For example, instructions relating to the WWAN or WLAN antenna adaptation system or antenna adjustments described in embodiments herein may be stored here or transmitted to local memory located with the antenna adaptation controller 134, antenna front end 125, or wireless module in RF subsystem 130 in the wireless interface adapter 120.

In a particular embodiment, the instructions, parameters, and profiles 124 may reside completely, or at least partially, within a memory, such as non-volatile static memory, during execution of antenna adaptation by the antenna adaptation controller 134 in wireless interface adapter 132 of information handling system 100. As explained, some or all of the WWAN or WLAN antenna adaptation and antenna optimization may be executed locally at the antenna adaptation controller 134, RF front end 125, or wireless module subsystem 130. Some aspects may operate remotely among those portions of the wireless interface adapter or with the main memory 104 and the processor 102 in parts including the computer-readable media in some embodiments.

Battery 114 may be operatively coupled to a power management unit that tracks and provides power stat data 126. This power state data 126 may be stored with the instructions, parameters, and profiles 124 to be used with the systems and methods disclosed herein in determining WWAN or WLAN antenna adaptation and antenna optimization in some embodiments.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more RF subsystems 130 with transmitter/receiver circuitry, modem circuitry, one or more unified antenna front end circuits 125, one or more wireless controller circuits such as antenna adaptation controller 134, amplifiers, antenna systems 132 and other radio frequency (RF) subsystem circuitry 130 for wireless communications via multiple radio access technologies. Each RF subsystem 130 may communicate with one or more wireless technology protocols. The RF subsystem 130 may contain individual subscriber identity module (SIM) profiles for each technology service provider and their available protocols for subscriber-based radio access technologies such as cellular LTE communications. The wireless adapter 120 may also include antenna systems 132 which may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures as described in various embodiments of the present disclosure.

In some aspects of the present disclosure, a wireless adapter 120 may operate two or more wireless links. In a further aspect, the wireless adapter 120 may operate the two or more wireless links with a single, shared communication frequency band such as with the Wi-Fi WLAN operation or 5G LTE standard WWAN operations in an example aspect. For example, a 5 GHz wireless communication frequency band may be apportioned under the 5G standards for communication on either small-cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through one or a plurality of antennas. Other communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further operate in nearby wireless communication bands in some disclosed embodiments. Further, harmonics, environmental wireless conditions, and other effects may impact wireless link operation when a plurality of wireless links are operating as in some of the presently described embodiments. The series of potential effects on wireless link operation may cause an assessment of the wireless adapters 120 to potentially make antenna system adjustments according to the WWAN or WLAN antenna adaptation control system of the present disclosure.

The wireless adapter 120 may operate in accordance with any wireless data communication standards. To communicate with a wireless local area network, standards including Institute of Electrical and Electronics Engineers (IEEE) 802.11 wireless local area network (WLAN) standards, IEEE 802.15 wireless personal area network (WPAN) standards, wireless wide area network (WWAN) such as $3^{rd}$ Generation Partnership Project (3GPP) or $3^{rd}$ Generation Partnership Project 2 (3GPP2), or similar wireless standards may be used. Wireless adapter 120 and antenna adaptation controller 134 may connect to any combination of macro-cellular wireless connections including $2^{nd}$ Generation (2G), $2.5^{th}$ Generation (2.5G), $3^{rd}$ Generation (3G), $4^{th}$ Generation (4G), 5$^{th}$ Generation (5G) or the like from one or more service providers. Utilization of RF communication bands according to several example embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band, such as 802.11a/h/j/n/ac (e.g., having center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band. With the advent of 5G networks, any number of protocols may be implemented including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method(s), system(s) and device(s) described herein, including any proprietary protocols.

The wireless adapter 120 can represent an add-in card, wireless network interface module that is integrated with a main board of the information handling system or integrated with another wireless network interface capability, or any combination thereof. In an embodiment the wireless adapter 120 may include one or more RF subsystems 130 including transmitters and wireless controllers such as wireless module subsystems for connecting via a multitude of wireless links under a variety of protocols. In an example embodiment, an information handling system may have an antenna system transmitter 132 for 5G small cell WWAN, Wi-Fi WLAN or WiGig connectivity and one or more additional antenna system transmitters 132 for macro-cellular communication. The RF subsystems 130 include wireless controllers to manage authentication, connectivity, communications, power levels for transmission, buffering, error correction, baseband processing, and other functions of the wireless adapter 120.

The RF subsystems 130 of the wireless adapters may also measure various metrics relating to wireless communication pursuant to operation of an antenna system as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WWAN or WLAN links operating on one or more antenna systems 132, may be used by the antenna adaptation controller to adapt the antenna systems 132 according to an antenna adaptation network according to various embodiments herein. In one embodiment, a wireless controller of a wireless interface adapter 120 may manage one or more RF subsystems 130. The wireless controller also manages transmission power levels which directly affect RF subsystem power consumption as well as transmission power levels from the plurality of antenna systems 132. The transmission power levels from the antenna systems 132 may be relevant to SAR safety limitations for transmitting mobile information handling systems. To control and measure power consumption via a RF subsystem 130, the RF subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
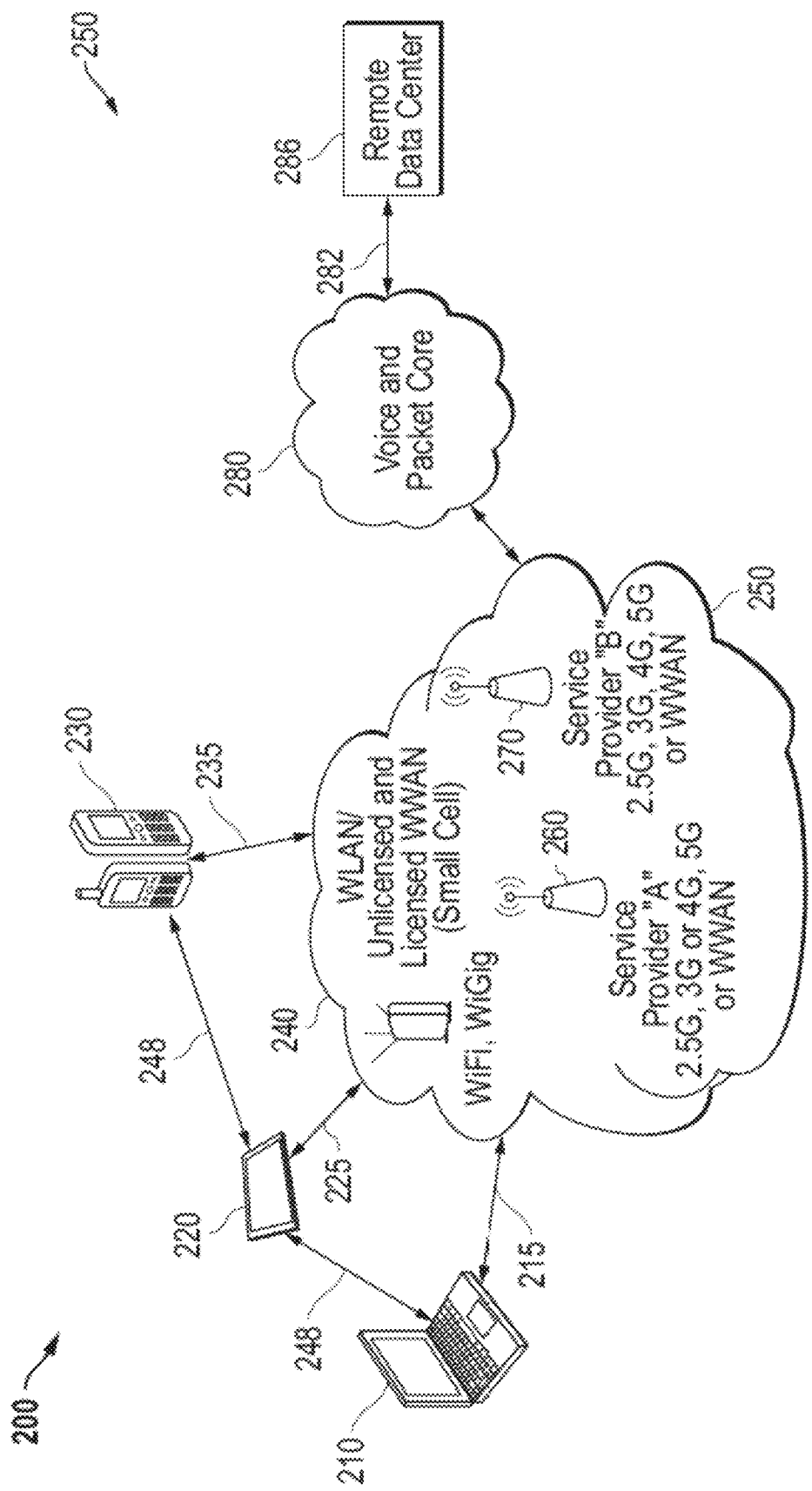
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including GSM, GPRS, EDGE, UMTS, IMS, WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology such as high frequency (HF) band, very high frequency (VHF) band, ultra-high frequency (VHF) band, L band, S band, C band, X band, Ku band, K band, Ka band, V band, W band, and millimeter wave bands. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas. Alternatively, embodiments may include a single transceiving antennas capable of receiving and transmitting, and/or more than one transceiving antennas. Each of the antennas included in the information handling system 100 in an embodiment may be subject to the FCC regulations on SAR. The antenna in the embodiments described herein is an aperture antenna (i.e., a cavity-backed dynamic tunable aperture antenna system) intended for efficient use of space within a metal chassis of an information handling system. Aperture antennas in embodiments of the present disclosure may be an effective improvement on wireless antennas employed in previous information handling systems.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially a WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
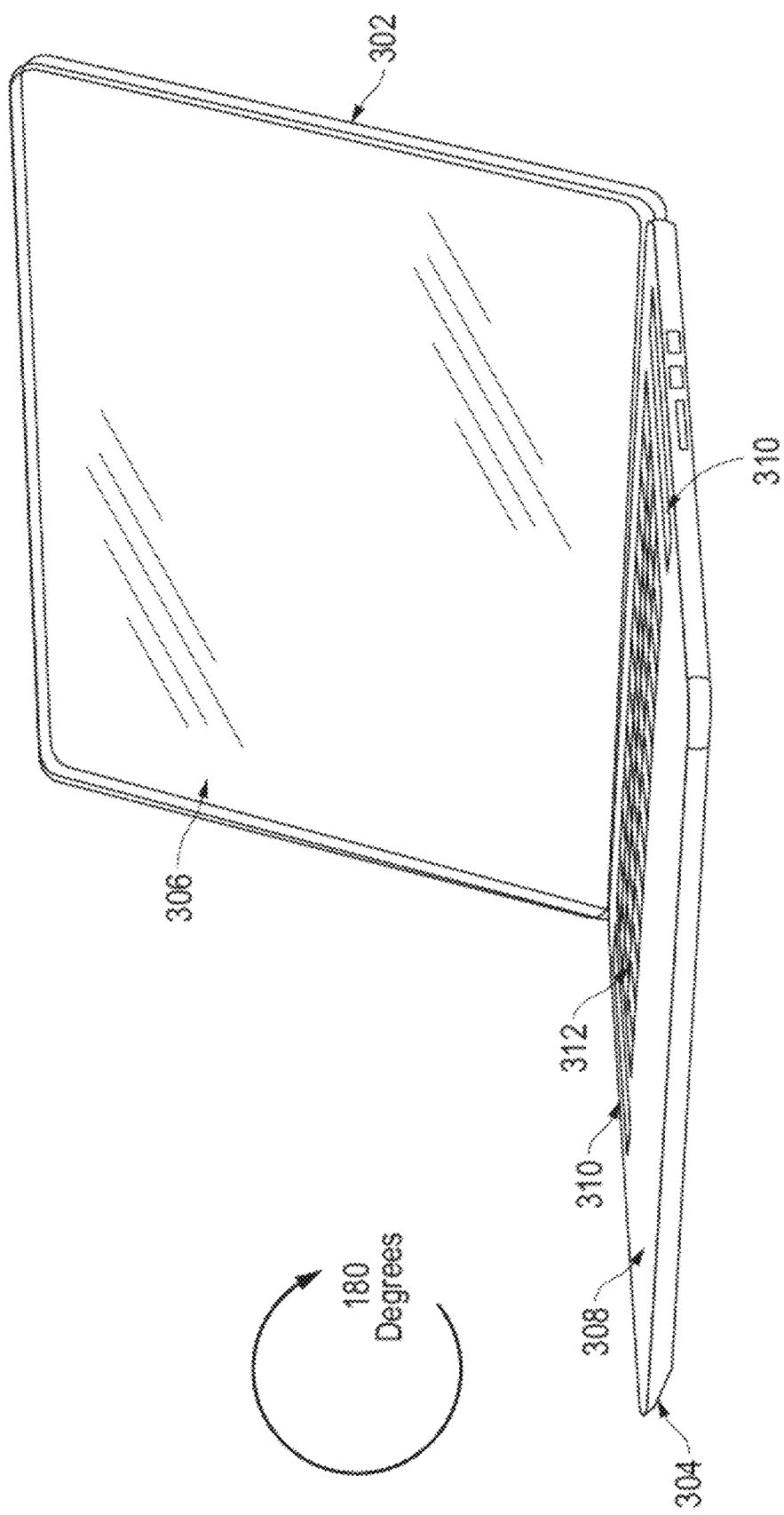
FIG. 3 is a graphical illustration of an information handling system placed in an open configuration according to an embodiment of C-cover including a speaker grill according to an embodiment of the present disclosure.

FIG. 3 is a graphical illustration of a metal chassis including a base chassis and display chassis placed in an open configuration according to an embodiment of the present disclosure. The open configuration is shown for illustration purposes. It is understood that a closed configuration would have the lid chassis fully closed onto the base chassis. The metal chassis 300 in an embodiment may comprise an outer metal case or shell of an information handling system such as a tablet device, laptop, or other mobile information handling system. As shown in FIG. 3, the metal chassis 300, in an embodiment, may further include a plurality of chassis or cases. For example, the metal chassis 300 may further include an A-cover 302 functioning to enclose a portion of the information handling system. As another example, the metal chassis 300, in an embodiment, may further include a D-cover 304 functioning to enclose another portion of the information handling system along with a C-cover 308 which may include a transmitting/receiving antenna according to the embodiments described herein. The C-cover 308 may include, for example, a keyboard, a trackpad, or other input/output (I/O) device. When placed in the closed configuration, the A-cover 302 forms a top outer protective shell, or a portion of a lid for the information handling system, while the D-cover 304 forms a bottom outer protective shell, or a portion of a base. When in the fully closed configuration, the A-cover 302 and the D-cover 304 would be substantially parallel to one another.

In some embodiments, both the A-cover 302 and the D-cover 304 may be comprised entirely of metal. In some embodiments, the A-cover 302 and D-cover 304 may include both metallic and plastic components. For example, plastic components that are radio-frequency (RF) transparent may be used to form a portion of the C-cover 308 where a speaker grill 310 interfaces with the C-cover 308. According to the embodiments of the present disclosure, the speaker grill 310 may be formed as a part of the C-cover. In these examples, the speaker grill 310 may be formed within the C-cover 308 by forming a speaker grill 310 on a side portion of the C-cover 308 as shown in FIG. 3. In the embodiments described herein, a portion of the speaker grill 310 may be physically separated from the C-cover 308 by forming a slot around a portion of the speaker grill 310. As is described herein, the length of the slot around the portion of the speaker grill 310 may be dependent on a target frequency to be emitted upon excitation of the speaker grill 310 by a tuning module. Additionally, in the present specification and in the appended claims, the term "portion" is meant to be understood as a part of a whole. Therefore, in the embodiments disclosed herein, the slot formed around the speaker grill 310 may be less than a total cut-out of the speaker grill 310 from the C-cover 308.

The speaker grill 310 may, therefore, be an integral part of the C-cover 308. In these examples, the speaker grill 310 may also be used to cover or protect a speaker placed below the C-cover 308 and speaker grill 310 in order to provide audio output to a user of the information handling system. The formation of the antenna system that incorporates the speaker grill 310 as the excitation object allows for the removal of the antenna system from the A-cover 302 and B-cover 306 or for the addition of antenna systems that may be required such as with implementations of various 5G technologies. Consequently, the space within the A-cover 302/B-cover 306 assembly where an antenna may have been placed may be eliminated allowing for a relatively larger video display device placed therein, for example. As a result of placing the antenna within the C-cover 308 as part of the speaker grill 310, the capabilities of information handling system may be increased while also increasing user satisfaction during use.

In an embodiment, the speaker grill 310 may be formed at any location on the C-cover 308. Therefore, although FIG. 3 shows two speaker grills 310 located to the left and right of a keyboard 112, the present specification contemplates that the speaker grill 310 or speaker grills 310 may be formed along any surface of the C-cover 308. In the embodiments, each of the individual speaker grills 310 may be excited to emit an RF EM wave signal at different frequencies allowing for the ability of the information handling system to communicate on a variety of RATs.

In an embodiment, the A-cover 302 may be movably connected to a back edge of the D-cover 304 via one or more hinges. In this configuration shown in FIG. 3 the hinges allow the A-cover 302 to rotate from and to the D-cover 304 allowing for multiple orientations of the information handling system as described herein. In an embodiment, the information handling system may include a sensor to detect the orientation of the information handling system and activate or deactivate any of a number of antenna systems associated with the speaker grill 310 based on the occurrence of any specific orientation. In some embodiments, the information handling system may be a laptop with limited rotation of the A-cover 304 with regard to the D-cover 304, for example up to 180°. In other embodiments the information handling system may be a convertible information handling system with full rotation to a tablet configuration.

Figure 4:
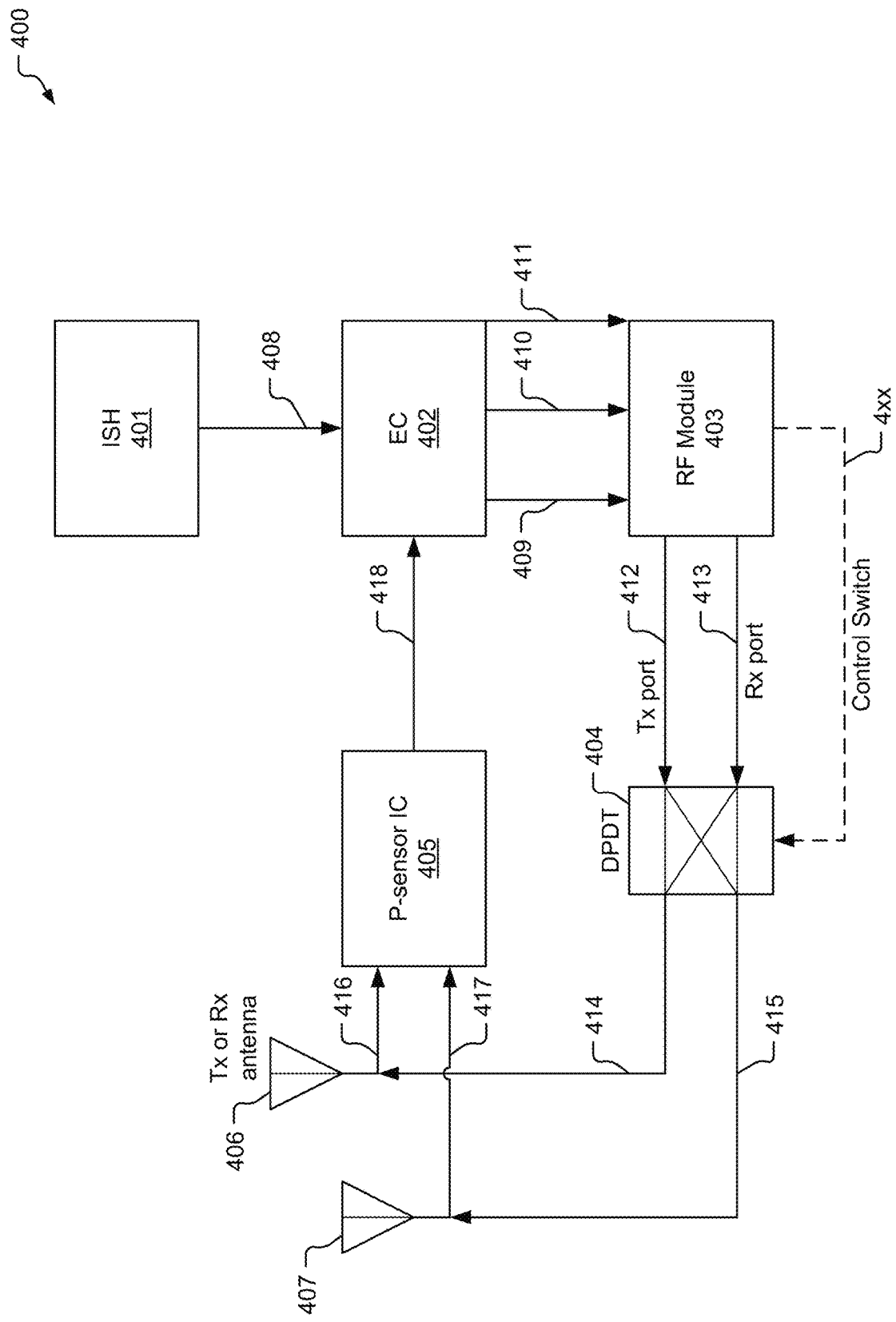
FIG. 4 is a block diagram of a device-and-user-physical-configuration-responsive multiple antenna system according to an embodiment of the present disclosure.

FIG. 4 shows a device-and-user-physical-configuration-responsive multiple antenna system according to an embodiment of the present disclosure. Device-and-user-physical-configuration-responsive multiple antenna system 400 comprises integrated sensor hub (ISH) 401, enclosure controller (EC) 402, radio frequency (RF) module 403, antenna switch 404, proximity sensor (P-sensor) integrated circuit (IC) 405, antenna 406, and antenna 407. ISH 401 provides information from sensors, which may include, for example, a hinge position sensor to indicate a position of a hinge connecting a base system side housing to a display panel housing, or, as another example, an orientation sensor (e.g., a tilt sensor) to indicate an orientation of at least one of the base system side housing and the display panel housing.

Information provided by ISH 401 can include, for example, a mode indication representative of a physical configuration of IHS 100 to EC 402 via interconnect 408. EC 402 is a processor for controlling information handling system components within an enclosure of the information handling system, as opposed to a general-purpose processor for executing user applications. EC 402 provides control signals to RF module 403 at interconnects 409, 410, and 411. As an example, EC 402 can provide a mode indication signal representative of a device physical configuration (e.g., whether the device is in a device physical configuration corresponding to a notebook mode or a device physical configuration corresponding to a 360 mode) at interconnect 409, a first antenna proximity sensor trigger signal at interconnect 410, and a second antenna proximity sensor trigger signal at interconnect 411.

The first antenna proximity sensor trigger signal can be responsive to the triggering of a first antenna proximity sensor for a first antenna. The second antenna proximity sensor trigger signal can be responsive to the triggering of a second antenna proximity sensor for a second antenna. RF module 403 receives the control signals. RF module logically operates on the control signals to produce a control switch signal provided to antenna switch 404. As an example, antenna switch 404 may be of a double-pole double-throw (DPDT) configuration, allowing the connection of a transmission (TX) port of RF module 403 to either one of antennas 406 and 407 and connection of a reception (RX) port of RF module 403 to an opposite one of the antennas 406 and 407. Thus, in a first position, antenna switch 404 can connect the TX port to antenna 406 and the RX port to antenna 407, and, in a second position, antenna switch 404 can connect the TX port to antenna 407 and the RX port to antenna 406. The TX port of RF module 403 is connected to a TX port of antenna switch 404 via transmit signal interconnect 412.

The RX port of RF module 403 is connected to a RX port of antenna switch 404 via receive signal interconnect 413. A first antenna port of antenna switch 404 is connected to antenna 406 via antenna interconnect 414. A second antenna port of antenna switch 404 is connected to antenna 407 via antenna interconnect 415. Sensing conductor 416 is coupled to a first sensing input of P-sensor IC 405. Sensing conductor 417 is coupled to a second sensing input of P-sensor IC 405. P-sensor IC 405 provides a proximity sensor signal to EC 402 via interconnect 418. EC 402 uses the interconnect signal to provide the first antenna proximity sensor trigger signal at interconnect 410 and the second antenna proximity sensor trigger signal at interconnect 411 to indicate the proximity of a user to antenna 406 and 407, respectively.

Figure 5:
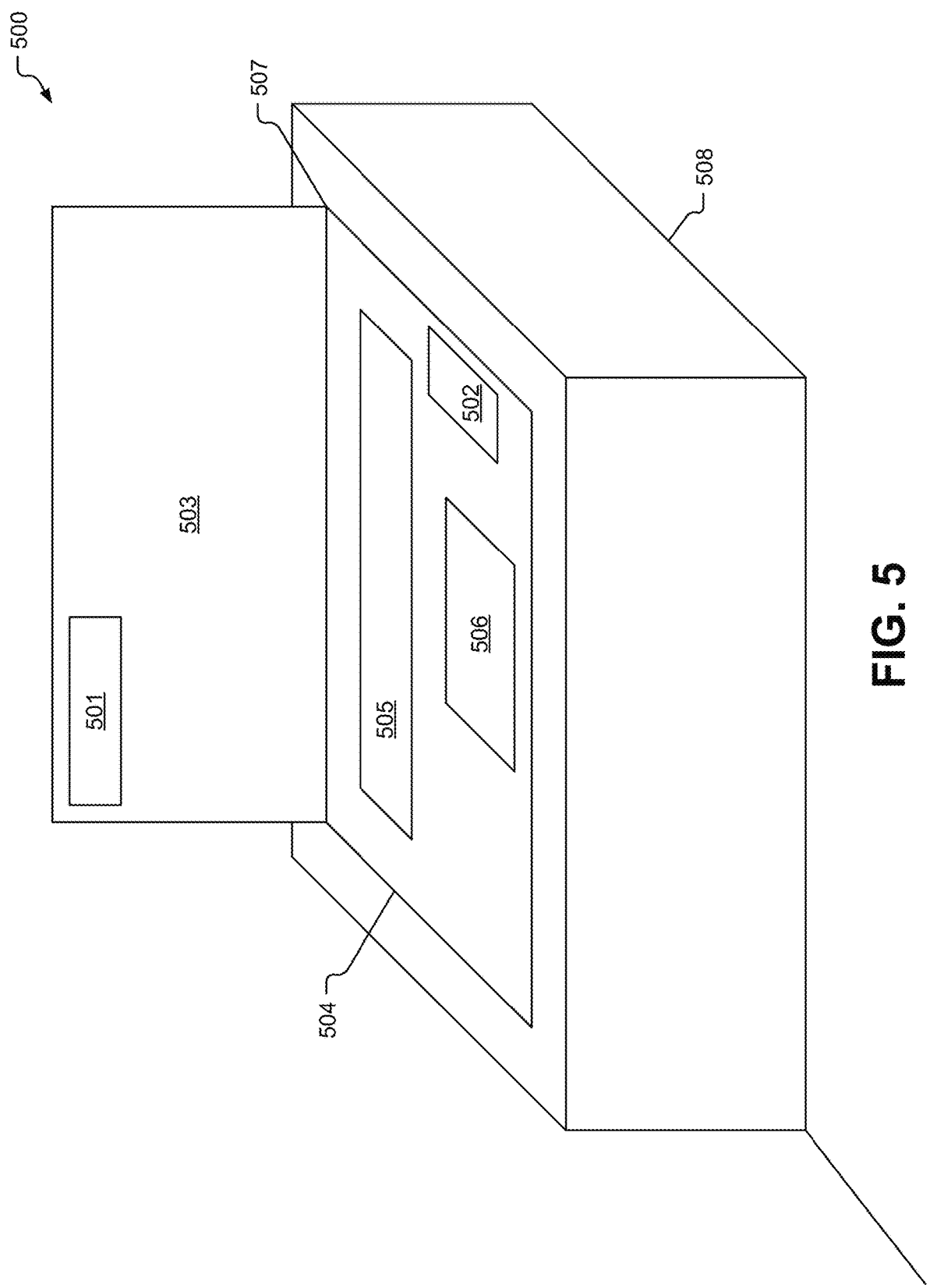
FIG. 5 is a perspective view diagram of an information handling system physically configured in a notebook mode according to an embodiment of the present disclosure.

FIG. 5 is a perspective view diagram of an information handling system physically configured in a notebook mode according to an embodiment of the present disclosure. Information handling system 500 includes antenna 501, antenna 502, display panel housing 503, base system side housing 504, keyboard 505, touchpad 506, and hinge 507. Information handling system 500 is resting on SAR phantom 508. Antenna 501 is located in display panel housing 503. Antenna 502 is located in base system side housing 504. Keyboard 505 and touchpad 506 are located in base system side housing 504. Hinge 507 is connected to display panel housing 503 and base system side housing 504 and rotatably joins display panel housing 503 to base system side housing 504.

As shown in FIG. 5, information handling system 500 is in a physical configuration referred to as notebook mode, wherein display panel housing 503 meets base system side housing 504 at an angle between 90 and 180 degrees. In such a configuration, antenna 501 is elevated at a height above the SAR phantom 508, keeping it far from SAR phantom 508. Antenna 502 is much closer to SAR phantom 508. In such a configuration, it may be preferable to utilize, for example, antenna 501 as a transmit antenna and antenna 502 as a receive antenna, or, as another example, antenna 501 as a transmit and receive antenna and antenna 502 as a receive antenna or an unused antenna.

Figure 6:
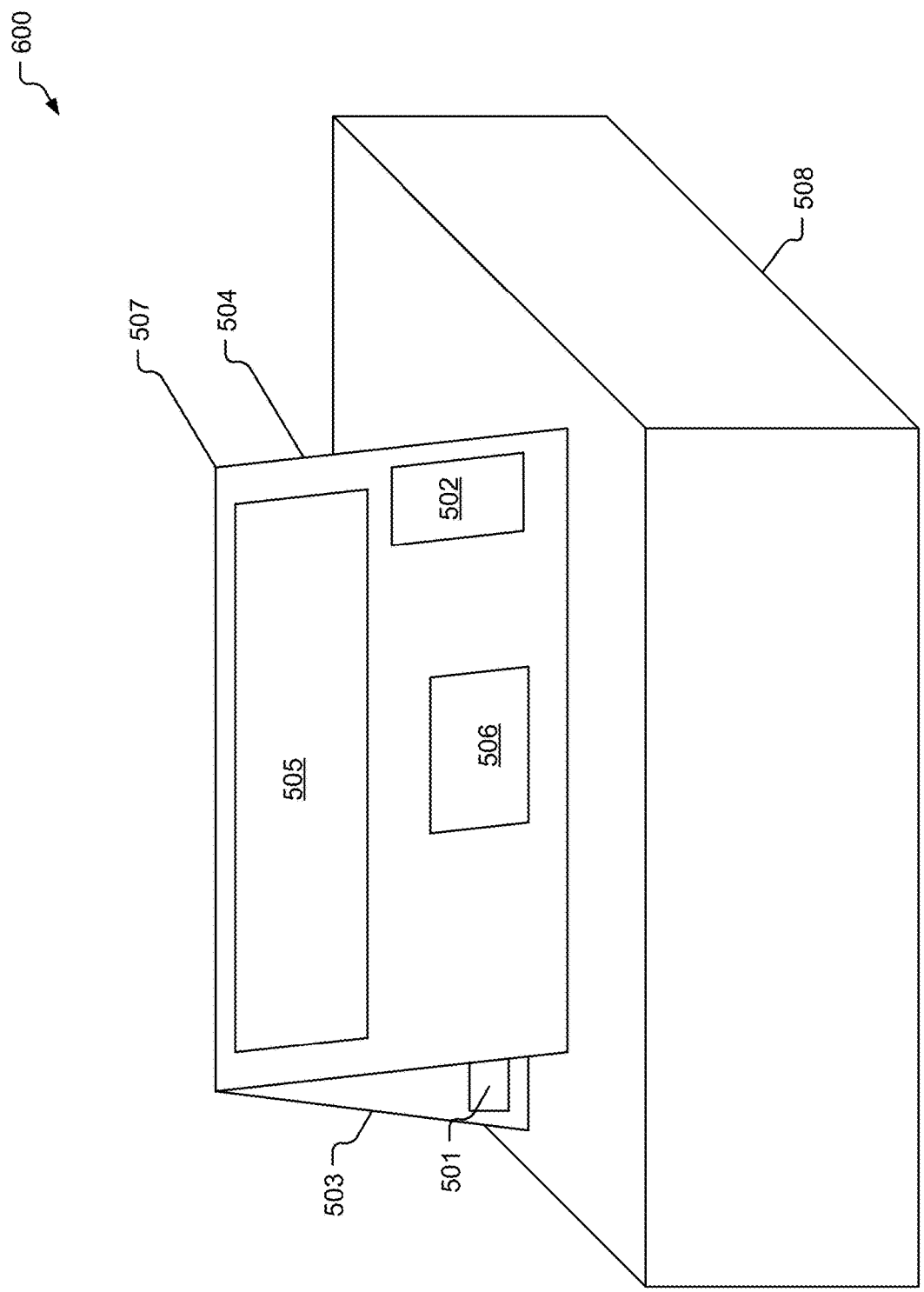
FIG. 6 is a perspective view diagram of an information handling system physically configured in a 360 mode according to an embodiment of the present disclosure.

FIG. 6 is a perspective view diagram of an information handling system physically configured in a 360 mode according to an embodiment of the present disclosure. Information handling system 600 comprises the same elements as information handling system 500 of FIG. 5 but positioned into a physical configuration referred to as a 360 mode, wherein display panel housing 503 meets base system side housing 504 at an angle between 180 and 360 degrees, where zero degrees would be closed (with the keyboard facing the display screen). In such a configuration, antenna 501 is lowered to be only slightly above the SAR phantom 508, while antenna 502 is farther from SAR phantom 508. In such a configuration, it may be preferable to utilize, for example, antenna 502 as a transmit antenna and antenna 501 as a receive antenna, or, as another example, antenna 502 as a transmit and receive antenna and antenna 501 as a receive antenna or an unused antenna.

Figure 7:
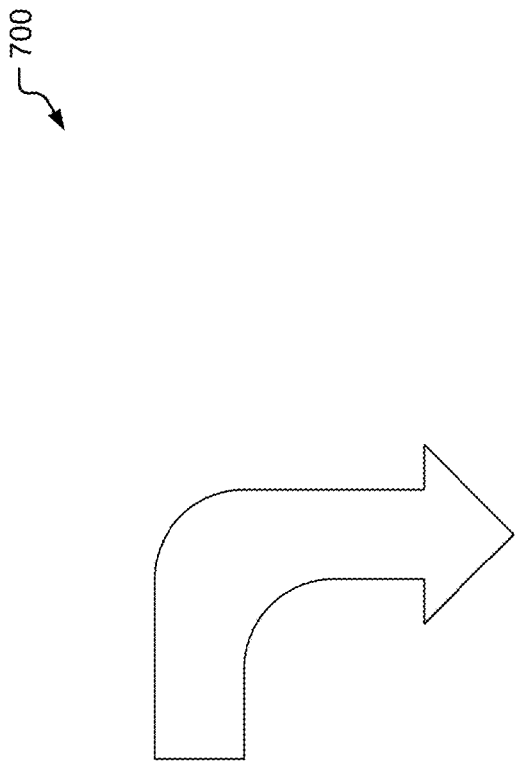
FIG. 7 is a tabular diagram of a configuration table for an information handling system having a device-and-user-physical-configuration-responsive multiple antenna system according to an embodiment of the present disclosure.

FIG. 7 is a tabular diagram of a configuration table for an information handling system having a device-and-user-physical-configuration-responsive multiple antenna system according to an embodiment of the present disclosure. Logic tables 700 comprise a logic table for EC 402 and a logic table for RF module 403. In the logic table for EC 402, columns 701 of EC input values yield a column 702 of EC output values. Column 703 of columns 701 pertains to output values of ISH 401. Column 704 of columns 701 pertains to output values of P-sensor IC 405. Rows 705 pertain to cases where the output value of ISH 401 indicates a notebook mode of the IHS. Rows 706 pertain to cases where the output value of ISH 401 indicates a 360 mode of the IHS.

In the case where the ISH is in a notebook mode and neither P-sensor is triggered, the EC output to the RF module is not triggered. In the case where the ISH is in the notebook mode and the Ant1 P-sensor is triggered, the EC output to the RF module is not triggered. In the case where the ISH is in the notebook mode and the Ant2 P-sensor is triggered, the EC output to the RF module is not triggered. In the case where the ISH is in the notebook mode and both the Ant1 and Ant2 P-sensors are triggered, the EC output to the RF module is not triggered.

In the case where the ISH is in a 360 mode and neither P-sensor is triggered, the EC output to the RF module is not triggered. In the case where the ISH is in the 360 mode and the Ant1 P-sensor is triggered, the Ant1 triggered signal is sent to the RF module. In the case where the ISH is in the 360 mode and the Ant2 P-sensor is triggered, the Ant2 triggered signal is sent to the RF module. In the case where the ISH is in the 360 mode and both the Ant1 and Ant2 P-sensors are triggered, the Ant1 and Ant2 triggered signals are sent to the RF module. Where terminology such as Ant1 triggered signal, Ant2 triggered signal, Ant1 and Ant2 triggered signals, or discussion of an antenna being triggered is used herein, such terminology should be understood to refer to the triggering of proximity sensing based on a proximity sensor probe associated with the referenced antenna (e.g., Ant1, Ant2, etc.).

In the logic table for RF module 403, columns 711 of RF module input values yield a column 712 of antenna switch values for transmission and a column 713 of dynamic power reduction (DPR) values. Rows 714 pertain to cases where the output value of ISH 401 indicates a notebook mode of the IHS. Rows 715 pertain to cases where the output value of ISH 401 indicates a 360 mode of the IHS.

In the case where the ISH is in a notebook mode and neither P-sensor is triggered as an input to the RF module, the first antenna (Ant1) is selected as the antenna for transmission and no DPR is performed. In the case where the ISH is in the notebook mode and the Ant1 P-sensor is triggered as an input to the RF module, the first antenna (Ant1) is selected as the antenna for transmission and no DPR is performed. In the case where the ISH is in the notebook mode and the Ant2 P-sensor is triggered as an input to the RF module, the first antenna (Ant1) is selected as the antenna for transmission and no DPR is performed. In the case where the ISH is in the notebook mode and both the Ant1 and Ant2 P-sensors are triggered as inputs to the RF module, the first antenna (Ant1) is selected as the antenna for transmission and no DPR is performed.

In the case where the ISH is in a 360 mode and neither P-sensor is triggered as input to the RF module, the first antenna (Ant1) is selected as the antenna for transmission and no DPR is performed. In the case where the ISH is in the 360 mode and the Ant1 P-sensor is triggered as an input to the RF module, the second antenna (Ant2) is selected as the antenna for transmission and no DPR is performed. In the case where the ISH is in the 360 mode and the Ant2 P-sensor is triggered as an input to the RF module, the first antenna (Ant1) is selected as the antenna for transmission and no DPR is performed. In the case where the ISH is in the 360 mode and both the Ant1 and Ant2 P-sensors are triggered as inputs to the RF module, the antenna of Ant1 and Ant2 with the lower SAR value is selected as the antenna for transmission and DPR is applied to either Ant1 or Ant2.

In accordance with at least one embodiment, multi-mode multi-antenna control using single feedback mechanism is provided. In accordance with at least one embodiment, a best-antenna-selection (BAS) dynamic power reduction (DPR) system is provided. As an example, such a DPR system can be used for a fourth generation (4G) gigabit 4×4 360 personal computer (PC), where 4×4 refers to multiple antennas instantiated in an information handling system and 360 refers to an ability of the PC to be reoriented from a notebook mode to a 360 mode, as described herein.

In 4G long-term evolution (LTE) technology, a single transmit antenna is sufficient among several (e.g., four) antennas that may be implemented in a device, such as an information handling system. The one transmit antenna may be provided with P-sensor circuit to detect the presence of a portion of a human body in proximity to the transmit antenna and to trigger cut-off of power when the portion of the human body approaches. Even though a device has P-sensor circuit, transmit power should be cut off when the portion of the human body approaches the antenna. The amount of power cut off can be varied. For example, some device may need less power cut off, but some device may require a huge amount of power cut off based on the antenna type, device form factor, antenna location, or other factors. The amount of power cut off can impact a user's satisfaction to enjoy a wireless network environment.

To minimize the amount of power cut off, an antenna switch is used to redirect the transmit power intentionally toward an antenna path for an antenna which is not triggered by proximity of a human body or which can operate with a smaller amount of power cut off, depending on user's scenarios such as for a notebook mode, for a tablet mode, when a first antenna is in proximity to the human body, when a second antenna is in proximity to the human body or when multiple antennas are in proximity to the human body, or based on other criteria.

In accordance with at least one embodiment, a circuit and method are provided to switch a transmit signal from a first antenna having a proximity sensor triggered by a human body to a second antenna having a proximity sensor not triggered by the human body, or, to whichever of the first antenna and the second antenna which can be permissibly operated using a smaller amount of power cut off.

In accordance with an example, in a notebook mode, a first antenna (Ant1) is free from the human body and the RF module is allowed to transmit maximum transmit power via Ant1, so an antenna switch will direct the transmit signal, which need not be reduced, to Ant1 to radiate the desired transmit power. In accordance with an example, in a 360 mode, either Ant1 or a second antenna (Ant2) can be triggered by human body, in which case the antenna switch will direct the transmit signal to either of Ant1 or Ant2 which is not triggered by proximity of a human body. In case both antennas are triggered by proximity of a human body, the antenna switch will direct the transmit signal to the antenna which has a smaller amount of transmit power reduction (cut off), so that antenna performance can be maximized.

Figure 8:
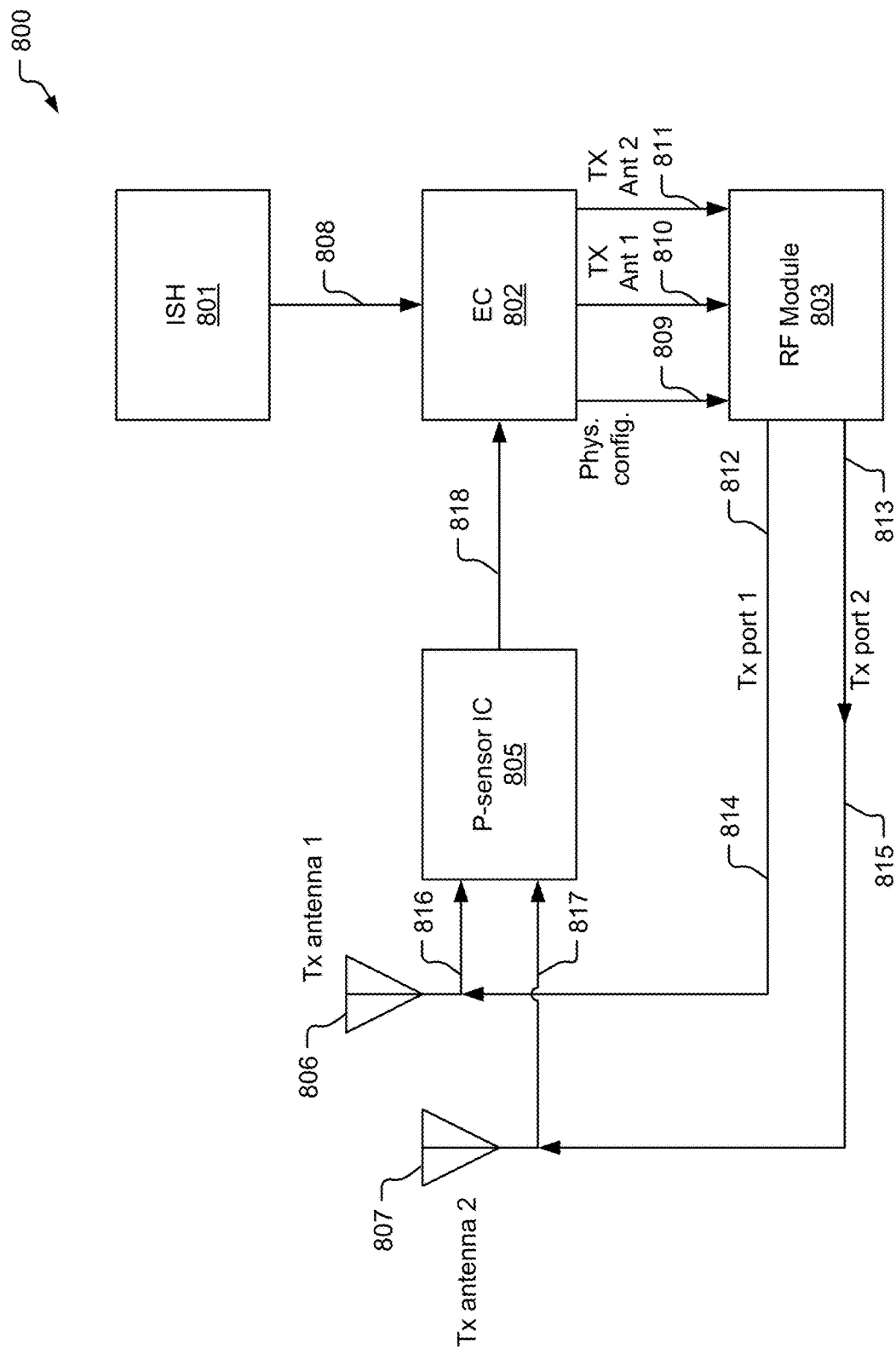
FIG. 8 is a block diagram of a device-and-user-physical-configuration-responsive multiple transmit antenna system according to an embodiment of the present disclosure.

FIG. 8 shows a device-and-user-physical-configuration-responsive multiple transmit antenna system according to an embodiment of the present disclosure. Device-and-user-physical-configuration-responsive multiple antenna system 800 includes ISH 801, enclosure controller (EC) 802, radio frequency (RF) module 803, proximity sensor (P-sensor) integrated circuit (IC) 805, antenna 806, and antenna 807. ISH 801 provides a mode indication representative of a physical configuration of IHS 100 to EC 802 via interconnect 808. EC 802 provides control signals to RF module 803 at interconnects 809, 810, and 811.

As an example, EC 802 can provide a mode indication signal representative of a device physical configuration (such as whether the device is in a device physical configuration corresponding to a notebook mode or a device physical configuration corresponding to a 360 mode) at interconnect 809, a first antenna proximity sensor trigger signal at interconnect 810, and a second antenna proximity sensor trigger signal at interconnect 811. The first antenna proximity sensor trigger signal can be responsive to the triggering of a first antenna proximity sensor for a first antenna. The second antenna proximity sensor trigger signal can be responsive to the triggering of a second antenna proximity sensor for a second antenna. RF module 803 receives the control signals. RF module logically operates on the control signals to produce a first transmit signal for a first antenna at a first TX port 812 and a second transmit signal for a second antenna at a second TX port 813.

The first TX port 812 of RF module 803 is connected to antenna 806 via antenna interconnect 814. The second TX port 813 of RF module 803 is connected to antenna 807 via antenna interconnect 815. Sensing conductor 816 is coupled to a first sensing input of P-sensor IC 805. Sensing conductor 817 is coupled to a second sensing input of P-sensor IC 805. P-sensor IC 805 provides a proximity sensor signal to EC 802 via interconnect 818. EC 802 uses the interconnect signal to provide the first antenna proximity sensor trigger signal at interconnect 810 and the second antenna proximity sensor trigger signal at interconnect 811 to indicate the proximity of a user to antenna 806 and 807, respectively. Based on the input signals received at RF module 803, RF module 803 can select antenna 806, antenna 807, or both for transmission and can perform dynamic power reduction (DPR) for antenna 806, antenna 807, or both.

FIG. 9 is a tabular diagram of a configuration table for an information handling system having a device-and-user-physical-configuration-responsive multiple transmit antenna system according to an embodiment of the present disclosure. Logic table 900 has a column 902 serving as a legend for the entries of columns 903 and 904, where column 903 pertains to a notebook mode and column 904 pertains to a 360 mode of operation of an information handling system. Rows 907, 908, and 909 pertain to a first power table. The first power table may, for example, contain information for a first RF mode, such as a fourth-generation (4G) cellular modem RF mode. Rows 910, 911, and 912 pertain to a second power table. The second power table may, for example, contain information for a second RF mode, such as a fifth-generation (5G) cellular modem RF mode. Rows 907 and 910 each include separate rows for first antenna Ant1 and second antenna Ant2. Rows 909 and 912 each include separate rows for first antenna Ant1 and second antenna Ant2.

Power table 1 illustrates an example of transmit power values for a LTE standalone case (for example 4G). Within power table 1 (rows 907, 908, and 909), when the P-sensor signals for Ant1 and Ant2 are both inactive and the mode detection from the ISH indicates the notebook mode of the IHS, no back-off of power is applied to either Ant1 or Ant2. If the P-sensor for Ant1 is active, but the P-sensor for Ant2 is inactive and the mode detection from the ISH indicates the notebook mode of the IHS, the TX power for Ant1 is configured to be 18 decibels relative to a milliwatt (dBm), and the TX power for Ant2 is configured to be 23 dBm. If the P-sensor for Ant2 is active, but the P-sensor for Ant1 is inactive and the mode detection from the ISH indicates the notebook mode of the IHS, the TX power for Ant2 is configured to be 18 dBm, and the TX power for Ant1 is configured to be 23 dBm. If the P-sensor for Ant1 is active, and the P-sensor for Ant2 is active, and the mode detection from the ISH indicates the notebook mode of the IHS, the TX power for Ant1 is configured to be 18 dBm, and the TX power for Ant2 is configured to be 18 dBm.

Within power table 1 (rows 907, 908, and 909), when the P-sensor signals for Ant1 and Ant2 are both inactive and the mode detection from the ISH indicates the 360 mode of the IHS, no back-off of power is applied to either Ant1 or Ant2. If the P-sensor for Ant1 is active, but the P-sensor for Ant2 is inactive and the mode detection from the ISH indicates the 360 mode of the IHS, the TX power for Ant1 is configured to be 16 dBm, and the TX power for Ant2 is configured to be 23 dBm. If the P-sensor for Ant2 is active, but the P-sensor for Ant1 is inactive and the mode detection from the ISH indicates the 360 mode of the IHS, the TX power for Ant2 is configured to be 16 dBm, and the TX power for Ant1 is configured to be 23 dBm. If the P-sensor for Ant1 is active, and the P-sensor for Ant2 is active, and the mode detection from the ISH indicates the 360 mode of the IHS, the TX power for Ant1 is configured to be 16 dBm, and the TX power for Ant2 is configured to be 16 dBm.

Power table 2 illustrates an example of transmit power values for an EN-DC case, which is dual transmission (for example 5G). Within power table 2 (rows 910, 911, and 912), when the P-sensor signals for Ant1 and Ant2 are both inactive and the mode detection from the ISH indicates the notebook mode of the IHS, no back-off of power is applied to either Ant1 or Ant2. If the P-sensor for Ant1 is active, but the P-sensor for Ant2 is inactive and the mode detection from the ISH indicates the notebook mode of the IHS, the TX power for Ant1 is configured to be 14 dBm, and the TX power for Ant2 is configured to be 23 dBm. If the P-sensor for Ant2 is active, but the P-sensor for Ant1 is inactive and the mode detection from the ISH indicates the notebook mode of the IHS, the TX power for Ant2 is configured to be 14 dBm, and the TX power for Ant1 is configured to be 22 dBm. If the P-sensor for Ant1 is active, and the P-sensor for Ant2 is active, and the mode detection from the ISH indicates the notebook mode of the IHS, the TX power for Ant1 is configured to be 14 dBm, and the TX power for Ant2 is configured to be 14 dBm.

Within power table 2 (rows 910, 911, and 912), when the P-sensor signals for Ant1 and Ant2 are both inactive and the mode detection from the ISH indicates the 360 mode of the IHS, no back-off of power is applied to either Ant1 or Ant2. If the P-sensor for Ant1 is active, but the P-sensor for Ant2 is inactive and the mode detection from the ISH indicates the 360 mode of the IHS, the TX power for Ant1 is configured to be 10 dBm, and the TX power for Ant2 is configured to be 22 dBm. If the P-sensor for Ant2 is active, but the P-sensor for Ant1 is inactive and the mode detection from the ISH indicates the 360 mode of the IHS, the TX power for Ant2 is configured to be 10 dBm, and the TX power for Ant1 is configured to be 22 dBm. If the P-sensor for Ant1 is active, and the P-sensor for Ant2 is active, and the mode detection from the ISH indicates the 360 mode of the IHS, the TX power for Ant1 is configured to be 10 dBm, and the TX power for Ant2 is configured to be 10 dBm.

In accordance with at least one embodiment, a multi-mode dynamic transmit power control mechanism supporting multiple radio access technology (RAT) is provided. In accordance with at least one embodiment, a DPR mechanism for communication systems utilizing multiple transmit antennas, such as mobile radio for a 5G cellular network, such as an Evolved-Universal Mobile Telecommunications System (UMTS) Terrestrial Radio Access Network (E-UTRAN) New Radio-Dual Connectivity (EN-DC) radio, is provided in a manner that may be implemented, for example, for use with a 360 PC (a PC capable of being used in a 360 mode).

Some communication systems, such as 5G cellular networks, can utilize or even require simultaneous use of two transmission antennas in one mobile device. Other communication systems, such as 4G cellular networks, can be operated using only a single transmission antenna for the mobile device. Using two transmit antennas at the same time can complicate SAR regulatory compliance when part of a human body is located in proximity to at least one of the antennas, as the antenna may still need to serve as a transmit antenna even with the proximity of the human body, which requires much power cut off as compared to a system where only a single transmit antenna is needed and a transmit signal can simply be directed to an antenna farther from the human body to meet SAR regulatory requirements. A larger amount of power reduction (cut off) is not desired for better antenna and throughput performance in the field even though technology is advanced to what should be a higher-performance network technology, such as 5G. As an example, a device supporting a 360 mode could need a huge power cut off in the case of both being in the 360 mode and supporting simultaneous transmission of transmit power via at least two antennas. Transmit power cut off should be efficient to maximize a user's satisfaction to enjoy a wireless environment with new technology.

In accordance with at least one embodiment, transmit power reduction can be mitigated by reducing (cutting off) power dynamically using a smart circuit and method responsive to each of a plurality of scenarios, wherein such scenarios may be a combination of parameter values such as a device mode (for example a notebook mode or a 360 mode), number of transmissions from the device, a number of antennas of a device, a number of transmit antennas of a device, a number of antennas for which a proximity sensor sensing proximity of a part of a user's body has been triggered, etc.

In accordance with at least one embodiment, an EC has ISH and P-sensor inputs and sends the information obtained therefrom to a RF module. The RF module can determine maximum transmit power by an intentional logic table based on sensor and modem information. The device can avoid excessive power reduction in the cases of certain scenarios. Transmit power can be managed using the logic table.

In accordance with at least one embodiment, for situations where there are two transmit antennas transmitting power at the same time whenever an information handling system is in either a notebook mode or a 360 mode, it can be difficult to meet a SAR regulatory requirement without diminishing transmit power to an extent that significantly affects performance. A dynamic power reduction method according to an antenna or antennas for which proximity of a human body is detected using a P-sensor and in dependence on a physical configuration mode of the information handling system allows a RF module to provide transmit power efficiently and minimize antenna performance sacrifice.

In accordance with at least one embodiment, a power table can indicates an example of how much the RF module can transmit power in each scenario to meet a SAR regulatory requirement by operating within a SAR limit. As an example of legacy P-sensor trigger function, the module should transmit a maximum of 10 dBm at any mode since the worst scenario (EN-DC in 360 mode) requires only 10 dBm power. By using a trigger circuit and method as described herein, a RF module can transmit power dynamically and antenna performance can be maximized according to the each scenario.

Figure 10:
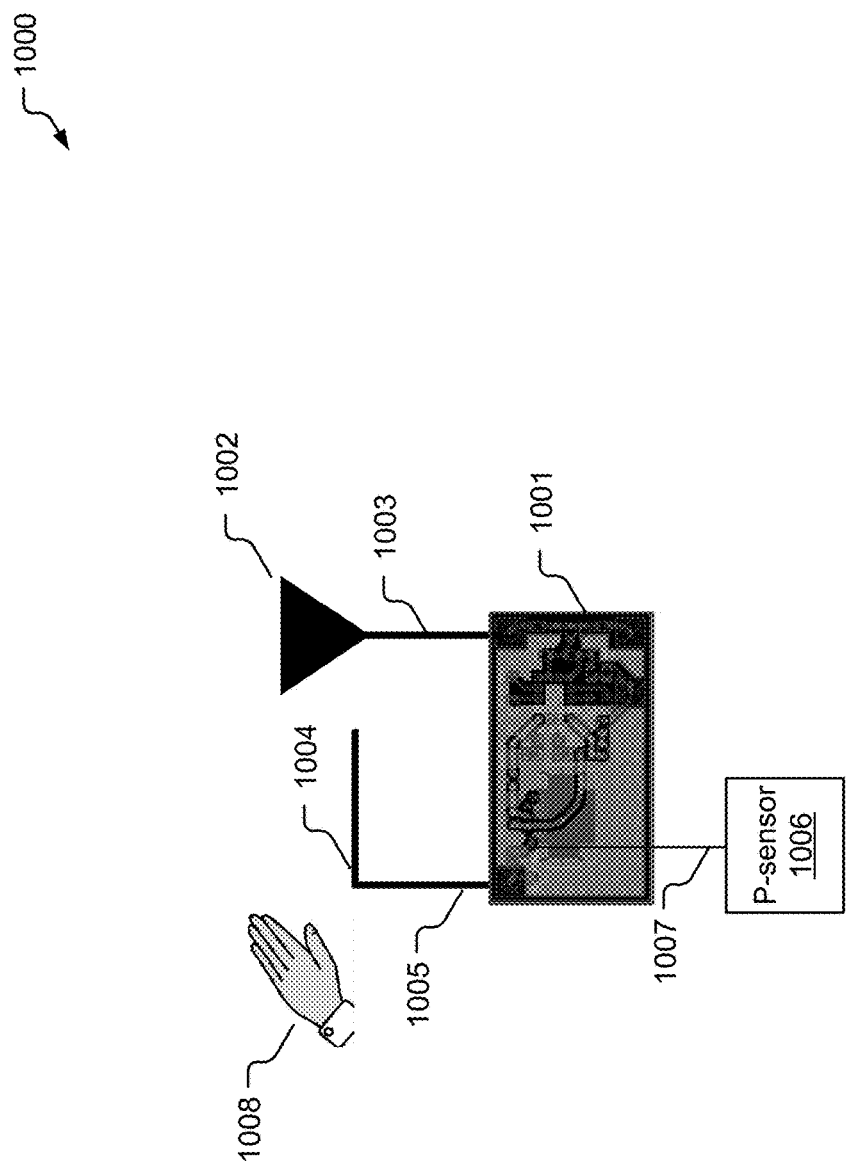
FIG. 10 is a block diagram of a proximity sensing subsystem utilizing a dielectrically coupled sensing element, the proximity sensing subsystem integrated into an antenna front end module according to an embodiment of the present disclosure.

FIG. 10 shows a proximity sensing subsystem utilizing a dielectrically coupled sensing element, the proximity sensing subsystem integrated into an antenna front end module according to an embodiment of the present disclosure. Proximity sensing subsystem 1000 includes RF module 1001, antenna 1002, interconnect 1003, proximity sensing probe 1004, interconnect 1005, P-sensor routing path 1006, and interconnect 1007. Proximity sensing subsystem 1000 provides integration of a sensing channel into RF module 1001. The integrated sensing channel allows a proximity sensing probe signal from proximity sensing probe 1004 to be sent via interconnect 1005 to RF module 1001, which provides an output via interconnect 1007 to P-sensor routing path 1006. As an example, P-sensor routing path 1006 can be connected to a P-sensor IC on a motherboard of the information handling system. By integrating a P-sensor wire into the RF module, the need for an additional coaxial cable for P-sensor path routing can be avoided, simplifying manufacturing and reducing cost. The integration of the sensing channel into RF module 1001 can avoid losses of discrete techniques for coupling a P-sensor input to an antenna environment and can simplify the installation of proximity sensing capability along with the RF module and its antenna subsystem. In the example illustrated in FIG. 10, a radiative coupling can be used in relation to proximity sensing probe 1004 and antenna 1002.

Figure 11:
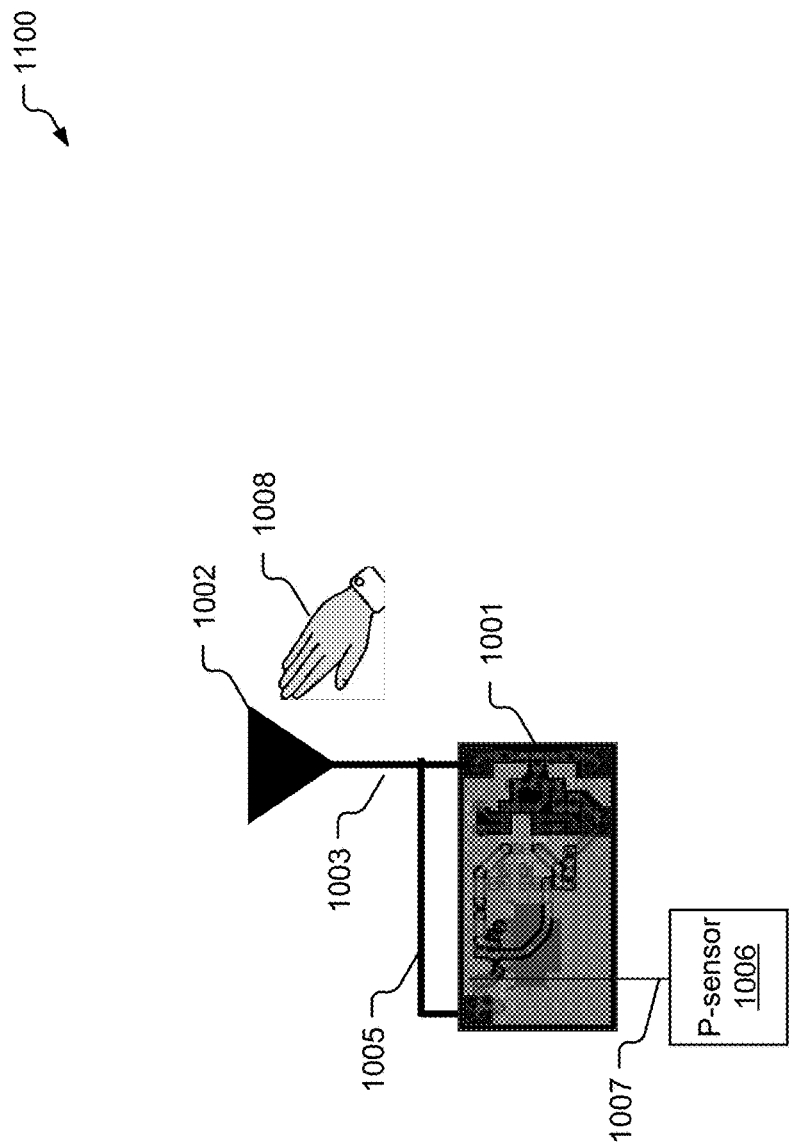
FIG. 11 is a block diagram of a proximity sensing subsystem utilizing a conductively coupled sensing element, the proximity sensing subsystem integrated into an antenna front end module according to an embodiment of the present disclosure.

FIG. 11 shows a block diagram of a proximity sensing subsystem utilizing a conductively coupled sensing element, the proximity sensing subsystem integrated into an antenna front end module according to an embodiment of the present disclosure. Proximity sensing subsystem 1100 includes RF module 1101, antenna 1102, interconnect 1103, interconnect 1105, P-sensor routing path 1106, and interconnect 1107. Proximity sensing subsystem 1100 provides integration of a sensing channel into RF module 1101. The integrated sensing channel allows a proximity sensing probe signal from antenna 1102 to be sent conductively via interconnect 1105 to RF module 1101, which provides an output via interconnect 1107 to P-sensor routing path 1106. As an example, P-sensor routing path 1106 can be connected to a P-sensor IC on a motherboard of the information handling system. By integrating a P-sensor wire into the RF module, the need for an additional coaxial cable for P-sensor path routing can be avoided, simplifying manufacturing and reducing cost. The integration of the sensing channel into RF module 1101 can avoid losses of discrete techniques for coupling a P-sensor input to an antenna environment and can simplify the installation of proximity sensing capability along with the RF module and its antenna subsystem. In the example illustrated in FIG. 11, a conductive coupling can be used in relation to antenna 1102.

Figure 12:
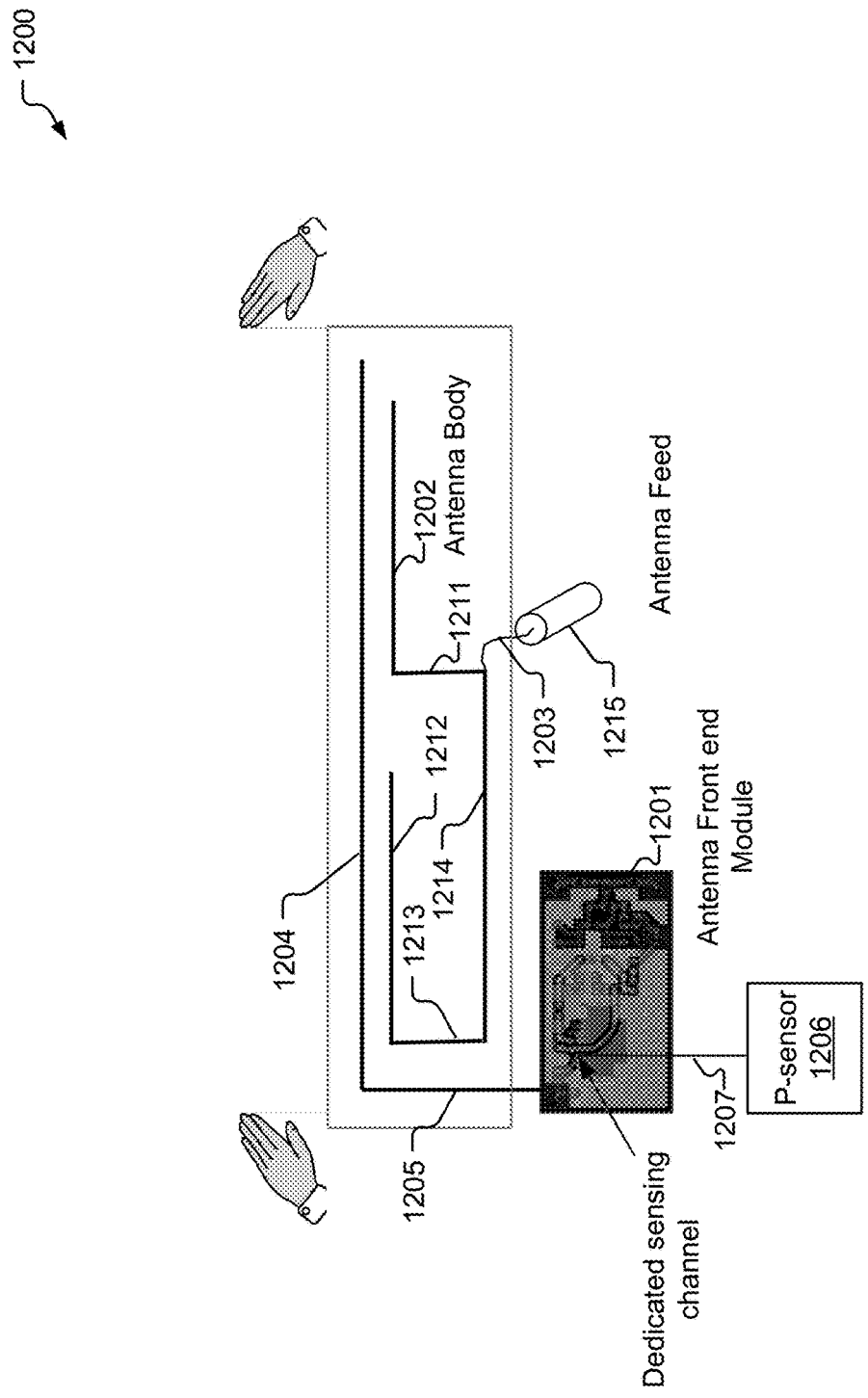
FIG. 12 is a block diagram of a proximity sensing subsystem integrated into an antenna front end module according to an embodiment of the present disclosure.

FIG. 12 shows a proximity sensing subsystem integrated into an antenna front end module according to an embodiment of the present disclosure. Proximity sensing subsystem 1200 includes RF module 1201, antenna element 1202, interconnect 1203, proximity sensing probe 1204, interconnect 1205, P-sensor routing path 1206, interconnect 1207, interconnect 1211, antenna element 1212, interconnect 1213, interconnect 1214, and antenna feed line 1215. Antenna feed line 1215 is connected to interconnect 1203, which is connected to interconnects 1211 and 1214. Interconnect 1211 is connected to antenna element 1202. Interconnect 1214 is connected to interconnect 1213, which is connected to antenna element 1212. Antenna elements 1202 and 1212 can work cooperatively as an array antenna to direct radiated RF energy. Proximity sensing subsystem 1200 provides integration of a sensing channel into RF module 1201. The integrated sensing channel allows a proximity sensing probe signal from proximity sensing probe 1204 to be sent via interconnect 1205 to RF module 1201, which provides an output via interconnect 1207 to P-sensor routing path 1206. As an example, P-sensor routing path 1206 can be connected to a P-sensor IC on a motherboard of the information handling system. By integrating a P-sensor wire into the RF module, the need for an additional coaxial cable for P-sensor path routing can be avoided, simplifying manufacturing and reducing cost. The integration of the sensing channel into RF module 1201 can avoid losses of discrete techniques for coupling a P-sensor input to an antenna environment and can simplify the installation of proximity sensing capability along with the RF module and its antenna subsystem. In the example illustrated in FIG. 12, a radiative coupling can be used in relation to proximity sensing probe 1204 and antenna elements 1202 and 1212.

In accordance with at least one embodiment, an apparatus and method for integration of proximity sensing circuitry within an antenna front end module is provided. In accordance with at least one embodiment, routing of circuitry of a proximity sensor is provided using an antenna front end module.

A specific absorption rate (SAR) is the rate at which RF energy is being absorbed by a human body and is governed by regulatory authorities around the world. Due to SAR regulatory requirements, when antennas are close to the human body during normal usage, a proximity sensor detects the presence of human interaction with the device near the antennas. When human presence is detected, power reduction is triggered in order to comply with SAR requirements. Integrating P-sensors in limited volumes with a cost effective solution without deteriorating antenna performance has become an increasing challenge.

Designing a dedicated sensing channel on an antenna front end module to act as an independent sensing channel or can be used for an integrated sensing channel independent of the feed matching network thereby reducing the additional mismatch losses from the added components.

In accordance with at least one embodiment, dual-functioning P-sensor architecture circuitry is integrated into an antenna front end module to be used in integrated or standalone implementation.

One approach has been to use an independent sensing element with some form of independent cabling. Another approach has been to have some form of impedance matched circuitry at the antenna feed in conjunction with the P-sensor circuitry.

Figure 13:
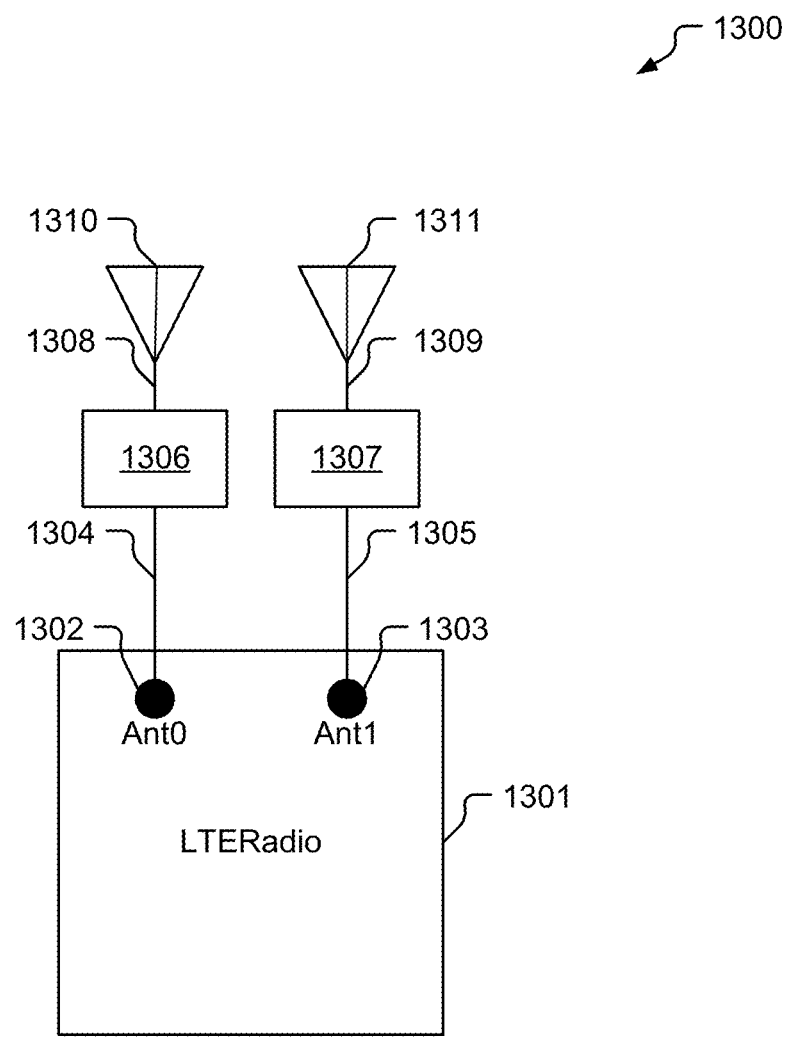
FIG. 13 is a block diagram of an apparatus for providing a dynamic transmit power boost using an antenna front end module according to an embodiment of the present disclosure.

FIG. 13 shows an apparatus for providing a dynamic transmit power boost using an antenna front end module according to an embodiment of the present disclosure. Apparatus 1300 includes RF module 1301, antenna port 1302, antenna port 1303, interconnect 1304, interconnect 1305, antenna connection detection circuit 1306, antenna connection detection circuit 1307, interconnection 1308, interconnection 1309, antenna 1310, and antenna 1311. RF module 1301 has antenna port 1302, which is connected to interconnect 1304, which is connected to antenna connection detection circuit 1306, which is connected to interconnection 1308, which is connected to antenna 1310. RF module 1301 has antenna port 1303, which is connected to interconnect 1305, which is connected to antenna connection detection circuit 1307, which is connected to interconnection 1309, which is connected to antenna 1311. Antenna connection detection circuit 1306 works cooperatively with RF module 1301 to electrically detect disconnection of the RF path from antenna 1310 to antenna port 1302. Antenna connection detection circuit 1307 works cooperatively with RF module 1301 to electrically detect disconnection of the RF path from antenna 1311 to antenna port 1303. As an example, one or both of antenna detection circuits 1306 and 1307 can apply a bias voltage to one or both of interconnects 1304 and 1305, respectively, and the presence or absence of that bias voltage at one or both of antenna ports 1302 and 1303, respectively, can be used to detect the presence or absence of an RF path between one or both of antennas 1310 and 1311, respectively.

Figure 14:
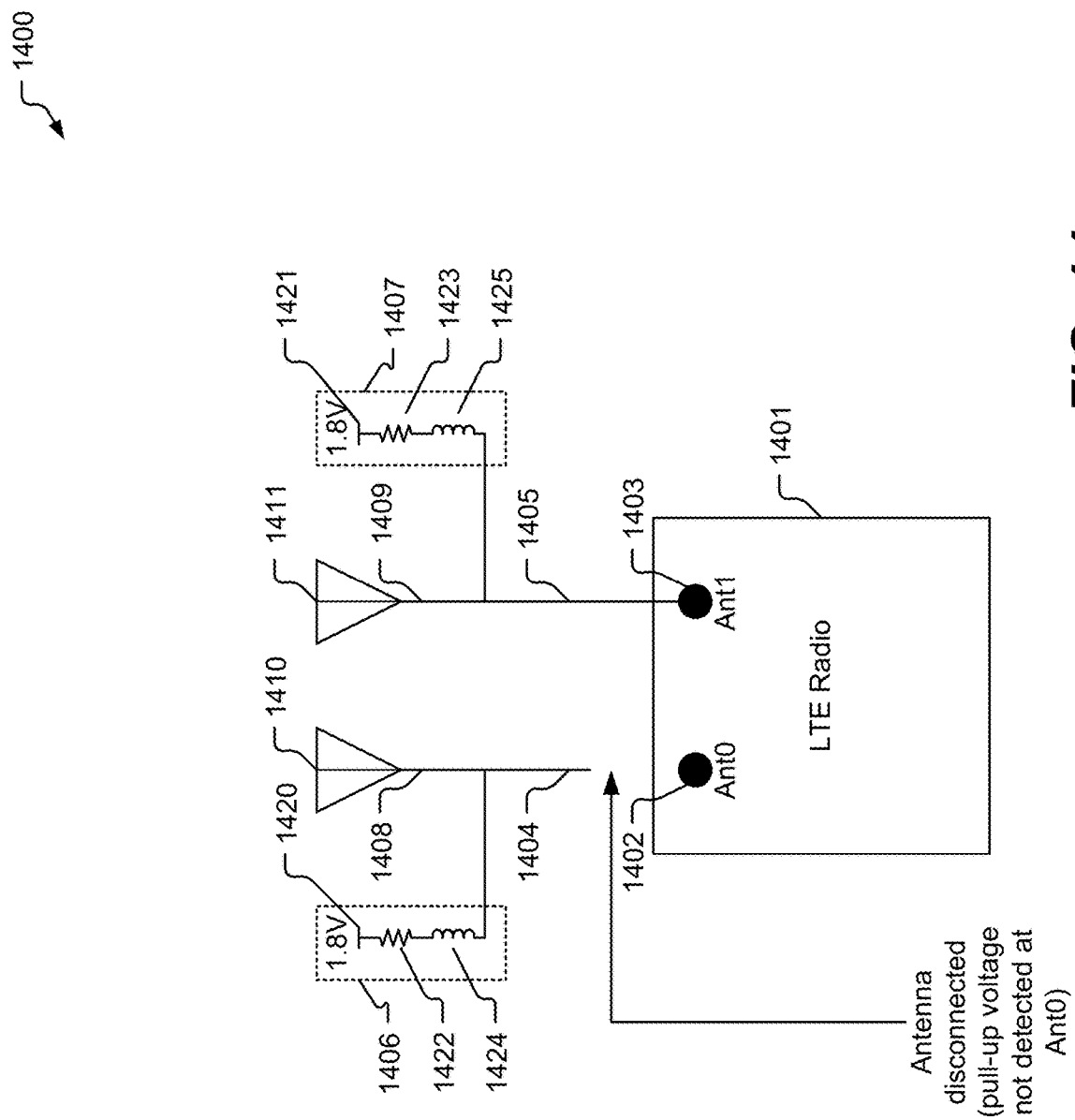
FIG. 14 is a block diagram of an apparatus for providing a dynamic transmit power boost using an antenna front end module with direct-current detection of a connected antenna according to an embodiment of the present disclosure.

FIG. 14 shows an apparatus for providing a dynamic transmit power boost using an antenna front end module with direct-current detection of a connected antenna according to an embodiment of the present disclosure. Apparatus 1400 includes RF module 1401, antenna port 1402, antenna port 1403, interconnect 1404, interconnect 1405, antenna connection detection circuit 1406, antenna connection detection circuit 1407, interconnection 1408, interconnection 1409, antenna 1410, antenna 1411, voltage source 1420, voltage source 1421, resistor 1422, resistor 1423, choke 1424, choke 1425, interconnect 1426, and interconnect 1427. RF module 1401 has antenna port 1402. Interconnect 1404, which would normally be connected to antenna port 1402, is shown as being disconnected from antenna port 1402. Interconnect 1404 is connected to interconnect 1408 and interconnect 1426. Interconnect 1408 is connected to antenna 1410. Interconnect 1426 is connected to choke 1424 of antenna connection detection circuit 1406. RF module 1401 has antenna port 1403, which is connected to interconnect 1405, which is connected to interconnect 1409 and interconnect 1427. Interconnect 1409 is connected to antenna 1411. Interconnect 1427 is connected to choke 1425 of antenna connection detection circuit 1407. Antenna connection detection circuit 1406 works cooperatively with RF module 1301 to electrically detect disconnection of the RF path from antenna 1410 to antenna port 1402. Antenna connection detection circuit 1407 works cooperatively with RF module 1401 to electrically detect disconnection of the RF path from antenna 1411 to antenna port 1403.

As an example, one or both of antenna detection circuits 1406 and 1407 can apply a bias voltage to one or both of interconnects 1404 and 1405, respectively, and the presence or absence of that bias voltage at one or both of antenna ports 1402 and 1403, respectively, can be used to detect the presence or absence of an RF path between one or both of antennas 1410 and 1411, respectively. Within antenna connection detection circuit 1406, voltage source 1420 is connected to a first end of resistor 1422. A second end of resistor 1422 is connected to a first end of choke 1424. A second end of choke 1424 is connected to interconnect 1426. Within antenna connection detection circuit 1407, voltage source 1421 is connected to a first end of resistor 1423.

A second end of resistor 1423 is connected to a first end of choke 1425. A second end of choke 1425 is connected to interconnect 1427. Voltage source 1420, as applied through resistor 1422 and choke 1424 to interconnect 1426, which is connected to interconnect 1404, pulls interconnect 1404 up to a pull-up voltage near the voltage of voltage source 1420, allowing that pull-up voltage, or the absence thereof, to be detected at antenna port 1402 of RF module 1401. Voltage source 1421, as applied through resistor 1423 and choke 1425 to interconnect 1427, which is connected to interconnect 1405, pulls interconnect 1405 up to a pull-up voltage near the voltage of voltage source 1421, allowing that pull-up voltage, or the absence thereof, to be detected at antenna port 1403 of RF module 1401.

In accordance with at least one embodiment, an apparatus and method for dynamic transmit power boost using an antenna front end module is provided. Device internal dimensions are becoming smaller and form factors are becoming thin, light and full aluminum or carbon fiber based materials, hence it is getting more challenging to ensure the best radiated performance can be achieved. Antenna designers and system designers desire every decibel (dB) allowable from a RF module to ensure the best system radiated performance can be maintained. Existing manufacturing solutions allow for relatively large tolerance variation for mass production following 3GPP specs (e.g., +/−2 dB) however if a batch of badly calibrated modules were to be distributed against the lower limits across the bands, this would severely impact the overall system performance of the finished products. Having to individually qualify all of the modules before they are assembled would be very costly and inefficient, so a superior solution is described below.

In accordance with at least one embodiment, communication protocol standards (such as 3GPP standards) for RF module conducted power should be maintained when the RF module is measured at a conducted level. However, RF module calibration files can be offset with a "positive" offset tolerance allowing more output transmit power when in radiated mode (e.g., normal user mode). In accordance with at least one embodiment, detection circuitry is provided to identify when the antenna is "disconnected" from the radio and the module operating under a conducted mode, as opposed to when the antenna is connected and module is operating under a radiated mode. By integrating the detection circuitry on the antenna front end module between the radio module RF port and the antenna port, detection of the presence or absence of an antenna can be provided without increasing a number of macroscopic physical components to be installed during manufacturing of an information handling system. The flexibility the detection circuitry provides overcomes a need to re-calibrate each module to maximum transmit power for critical devices. Such laborious attention to each module during the manufacturing process for performance critical tests was costly and inefficient and can be avoided by implementing the detection circuitry.

As another example, a pull-up circuit can be added on the module side (such as at or near the module) and a ground (GND) circuit can be added on antenna side (such as at or near the antenna or along the transmission line leading to the antenna). A voltage applied as on the module side could be detected as a high logic level when the antenna is not connected and detected as a low logic level when the antenna is connected and the voltage at the node is pulled to ground by the ground circuit. As an example, an RF choke may be used in the ground circuit to pull the node to ground at direct current (DC) while not loading the node at RF.

Figure 15:
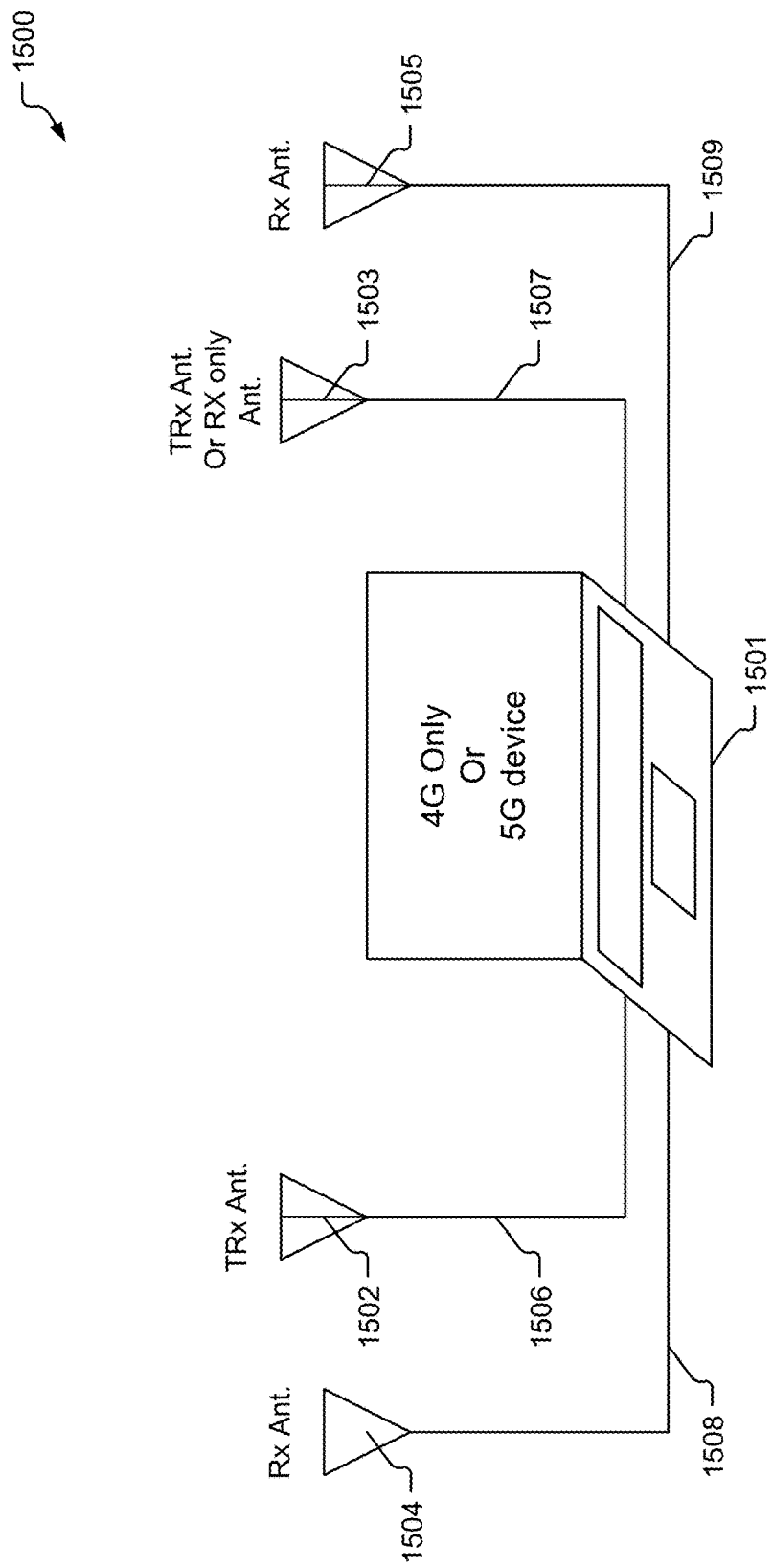
FIG. 15 is a block diagram of an apparatus for providing a unified antenna system architecture supporting multiple generations of radio modems according to an embodiment of the present disclosure.

FIG. 15 shows an apparatus for providing a unified antenna system architecture supporting multiple generations of radio modems according to an embodiment of the present disclosure. Apparatus 1500 includes information handling system 1501 having multiple antennas, including at least one transmit and receive (transceive) antenna and at least one receive-only antenna. Transmit and receive antenna 1502 is coupled to information handling system 1501 via interconnect 1506. Antenna 1503, which may be a transmit and receive antenna or a receive-only antenna, is coupled to information handling system 1501 via interconnect 1507. Receive-only antenna 1504 is coupled to information handling system 1501 via interconnect 1508. Receive-only antenna 1505 is coupled to information handling system 1501 via interconnect 1509. The same antenna configuration can be used for multiple generations (e.g., 4G and 5G) of cellular modems. Each antenna can be usable for any of the multiple generations of cellular modems.

Figure 16:
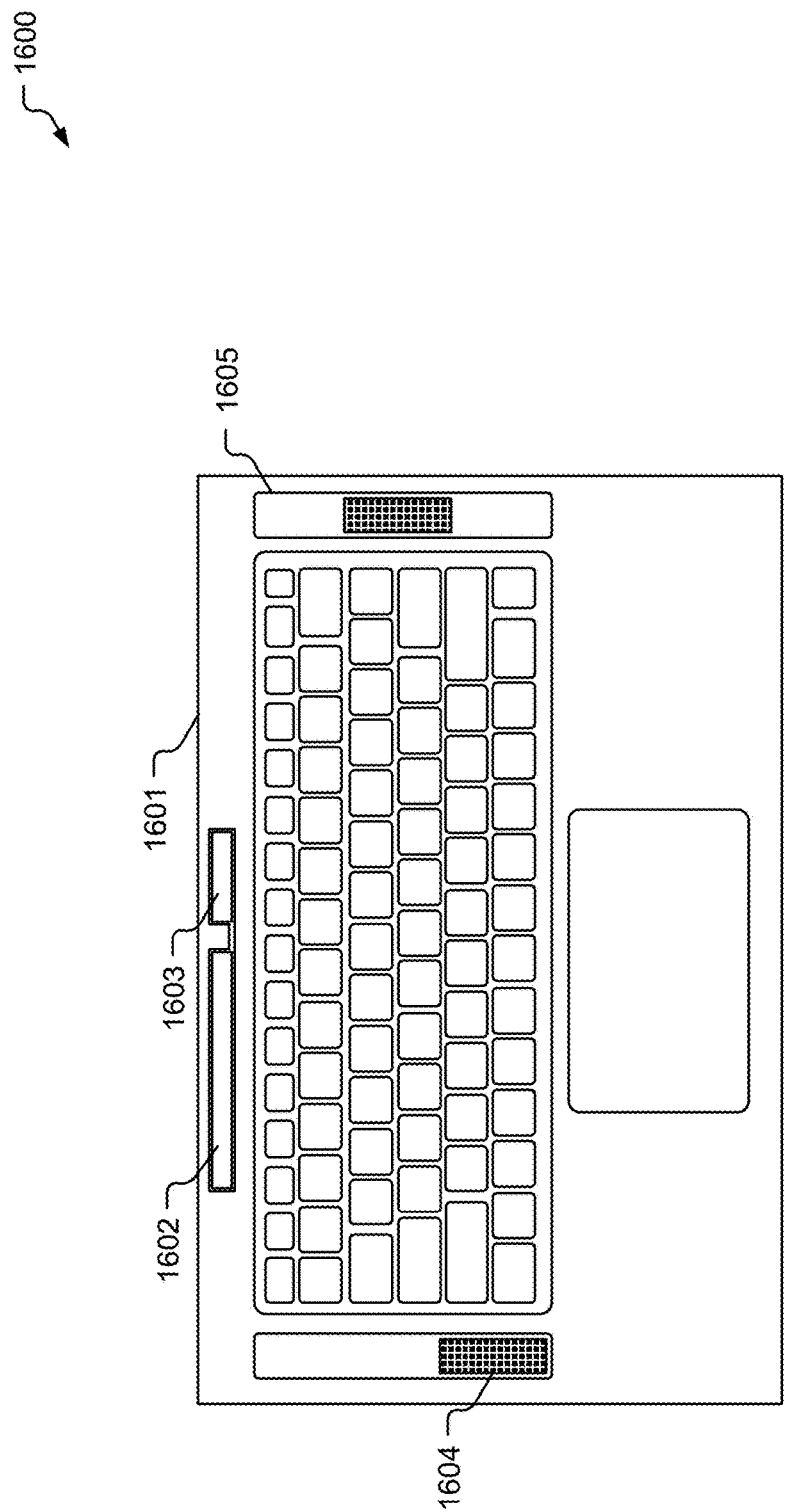
FIG. 16 is a plan view diagram of an apparatus for providing a unified antenna system architecture supporting multiple generations of radio modems according to an embodiment of the present disclosure.

FIG. 16 shows an apparatus for providing a unified antenna system architecture supporting multiple generations of radio modems according to an embodiment of the present disclosure. Apparatus 1600 includes information handling system 1601, main antenna 1602, multiple-input-multiple-output (MIMO) 2 antenna 1603, MIMO 3 antenna 1604, and auxiliary antenna 1605. As an example for use with a 4G cellular modem, main antenna 1603 can serve as a transmit and receive antenna over a wide range of RF bands, such as a low band (LB), a mid band (MB), a high band (HB), and an ultra high band (UHB). MIMO 2 antenna 1603 can serve as a receive-only antenna for one or more bands, for example, for a MB and a HB. MIMO 3 antenna 1604 can serve as a receive-only antenna for one or more bands, for example, for a MB and a HB. Auxiliary antenna 1605 can serve as a receive-only antenna over a wide range of RF bands, for example, over a LB, a MB, a HB, a UHB, and a Global Positioning System (GPS) band. As an example for use with a 5G cellular modem, main antenna 1603 can serve as a transmit and receive antenna over a wide range of RF bands, such as a LB, a MB, a HB, a UHB, and a 5G new radio (NR) sub-6-GHz band. MIMO 2 antenna 1603 can serve as a transmit and receive antenna for one or more bands, for example, for a MB, a HB, and a 5G NR sub-6-GHz band. MIMO 3 antenna 1604 can serve as a receive-only antenna for one or more bands, for example, for a MB, a HB, and a 5G NR sub-6-GHz band. Auxiliary antenna 1605 can serve as a receive-only antenna over a wide range of RF bands, for example, over a LB, a MB, a HB, a UHB, a Global Positioning System (GPS) band, and a 5G NR sub-6-GHz band.

Figure 17:
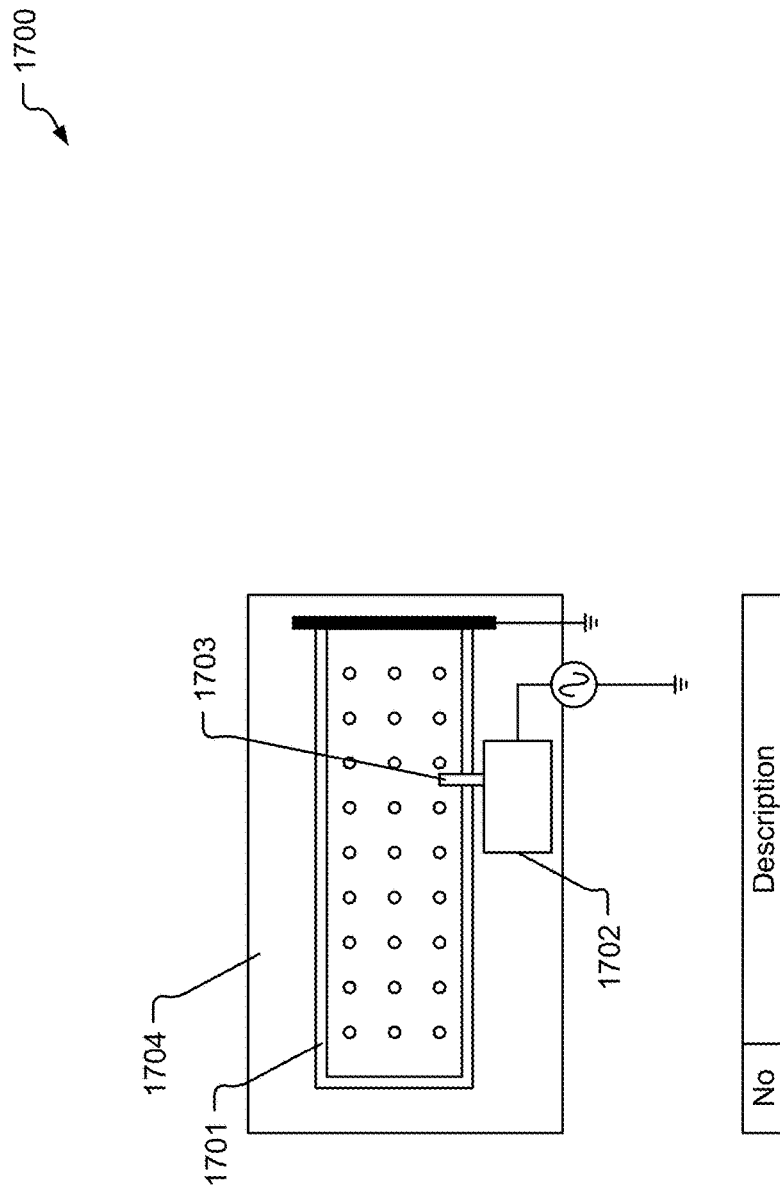
FIG. 17 is a plan view diagram of speaker grill antenna subsystem using a speaker grill as a radiating element according to an embodiment of the present disclosure.

FIG. 17 shows a speaker grill antenna subsystem using a speaker grill as a radiating element according to an embodiment of the present disclosure. Speaker grill antenna subsystem 1700 includes speaker grill antenna 1701, tunable module 1702, antenna feed line 1703, and ground plane 1704. A dielectric gap separates at least a portion of speaker grill antenna 1701 from ground plane 1704. Tunable module 1702 provides impedance matching for coupling a RF module to speaker grill antenna 1701 via antenna feed line. Speaker grill antenna 1701 allows a speaker grill to serve as a radiating element of speaker grill antenna subsystem 1700.

Figure 18:
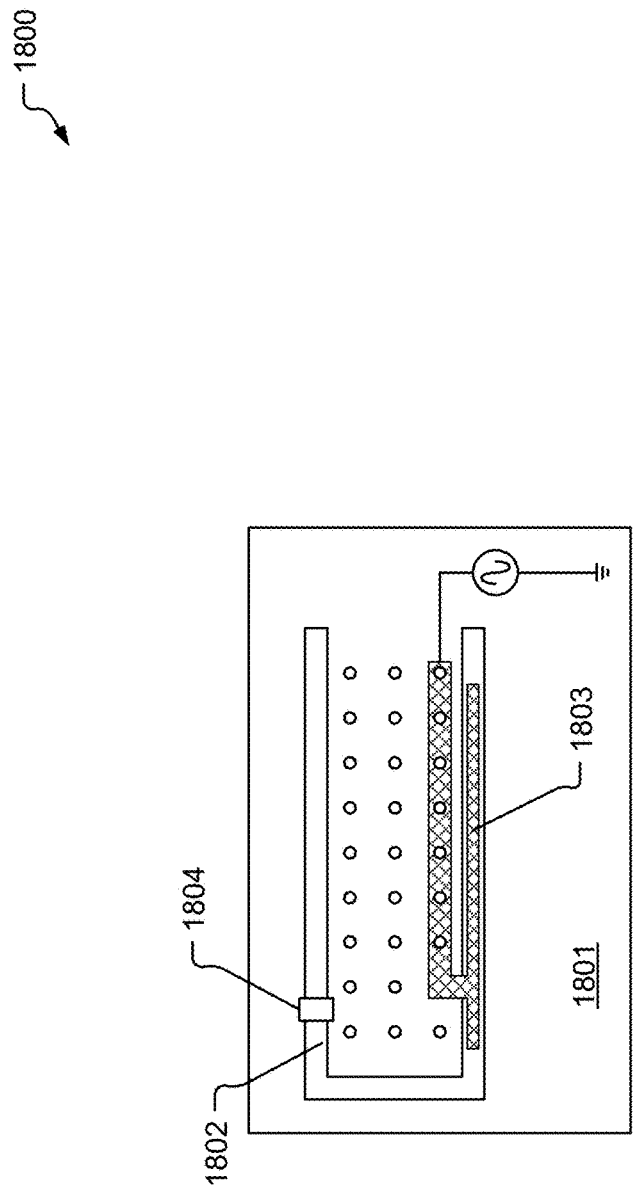
FIG. 18 is a is a plan view diagram of speaker grill antenna subsystem using a conformal antenna slot peripheral to a speaker grill according to an embodiment of the present disclosure.

FIG. 18 shows a speaker grill antenna subsystem using a conformal antenna slot peripheral to a speaker grill according to an embodiment of the present disclosure. Speaker grill antenna subsystem 1800 includes ground plane 1801, conformal antenna slot 1802, coupled radiating element feed 1803, and ground post 1804. A dielectric gap separates at least a portion of a conductive speaker grill from ground plane 1801. Ground plane 1801, the conductive speaker grill, and ground post 1804 define a slot antenna utilizing conformal antenna slot 1802 and coupled radiating element feed 1803. Conformal antenna slot 1802 may comprise a dielectric material. Coupled radiating element feed 1803 may comprise a conductive material. The position of ground post 1804 can tune conformal antenna slot 1802 to serve as a multi-mode slot. As an example, a multi-mode slot antenna can be used for communications in different bands of RF spectrum.

FIG. 19 shows a direct contact feed structure on the speaker grill with a tuner module according to an embodiment of the present disclosure. Information handling system 1900 includes antenna front-end module 1904, RF cable 1907, RF cable mount 1901, RF cable shield 1902, RF cable center conductor 1903, antenna feed line 1906, panel 1908, and speaker grill 1909. Antenna front-end module 1904 comprises tuner module 1905. RF cable 1907 connects a radio modem to tuner module 1905 via RF cable center conductor 1903 and RF cable shield 1902. Antenna feed line 1906 connects tuner module 1905 to panel 1908, which couples an RF signal to speaker grill 1909, which serves as an antenna.

Figure 20:
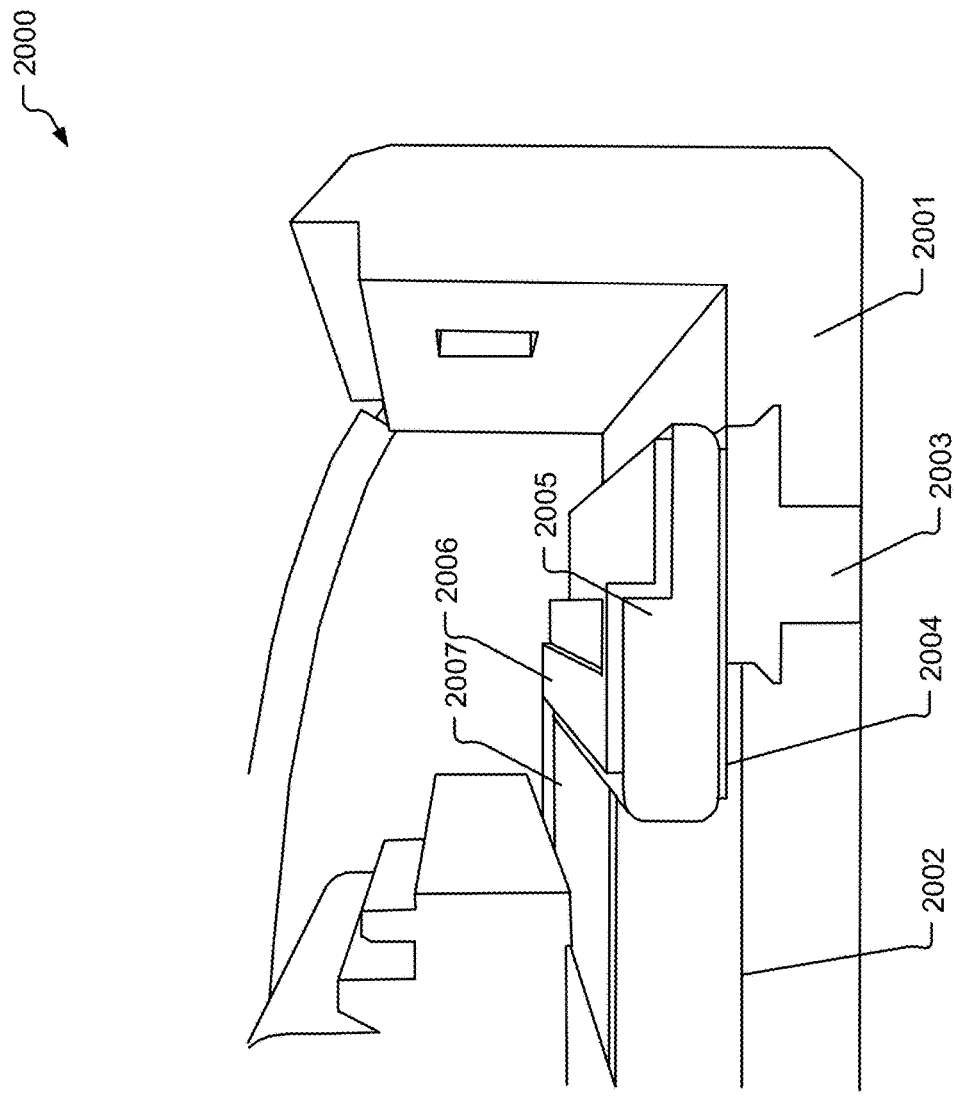
FIG. 20 is a prospective view diagram of a coupled feed structure on the speaker grill by using a laser direct structuring (LDS) antenna beneath speaker grill according to an embodiment of the present disclosure.

FIG. 20 shows a coupled feed structure on the speaker grill by using a laser direct structuring (LDS) antenna beneath speaker grill according to an embodiment of the present disclosure. Information handling system 2000 includes cover 2001, conductive plate 2004, dielectric material 2005, conductive coupling plate 2006, and antenna feed line 2007. Dielectric material 2003 is disposed within cover 2001. Dielectric material 2003 can serve, for example, as an antenna slot. Speaker grill 2002 is disposed within cover 2001. Conductive plate 2004 overlies a portion of speaker grill 2002 and dielectric material 2003. A RF signal can be coupled from antenna feed line 2007 to conductive coupling plate 2006, through dielectric material 2005, to conductive plate 2004, from which it can be radiated by speaker grill 2002 serving as an antenna or through dielectric material 2003 serving as an antenna slot. Thus, an effective antenna can be implemented even if cover 2001 is constructed of a RF shielding material, such as a metal.

Figure 21:
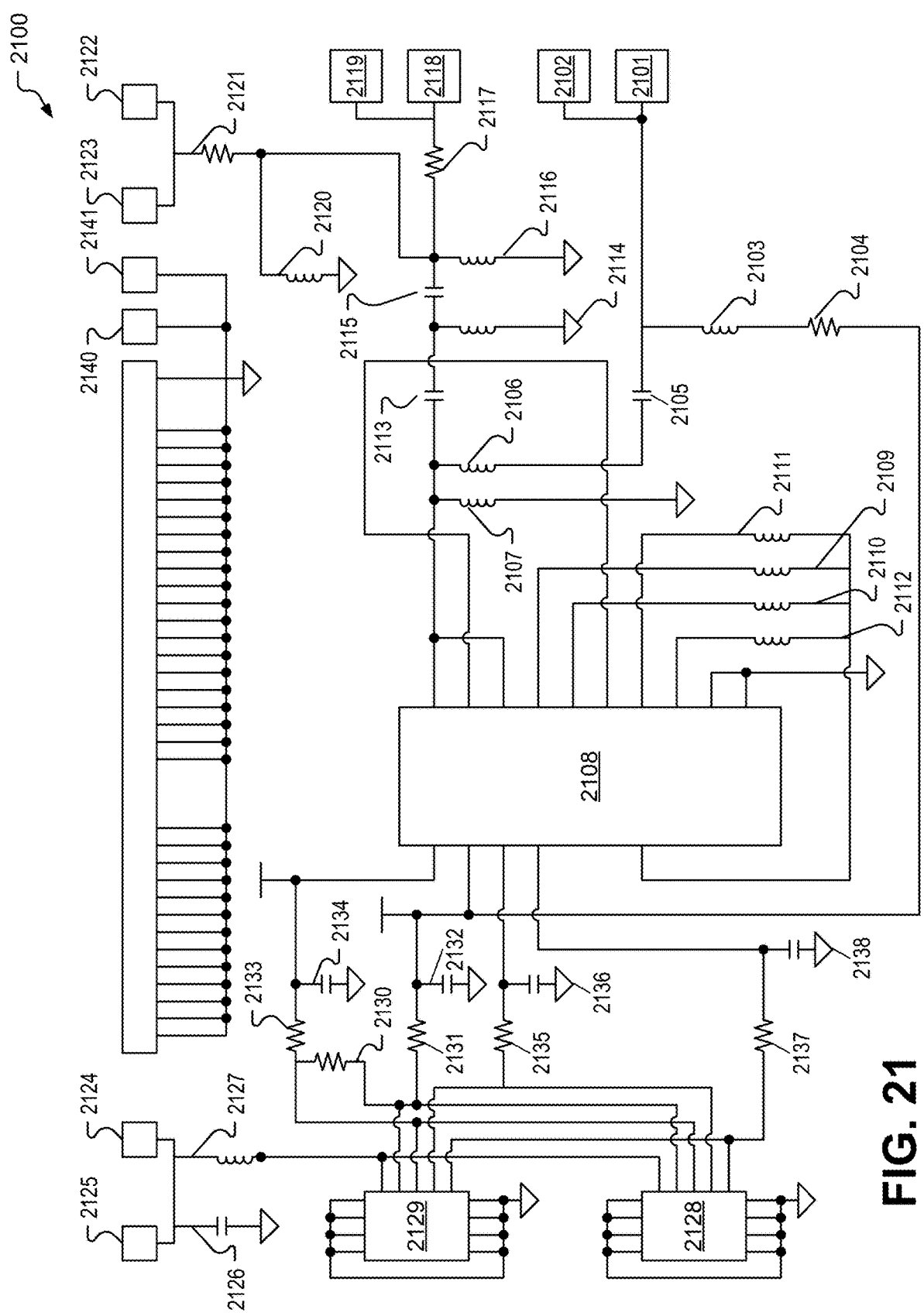
FIG. 21 is a schematic diagram of an antenna front-end module incorporating both a proximity sensor and a power boost capability according to an embodiment of the present disclosure.

FIG. 21 shows an antenna front-end module incorporating both a proximity sensor and a power boost capability according to an embodiment of the present disclosure. Antenna front-end module 2100 includes RF front-end IC 2108 and numerous passive components and connectors as described below. RF input connector 2101 is connected to RF input connector 2102, which are both connected to a first terminal of inductor 2103 and a first terminal of capacitor 2105. A second terminal of inductor 2103 is connected to a first terminal of resistor 2104. A second terminal of resistor 2104 is connected to a DC supply voltage, such as a 1.8V DC voltage. A second terminal of capacitor 2105 is connected to a first terminal of inductor 2016. A second terminal of inductor 2106 is connected to an input terminal of RF front-end IC 2108, to a switch terminal of RF front-end IC 2108, to a first terminal of inductor 2107, and to a first terminal of capacitor 2113.

A second terminal of inductor 2107 is connected to a reference voltage, such as a ground reference voltage. A second terminal of capacitor 2113 is connected to an output terminal of RF front-end IC 2108, to a switch terminal of RF front-end IC 2108, to a first terminal of inductor 2114, and to a first terminal of capacitor 2115. A second terminal of inductor 2114 is connected to a reference voltage, such as a ground reference voltage. A second terminal of capacitor 2115 is connected to a first terminal of inductor 2116, to a first terminal of inductor 2120, to a first terminal of resistor 2117, and to a first terminal of resistor 2121. A second terminal of inductor 2116 is connected to a reference voltage, such as a ground reference voltage. A second terminal of inductor 2120 is connected to a reference voltage, such as a ground reference voltage. A second terminal of resistor 2117 is connected to antenna connectors 2118 and 2119. A second terminal of resistor 2121 is connected to antenna connectors 2122 and 2123.

As an example, resistor 2117 can be a zero-ohm resistor serving as a jumper, allowing configuration to include or exclude antenna connectors 2118 and 2119 by the inclusion or omission, respectively, of resistor 2117 in the circuit. Accordingly, if antenna connectors 2118 and 2119 are to be connected to the circuit, resistor 2117 can be omitted and replaced by a continuous conductor. As an example, resistor 2121 can be a zero-ohm resistor serving as a jumper, allowing configuration to include or exclude antenna connectors 2122 and 2123 by the inclusion or omission, respectively, of resistor 2121 in the circuit. Accordingly, if antenna connectors 2122 and 2123 are to be connected to the circuit, resistor 2121 can be omitted and replaced by a continuous conductor. A switch connection of RF front-end module 2108 is connected to a first terminal of inductor 2109. A second terminal of inductor 2109 is connected to a reference voltage, such as a ground reference voltage.

A switch connection of RF front-end module 2108 is connected to a first terminal of inductor 2110. A second terminal of inductor 2110 is connected to a reference voltage, such as a ground reference voltage. A switch connection of RF front-end module 2108 is connected to a first terminal of inductor 2111. A second terminal of inductor 2111 is connected to a reference voltage, such as a ground reference voltage. A switch connection of RF front-end module 2108 is connected to a first terminal of inductor 2112. A second terminal of inductor 2112 is connected to a reference voltage, such as a ground reference voltage. One or more terminals of RF front-end module 2108 are connected to a reference voltage, such as a ground reference voltage. A terminal of RF front-end module 2108 is connected to a DC supply voltage, such as a 1.8V DC voltage. A terminal of RF front-end module 2108 is connected to a DC supply voltage, such as a 2.7V DC voltage.

Corner pad 2124 can be connected to a proximity sensing probe, which may be positioned in proximity to an antenna to detect proximity of a biological entity, such as human body. Corner pad 2125 can be connected to a proximity sensing probe, which may be positioned in proximity to an antenna to detect proximity of a biological entity, such as human body. Corner pad 2124 is connected to corner pad 2125, to a first terminal of capacitor 2126, and to a first terminal of inductor 2127. A second terminal of capacitor 2126 is connected to a reference voltage, such as a ground reference voltage. A second terminal of inductor 2127 is connected to a first terminal of P-sensor connector 2128 and to a first terminal of P-sensor connector 2129.

A second terminal of P-sensor connector 2128 and a second terminal of P-sensor connector 2129 are connected to a first terminal of resistor 2130 and to a first terminal of resistor 2133. A second terminal of resistor 2133 is connected to a DC supply voltage, such as a 2.7V DC voltage, and to a first terminal of capacitor 2134. A second terminal of capacitor 2134 is connected to a reference voltage, such as a ground reference voltage. A second terminal of resistor 2130 is connected to a third terminal of P-sensor connector 2129, to a third terminal of P-sensor connector 2130, and to a first terminal of resistor 2131. A second terminal of resistor 2131 is connected to a first terminal of capacitor 2132 and to a DC supply voltage, such as a 1.7V DC voltage.

A second terminal of capacitor 2132 is connected to a reference voltage, such as a ground reference voltage. A fourth terminal of P-sensor connector 2128 is connected to a fourth terminal of P-sensor connector 2129 and to a first terminal of resistor 2135. A second terminal of resistor 2135 is connected to a first terminal of capacitor 2136 and to a serial clock terminal (SCLK) of RF front-end module 2108. A second terminal of capacitor 2136 is connected to a reference voltage, such as a ground reference voltage. A fifth terminal of P-sensor connector 2128 is connected to a fifth terminal of P-sensor connector 2129 and to a first terminal of resistor 2137. A second terminal of resistor 2137 is connected to a first terminal of capacitor 2138 and to serial data terminal of RF front-end module 2108. A second end of capacitor 2138 is connected to a reference voltage, such as a ground reference voltage.

One or more terminals of P-sensor connector 2128 and one or more terminals of P-sensor connector 2129 may be connected to a reference voltage, such as a ground reference voltage. One or more terminals of connector 2139, test point 2140, and test point 2141 may be connected to a reference voltage, such as a ground reference voltage.

Figure 22:
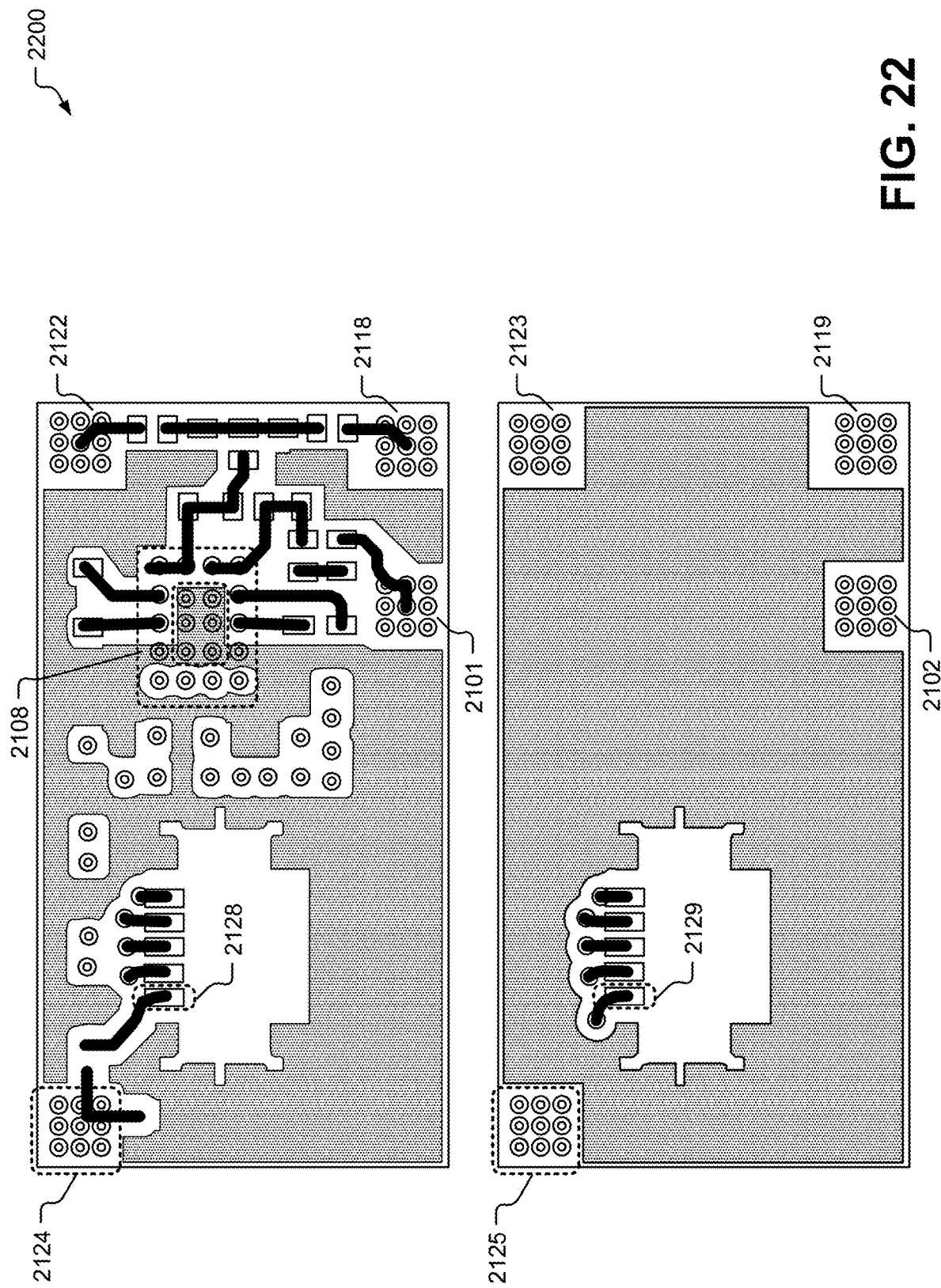
FIG. 22 is a plan diagram of a printed-circuit-board (PCB) layout for an antenna front-end module incorporating both a proximity sensor and a power boost capability according to an embodiment of the present disclosure.

FIG. 22 shows a printed-circuit-board (PCB) layout for an antenna front-end module incorporating both a proximity sensor and a power boost capability according to an embodiment of the present disclosure. Antenna front-end module 2200 is depicted as its PCB layout using reference numerals as set forth above in the description of its schematic diagram illustrated in FIG. 21.

Figure 23:
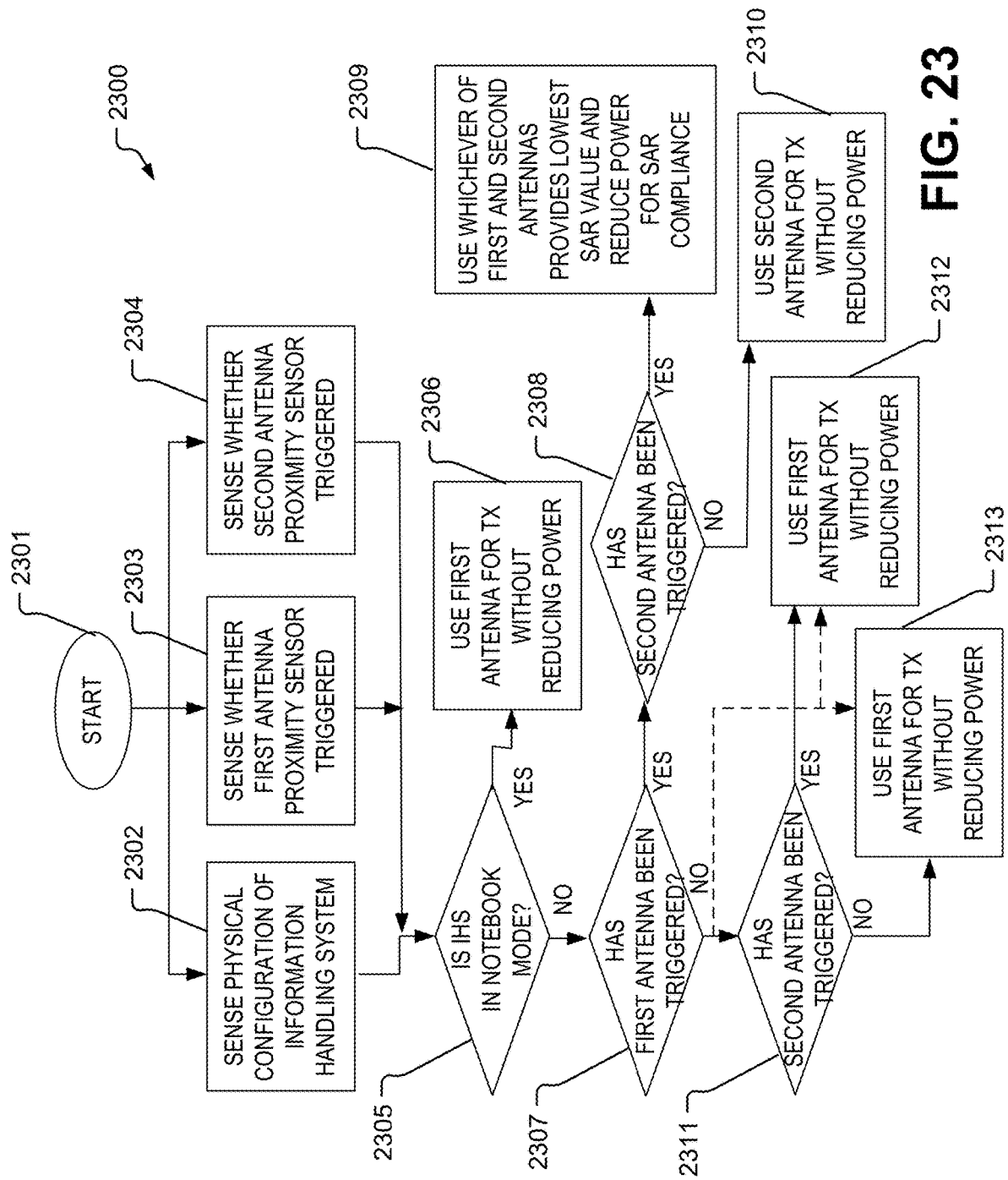
FIG. 23 is a flow diagram of a method for device-and-user-physical-configuration-responsive utilization of antennas according to an embodiment of the present disclosure.

FIG. 23 shows a method for device-and-user-physical-configuration-responsive utilization of antennas according to an embodiment of the present disclosure. As an example, the method of FIG. 23 may be beneficially applied for use with communication protocols, such as 4G cellular, where use of a single transmit antenna is sufficient. If SAR compliance would otherwise become problematic with a first antenna being used as a transmit antenna, the transmit signal can be redirected to a second antenna, for which SAR compliance can be maintained. Method 2300 begins at block 2301 and continues to blocks 2302, 2303, and 2304, which may be performed in parallel or in series. At block 2302, the physical configuration of an information handling system is sensed, for example, by receiving a physical configuration signal from an integrated sensor hub (ISH) or directly from a sensor such as a hinge position sensor, which may alternatively provide the signal via the ISH. At block 2303, sensing is performed as to whether or not a first antenna proximity sensor has been triggered, such as by the presence of a biological entity, for example, a human body proximate to the first antenna.

At block 2304, sensing is performed as to whether or not a second antenna proximity sensor has been triggered, such as by the presence of a biological entity, for example, a human body proximate to the second antenna. From blocks 2302, 2303, and 2304, method 2300 continues to decision block 2305. At decision block 2305, a decision is made, based on the sensing of block 2302, as to whether or not the information handling system (IHS) is in a notebook mode.

If so, method 2300 continues to block 2306. At block 2306, the first antenna is used for transmission without reducing transmit power. As an example, method 2300 may continue to block 2306 and use the first antenna as a transmit antenna at a full power level not adaptively reduced for SAR compliance whenever the IHS is in a notebook mode because a relationship of a human body to an IHS in notebook mode may be largely limited to a known pattern, such as placement of hands above a keyboard of the IHS. Such a well-established relationship of the human body to the IHS can be expected to keep the human body away from other areas of the IHS in the notebook mode. For example, if the first antenna is placed near the top edge (with the display panel in a substantially vertical orientation) of the display panel housing, it can be expected that the human body will not be near the first antenna during normal use in notebook mode. For other implementations, where use in the notebook mode may give rise to a wider spatial range of interactions with the human body relative to the IHS, block 2306 can be replaced by a conditional structure analogous to that shown in FIG. 23 by decision blocks 2307, 2308, 2311, and blocks 2309, 2310, 2312, and 2313. If, at decision block 2305, a decision is made that the IHS is not in a notebook mode (but, e.g., in a 360 mode), method 2300 continues to decision block 2307. At decision block 2307, a decision is made, based on the sensing of block 2303, as to whether or not the first antenna proximity sensor triggered. If so, method 2300 continues to decision block 2308. At decision block 2308, a decision is made, based on the sensing of block 2304, as to whether or not the second antenna proximity sensor is triggered. If so, method 2300 continues to block 2309.

At block 2309, the IHS is configured to use whichever of the first antenna and the second antenna provides the lowest SAR value and to reduce power for SAR compliance. If, at decision block 2308, a decision is made that the second antenna proximity sensor has not been triggered, method 2300 continues to block 2310. At block 2310, the IHS is configured to use the second antenna for transmission without reducing transmit power. If, at decision block 2307, a decision is made that the first antenna proximity sensor has not been triggered, method 2300 continues to decision block 2311. At decision block 2311, a decision is made, based on the sensing of block 2304, as to whether or not the second antenna has been triggered. If so, method 2300 continues to block 2312. At block 2312, the IHS is configured to use the first antenna for transmission without reducing transmit power. If, at decision block 2311, a decision is mode that the second antenna has not been triggered, method 2300 continues to block 2313. At block 2313, the IHS is configured to use the first antenna for transmission without reducing transmit power. In the example shown, blocks 2312 and 2313 are identical, in which case decision block 2311 can be omitted, and method 2300 can continue directly from the "no" branch of decision block 2307 to either of block 2312 or block 2313, as shown by a dashed line. In an example where blocks 2312 and 2313 are different, decision block 2311 can be provided and method 2300 can proceed along the solid lines.

Figure 24:
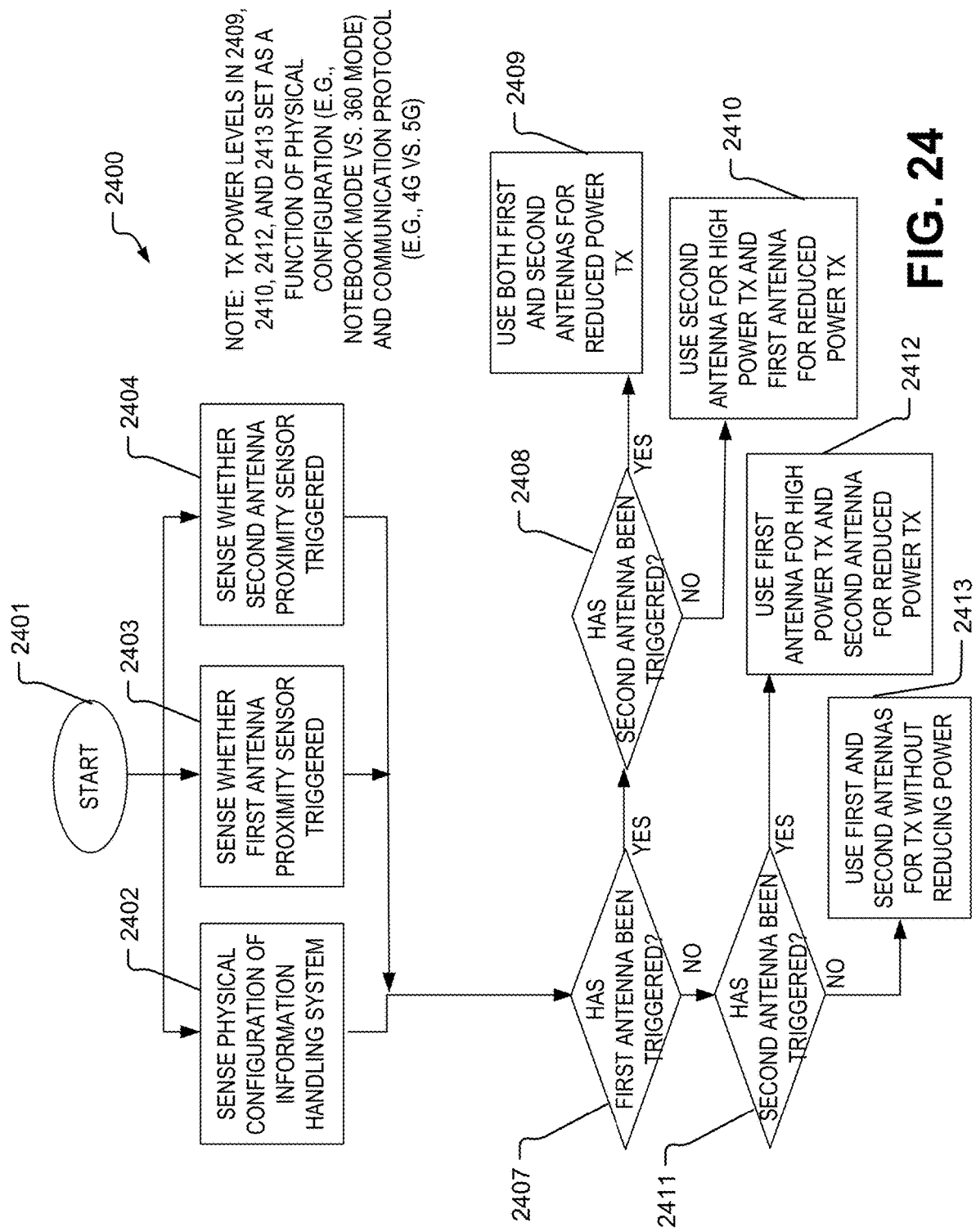
FIG. 24 is a flow diagram of a method for device-and-user-physical-configuration-responsive utilization of antennas according to an embodiment of the present disclosure.

FIG. 24 shows a method for device-and-user-physical-configuration-responsive utilization of antennas according to an embodiment of the present disclosure. As an example, the method of FIG. 24 may be beneficially applied for use with communication protocols, such as 5G cellular, where multiple transmit antennas are simultaneously employed. If SAR compliance would otherwise become problematic because of proximity of a human body to any of the transmit antennas, the levels of transmit signals applied to different ones of the transmit antennas can be individually adjusted to assure SAR compliance. Method 2400 begins at block 2401 and continues to blocks 2402, 2403, and 2404, which may be performed in parallel or in series. At block 2402, the physical configuration of an information handling system is sensed, for example, by receiving a physical configuration signal from an integrated sensor hub (ISH) or directly from a sensor such as a hinge position sensor, which may alternatively provide the signal via the ISH. At block 2403, sensing is performed as to whether or not a first antenna proximity sensor has been triggered, such as by the presence of a biological entity, for example, a human body proximate to the first antenna.

At block 2404, sensing is performed as to whether or not a second antenna proximity sensor has been triggered, such as by the presence of a biological entity, for example, a human body proximate to the second antenna. From blocks 2402, 2403, and 2404, method 2400 continues to decision block 2407. At decision block 2407, a decision is made, based on the sensing of block 2403, as to whether or not the first antenna proximity sensor triggered. If so, method 2400 continues to decision block 2408. At decision block 2408, a decision is made, based on the sensing of block 2404, as to whether or not the second antenna proximity sensor is triggered. If so, method 2400 continues to block 2409. At block 2409, the IHS is configured to use both the first antenna and the second antenna for reduced power transmission for SAR compliance. If, at decision block 2408, a decision is made that the second antenna proximity sensor has not been triggered, method 2400 continues to block 2410.

At block 2410, the IHS is configured to use the second antenna for high power transmission and to use the first antenna for reduced transmit power. If, at decision block 2407, a decision is made that the first antenna proximity sensor has not been triggered, method 2400 continues to decision block 2411. At decision block 2411, a decision is made, based on the sensing of block 2404, as to whether or not the second antenna has been triggered. If so, method 2400 continues to block 2412. At block 2412, the IHS is configured to use the first antenna for high power transmission and to use the second antenna for reduced transmit power. If, at decision block 2411, a decision is made that the second antenna has not been triggered, method 2400 continues to block 2413. At block 2413, the IHS is configured to use the first antenna and the second antenna for transmission without reducing transmit power.

Figure 25:
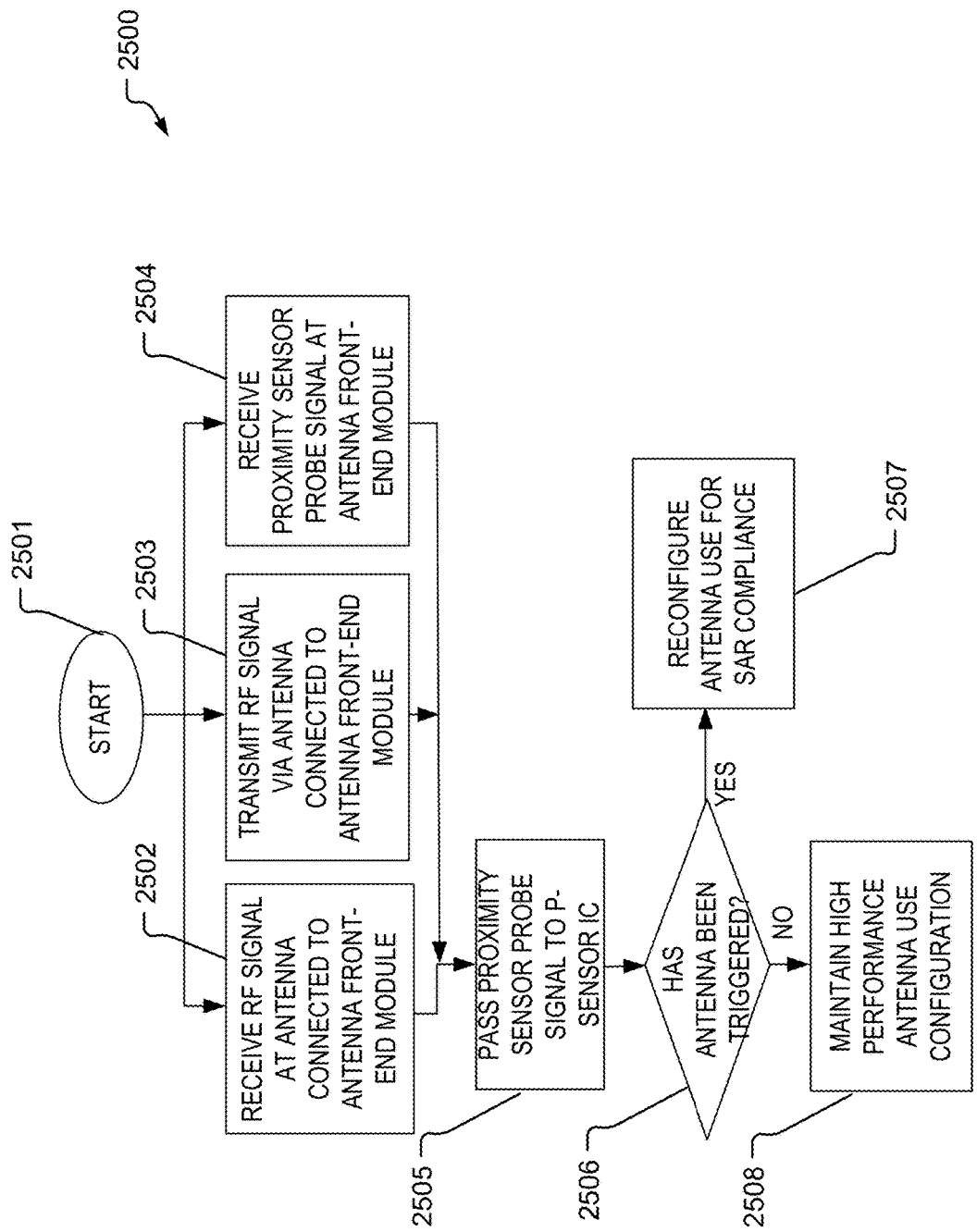
FIG. 25 is a flow diagram of a method of utilization of an antenna front-end module incorporating both a proximity sensor and a power boost capability according to an embodiment of the present disclosure.

FIG. 25 shows a method of utilization of an antenna front-end module incorporating both a proximity sensor and a power boost capability according to an embodiment of the present disclosure. As an example, the method of FIG. 25 may be beneficially applied for integration of a conductor for passage of a proximity sensor probe signal on the same antenna front-end module having a conductor for passage of a RF signal, such as a transmit signal, a receive signal, or a combined transmit and receive (transceive) signal. Such integration into the same antenna front-end module can simplify manufacturing of an IHS by avoiding a need for separate installation of structures to accommodate passage of the proximity sensor probe signal and the RF signal. Method 2500 begins at block 2501 and continues to blocks 2502, 2503, and 2504, which may be performed in parallel or in series. At block 2502, a receive RF signal is received at an antenna connected to the antenna front-end module. At block 2503, a transmit RF signal is transmitted at an antenna connected to the antenna front-end module. At block 2504, a proximity sensor probe signal is received at the antenna front-end module, as may be used to determine the presence of a biological entity, for example, a human body proximate to the antenna. From blocks 2502, 2503, and 2504, method 2500 continues to block 2505. At block 2505, the antenna front-end module passes the proximity sensor probe signal to a P-sensor IC. As an example, the P-sensor IC may be located on a motherboard of the IHS and the proximity sensor probe signal may be passed via a proximity sensor probe signal interconnected connected to the P-sensor IC. From block 2505, method 2500 continues to decision block 2506. At decision block 2506, a decision is made, based on the proximity sensor probe signal received at block 2504, as to whether or not the antenna proximity sensor has been triggered. If so, method 2500 continues to block 2507. At block 2507, the IHS is reconfigured to use the antenna for SAR compliance. If, at decision block 2506, a decision is made that the antenna proximity sensor has not been triggered, method 2500 continues to block 2508. At block 2508, the IHS maintains a high performance antenna use configuration.

Figure 26:
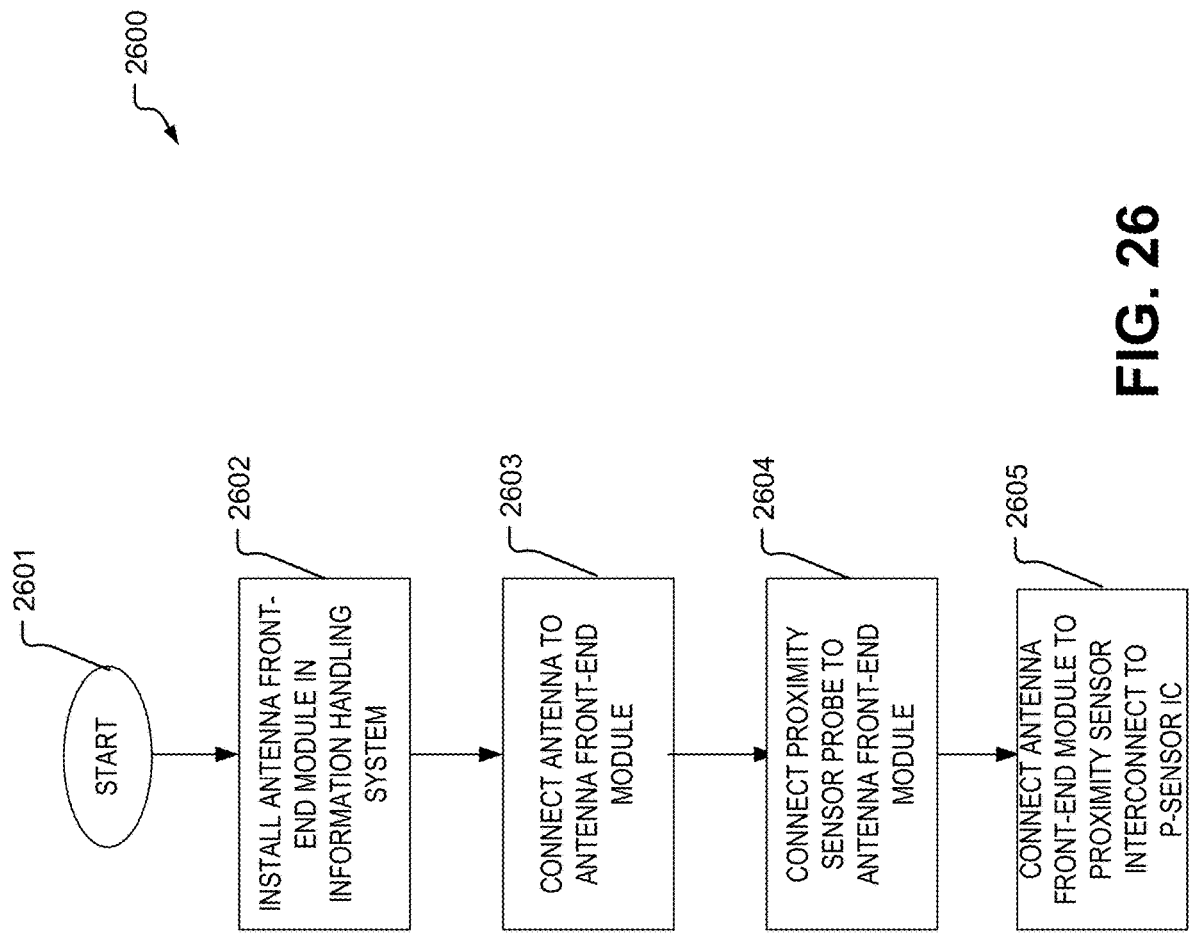
FIG. 26 is a flow diagram of installation of an antenna front-end module incorporating both a proximity sensor and a power boost capability according to an embodiment of the present disclosure.

FIG. 26 shows the installation of an antenna front-end module incorporating both a proximity sensor and a power boost capability according to an embodiment of the present disclosure. As an example, the method of FIG. 26 may be beneficially applied during manufacturing for integration of a conductor for passage of a proximity sensor probe signal on the same antenna front-end module having a conductor for passage of a RF signal, such as a transmit signal, a receive signal, or a combined transmit and receive (transceive) signal. Such integration into the same antenna front-end module can simplify manufacturing of an IHS by avoiding a need for separate installation of structures to accommodate passage of the proximity sensor probe signal and the RF signal. Method 2600 begins at block 2601 and continues to block 2602. At block 2602, an antenna front-end module is installed in an information handling system. From block 2602, method 2600 continues to block 2603. At block 2603, an antenna is connected to the antenna front-end module. From block 2603, method 2600 continues to block 2604. At block 2604, a proximity sensor probe is connected to the antenna front-end module. From block 2604, method 2600 continues to block 2605. At block 2605, the antenna front-end module is connected to a proximity sensor interconnect. The proximity sensor interconnect provides a path for a proximity sensor probe signal from the antenna front-end module to a P-sensor IC.

Figure 27:
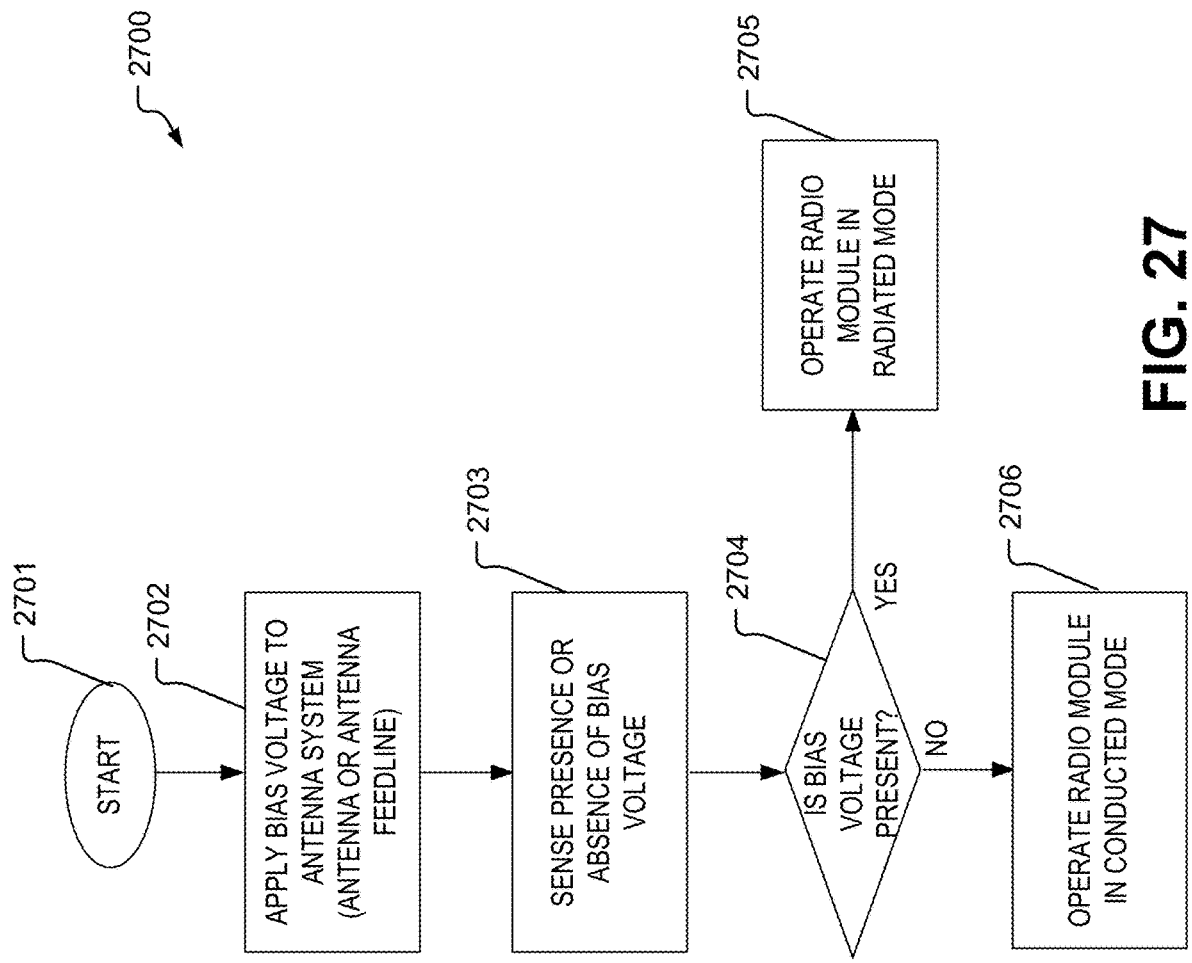
FIG. 27 is a flow diagram of a method for operating a radio module in a radiated mode or a conducted mode dependent upon a connection or disconnection, respectively, of an antenna according to an embodiment of the present disclosure.

FIG. 27 shows a method for operating a radio module in a radiated mode or a conducted mode dependent upon a connection or disconnection, respectively, of an antenna according to an embodiment of the present disclosure. As an example, the method of FIG. 27 may be beneficially applied to inform a RF module of the status of an antenna connected to (or disconnected from) the RF module for proper operation in a radiated mode or a conducted mode. Method 2700 begins at block 2701 and continues to block 2702. At block 2702, a bias voltage is applied to an antenna system, the antenna system comprising an antenna and an antenna feedline. From block 2702, method 2700 continues to block 2703. At block 2703, the presence or absence of the bias voltage is sensed. From block 2703, method 2700 continues to decision block 2704. At block decision block 2704, a decision is made, based on the sensing of block 2703, as to whether or not the bias voltage is present. If so, method 2700 continues to block 2705. At block 2705, a radio module is configured to be operated in a radiated mode. If, at decision block 2704, a decision is made that the bias voltage is not present, method 2700 continues to block 2706. At block 2706, the radio module is configured to be operated in a conducted mode.

In accordance with at least one embodiment, a unified antenna system architecture supporting modems for multiple communication systems (such as 4G and 5G) in the same single device. In accordance with at least one embodiment, a sharable antenna system is provided compatible with multiple communication systems (such as 4G and 5G). Some late generation (such as 5G) radio modules can be expensive due to the technology being at its infancy, which can significantly increase the product cost. Smartphone and PC original equipment manufacturers (OEMs) create 5G and 4G devices in their portfolio to tier the product offering today. However, the ability to offer both 4G and 5G modem variants in the same product has been difficult to achieve, as it requires significant product architecture, layout, chassis re-design, and other engineering work to assure compatibility. Creating a combined 4G and 5G product can drive significant development costs and resources to certify and ship the product to market.

To overcome the lack of a desired solution in the marketplace, a product is provided that can support both 4G and 5G modem variants inside the same device. In accordance with at least one embodiment, a unified front end antenna architecture is provided that is both forward and backward compatible, allowing swapping in and out 4G or 5G cards inside the information handling system enclosure, enabling tiering in the same device, rather than having to create separate devices. This allows development, certification, etc. to be efficiently performed for providing significant savings in non-recurring engineering (NRE) costs and enabling faster time to market of both variants in the same information handling system enclosure, while offering the marketing flexibility to provide a variety of products to meet particular customer desires.

In accordance with at least one embodiment, an information handling system providing a 360 mode of operation and supporting multiple radio communication protocols (such as both 4G and 5G) is provided. In accordance with at least one embodiment, a leveraged port and band mapping between 4G & 5G radios is provided for antenna control. As an example, a speaker grill can be used as 4G or 5G antenna or as both a 4G and 5G antenna, allowing a variety of product variants to share a form factor common to different tiers of the product variants. In accordance with at least one embodiment, a unified antenna front end module can be bonded to speaker grill, allowing tuning for communication frequencies, such as 4G or 5G frequencies. In accordance with at least one embodiment, a shared multiple (such as 4×4) antenna architecture supporting multiple transmit and receive configurations for multiple RF communication protocols (e.g., a single transmitter for 4G and a dual transmitter for 5G). In accordance with at least one embodiment, a dynamic power control mechanism is provided for 4G and 5G RF communication protocols and for notebook device mode (which can be referred to as 180 device mode) and 360 device mode, wherein such dynamic power control mechanism can be implemented inside the modem and configured by on-board system sensors and an EC.

In accordance with at least one embodiment, a unified antenna system architecture enables use of 4G/5G modems in the same device. As an example, the same set of antennas can be used for both 4G and 5G communication. In an example with four antennas, all four antennas can be configured to support both 4G and 5G, including 5G NR Sub 6 GHz. As an example, for 4G communication, a main antenna can be configured for transmission and reception on LB, MB, HB, and UHB bands, an auxiliary antenna can be configured for receive-only use on LB, MB, HB, UHB bands, and a global navigation satellite system (GNSS), such as the Global Positioning System (GPS), a MIMO antenna (MIMO2) can be configured for receive-only use on MB and HB bands, and another MIMO antenna (MIMO3) can be configured for receive-only use on MB and HB bands. As an example, for 5G communication, the main antenna can be configured for transmission and reception on LB, MB, HB, UHB, and 5G NR Sub 6 GHz bands, the auxiliary antenna can be configured for receive-only use on LB, MB, HB, UHB, GPS, and 5G NR Sub 6 GHz bands, the MIMO antenna MIMO2 can be configured for transmission and reception on MB, HB, and 5G NR Sub 6 GHz bands, and the MIMO antenna MIMO3 can be configured for receive-only use on MB, HB, and 5G NR Sub 6 GHz bands.

In a case where there are two transmit antennas transmitting power simultaneously both when an information handling system is in a notebook mode and when the information handling system is in a 360 mode, compliance with a SAR regulatory requirement can be difficult to achieve without significantly reducing transmit power, which can greatly reduce performance to an unsatisfactory level. A dynamic power reduction method responsive to a physical configuration of the information handling system (for example a notebook mode or a 360 mode) and a triggered mode of sensing proximity of a human body by using mode detection and P sensor can allow a RF module to provide transmit power efficiently and can minimize antenna performance sacrifice.

A power table, an example of which is illustrated herein, can indicate how much the RF module can transmit power in each scenario to meet a SAR regulatory requirement. The data to populate the power table can be obtained by testing one or more specimens of an information handling system with respect to a SAR phantom. As an example, while performing a legacy P-sensor trigger function, the RF module should transmit a maximum 10 dBm at any mode since the worst-case scenario (for example EN-DC in 360 mode) can be accommodated with power limited to 10 dBm. In accordance with at least one embodiment, by using a trigger circuit and method as described herein, the RF module can transmit power dynamically and antenna performance can be maximized according to the each scenario of physical configurations of the information handling system and proximity (or lack thereof) of a biological entity, such as a human body, to one or more antennas.

In accordance with at least one embodiment, a method comprises detecting a physical configuration of an information handling system; detecting the presence of an object proximate to a first antenna of the information handling system; and switching a transmit signal from the first antenna to a second antenna of the information handling system in response to the detecting the physical configuration and the detecting the presence of the object. In accordance with at least one embodiment, the physical configuration is, in a first state, a notebook mode, and, in a second state, a 360 mode. In accordance with at least one embodiment, the detecting the presence of an object comprises detecting the presence of a human body. In accordance with at least one embodiment, the switching the transmit signal comprises switching an antenna switch connected to the first antenna and to the second antenna. In accordance with at least one embodiment, the method further comprises producing an antenna selection signal according to a logical table, the logical table comprising data pertaining to the detecting the physical configuration and the detecting the presence of the object. In accordance with at least one embodiment, a physical configuration signal and a proximity sensor probe signal are processed by an enclosure controller, the enclosure controller providing control signals to a radio frequency (RF) module. In accordance with at least one embodiment, the method further comprises switching the transmit signal from the second antenna to the first antenna in response to a presence detection proximate to the second antenna.

In accordance with at least one embodiment, an information handling system (IHS) comprises a configuration sensor for sensing a physical configuration of the IHS; a first antenna; a proximity sensor for detecting the presence of an object proximate to the first antenna; an antenna switch configured to switch a transmit signal from the first antenna to a second antenna of the information handling system in response to the physical configuration and the presence of the object. In accordance with at least one embodiment, the physical configuration is, in a first state, a notebook mode, and in a second state, a 360 mode. In accordance with at least one embodiment, the detecting of the presence of the object is detecting of the presence of a human body. In accordance with at least one embodiment, the antenna switch is a double-pole double-throw (DPDT) antenna switch. In accordance with at least one embodiment, the IHS further comprises a memory configured to store a logical table, the logical table comprising data pertaining to the detection of the physical configuration and the detection of the presence of the object. In accordance with at least one embodiment, the IHS further comprises an enclosure controller (EC) configured to process a physical configuration signal and a proximity sensor probe signal and to provide control signals to a RF module. In accordance with at least one embodiment, the transmit signal is switched from the second antenna to the first antenna in response to a presence detection proximate to the second antenna.

In accordance with at least one embodiment, a method comprises detecting a physical configuration of an information handling system; detecting the presence of an object proximate to a first antenna of the information handling system; detecting the presence of an object proximate to a second antenna of the information handling system; and adjusting a first transmit signal of the first antenna and a second transmit signal of a second antenna of the information handling system in response to the detecting the physical configuration, the detecting the presence of the object proximate to the first antenna, and the detecting the presence of the object proximate to the second antenna. In accordance with at least one embodiment, the physical configuration is, in a first state, a notebook mode, and, in a second state, a 360 mode. In accordance with at least one embodiment, the detecting the presence of an object comprises detecting the presence of a human body. In accordance with at least one embodiment, the adjusting the first transmit signal comprises reducing the first transmit signal to assure SAR compliance. In accordance with at least one embodiment, the method further comprises adjusting the first transmit signal and the second transmit signal according to a logical table, the logical table comprising data pertaining to the detecting the physical configuration and the detecting the presence of the object. In accordance with at least one embodiment, the method further comprises reducing the second transmit signal to the second antenna in response to a presence detection proximate to the second antenna.

In accordance with at least one embodiment, an information handling system (IHS) comprises a configuration sensor for sensing a physical configuration of the IHS; a first antenna; a second antenna; a proximity sensor for detecting the presence of an object proximate to the first antenna; a RF module configured to adjust a first transmit signal to the first antenna and a second transmit signal to a second antenna in response to the physical configuration and the presence of the object. In accordance with at least one embodiment, the physical configuration is, in a first state, a notebook mode, and in a second state, a 360 mode. In accordance with at least one embodiment, the detecting of the presence of the object is detecting of the presence of a human body. In accordance with at least one embodiment, the adjusting comprises reducing the first transmit signal in response to detecting the presence of the object proximate to the first antenna and reducing the second transmit signal in response to detecting the presence of the object proximate to the second antenna. In accordance with at least one embodiment, the IHS further comprises a memory configured to store a logical table, the logical table comprising data pertaining to the detection of the physical configuration and the detection of the presence of the object. In accordance with at least one embodiment, the IHS further comprises an enclosure controller (EC) configured to process a physical configuration signal and a proximity sensor probe signal and to provide control signals to a RF module. In accordance with at least one embodiment, the first transmit signal and the second transmit signal are adjusted to assure SAR compliance.

In accordance with at least one embodiment, a method comprises receiving a first RF signal at an antenna connected to an antenna front-end module; transmitting a second RF signal at the antenna connected to the antenna front-end module; receiving a proximity sensor probe signal at the antenna front-end module, the proximity sensor probe signal from a proximity sensor probe located in proximity to the antenna; passing the proximity sensor probe signal to a P-sensor IC; determining whether or not the P-sensor has been triggered based on the proximity sensor probe signal; when the P-sensor has been triggered, reconfiguring antenna use for SAR compliance; and, when the P-sensor has not been triggered, maintaining a high performance antenna use configuration. In accordance with at least one embodiment, the antenna front-end module provides a unified common physical electrical substrate for an RF path to convey the first RF signal and the second RF signal and a proximity sensor probe signal path to convey the proximity sensor probe signal. In accordance with at least one embodiment, the proximity sensor probe signal is received at a proximity sensor probe connector of the antenna front-end module. In accordance with at least one embodiment, the P-sensor IC is located on an information handling system motherboard. In accordance with at least one embodiment, the antenna front-end module passes the proximity sensor probe signal to the P-sensor IC via an electrical interconnect. In accordance with at least one embodiment, the reconfiguring antenna use for SAR compliance comprises switching a RF transmit signal to be provided to a different antenna. In accordance with at least one embodiment, the reconfiguring the antenna use for SAR compliance comprises reducing a level of a RF transmit signal to be provided to the antenna.

In accordance with at least one embodiment, an information handling system (IHS) comprises an antenna; a proximity sensor probe; and an antenna front-end module, the antenna connected to the antenna front-end module, the antenna configured to receive and transmit RF signals, the proximity sensor probe connected to the antenna front-end module, the antenna front-end module configured to receive a proximity sensor probe signal from the proximity sensor probe, the antenna front-end module configured to pass the proximity sensor probe signal to a P-sensor IC, wherein, when the P-sensor IC has been triggered, antenna use is reconfigured for SAR compliance and, when the P-sensor IC has not been triggered, a high performance antenna use configuration is maintained. In accordance with at least one embodiment, the antenna front-end module provides a unified common physical electrical substrate for an RF path to convey the first RF signal and the second RF signal and a proximity sensor probe signal path to convey the proximity sensor probe signal. In accordance with at least one embodiment, the proximity sensor probe signal is received at a proximity sensor probe connector of the antenna front-end module. In accordance with at least one embodiment, the P-sensor IC is located on an information handling system motherboard. In accordance with at least one embodiment, the antenna front-end module passes the proximity sensor probe signal to the P-sensor IC via an electrical interconnect. In accordance with at least one embodiment, the reconfiguring antenna use for SAR compliance comprises switching a RF transmit signal to be provided to a different antenna. In accordance with at least one embodiment, the reconfiguring the antenna use for SAR compliance comprises reducing a level of a RF transmit signal to be provided to the antenna.

In accordance with at least one embodiment, a method comprises installing an antenna front-end module in an information handling system; connecting an antenna to the antenna front-end module; connecting a proximity sensor probe to the antenna front-end module; and connecting the antenna front-end module to a proximity sensor interconnect, the proximity sensor interconnect connected to a P-sensor IC.

In accordance with at least one embodiment, a method comprises applying a bias voltage to an antenna system, the antenna system comprising an antenna and an antenna feed line; sensing a presence of the bias voltage; when the bias voltage is sensed to be present, operating a radio module connected to the antenna system in a radiated mode; and when the bias voltage is sensed to be absent, operating the radio module connected to the antenna in a conducted mode. In accordance with at least one embodiment, the bias voltage is applied through a resistor. In accordance with at least one embodiment, the bias voltage is applied through an inductor. In accordance with at least one embodiment, the bias voltage is applied through a resistor and an inductor. In accordance with at least one embodiment, the method further comprises operating the radio module with a positive offset of RF signal power when in the radiated mode. In accordance with at least one embodiment, the method further comprises storing a positive offset value corresponding to the positive offset of RF signal power in a memory device. In accordance with at least one embodiment, the positive offset value corresponds to a permissible radiated power level.

In accordance with at least one embodiment, an information handling system (IHS) comprises an antenna system, the antenna system comprising an antenna and an antenna feed line; a bias voltage circuit connected to the antenna system, the bias voltage circuit configured to apply a bias voltage; and a bias voltage sensing circuit, the bias voltage sensing circuit configured to sense a presence of the bias voltage, in which case a radio module is operated in a radiated mode, and to sense an absence of the bias voltage, in which case the radio module is operated in a conducted mode.

In accordance with at least one embodiment, a method comprises applying a bias voltage to a radio module so as to provide the bias voltage at an antenna system connector of the antenna system; grounding the bias voltage in the antenna system, the antenna system comprising an antenna and an antenna feed line; sensing a presence of the bias voltage; when the bias voltage is sensed to be present, operating a radio module connected to the antenna system in a radiated mode; sensing the absence of the bias voltage; and, when the bias voltage is sensed to be absent, operating the radio module connected to the antenna in a conducted mode. In accordance with at least one embodiment, the bias voltage is applied through a resistor. In accordance with at least one embodiment, the bias voltage is applied through an inductor. In accordance with at least one embodiment, the bias voltage is applied through a resistor and an inductor. In accordance with at least one embodiment, the method further comprises operating the radio module with a positive offset of RF signal power when in the radiated mode. In accordance with at least one embodiment, the method further comprises storing a positive offset value corresponding to the positive offset of RF signal power in a memory device. In accordance with at least one embodiment, the positive offset value corresponds to a permissible radiated power level.

Proximity Sensing Using an Antenna Front-End Module

In accordance with at least one embodiment, a tunable wireless wide-area network (WWAN) antenna solution is implemented to provide an antenna front-end module hosting an antenna tuner integrated circuit (IC), with matching and bypass discrete components to aid with antenna tuning. These front-end modules can be integrated into an antenna system. This integrated antenna system including the antenna front-end module can be used as a sensing element for a proximity sensor. An integrated antenna system comprising such an antenna front-end module can, for example, replace a stand-alone metallic patch, such as a copper patch. In accordance with at least one embodiment, a dedicated sensing channel can be provided on an antenna front-end module to act as an independent sensing channel independent of an antenna tuning circuit, which can comprise a feed matching network, thereby reducing the additional mismatch losses from the added components.

The dedicated sensing channel can be used for an integrated sensing channel to sense the capacitance of the entire antenna front end module feeding into the proximity-sensor IC. Such an integrated solution effectively re-uses antenna volume while packaging the sensing channel into the tuner module. Further, the sensing channel triggers a notification to an onboard system enclosure controller (EC) when a human presence detected, and the EC can then relay the information to a WWAN radio associated with the antenna. The WWAN radio can then determine the appropriate tuning voltages to compensate for performance loss due to human presence and provide tuning of the tuner module via a mobile industry processor interface (MIPI) to alter the antenna tuning to adapt to human presence. Such a technique can provide a complete loop-back solution in which the antenna tuner module is able to integrate two functions into it, one being antenna tuning and other being the human detection, and is able to tie those two functions together responsively to optimize the overall system performance.

Figure 28:
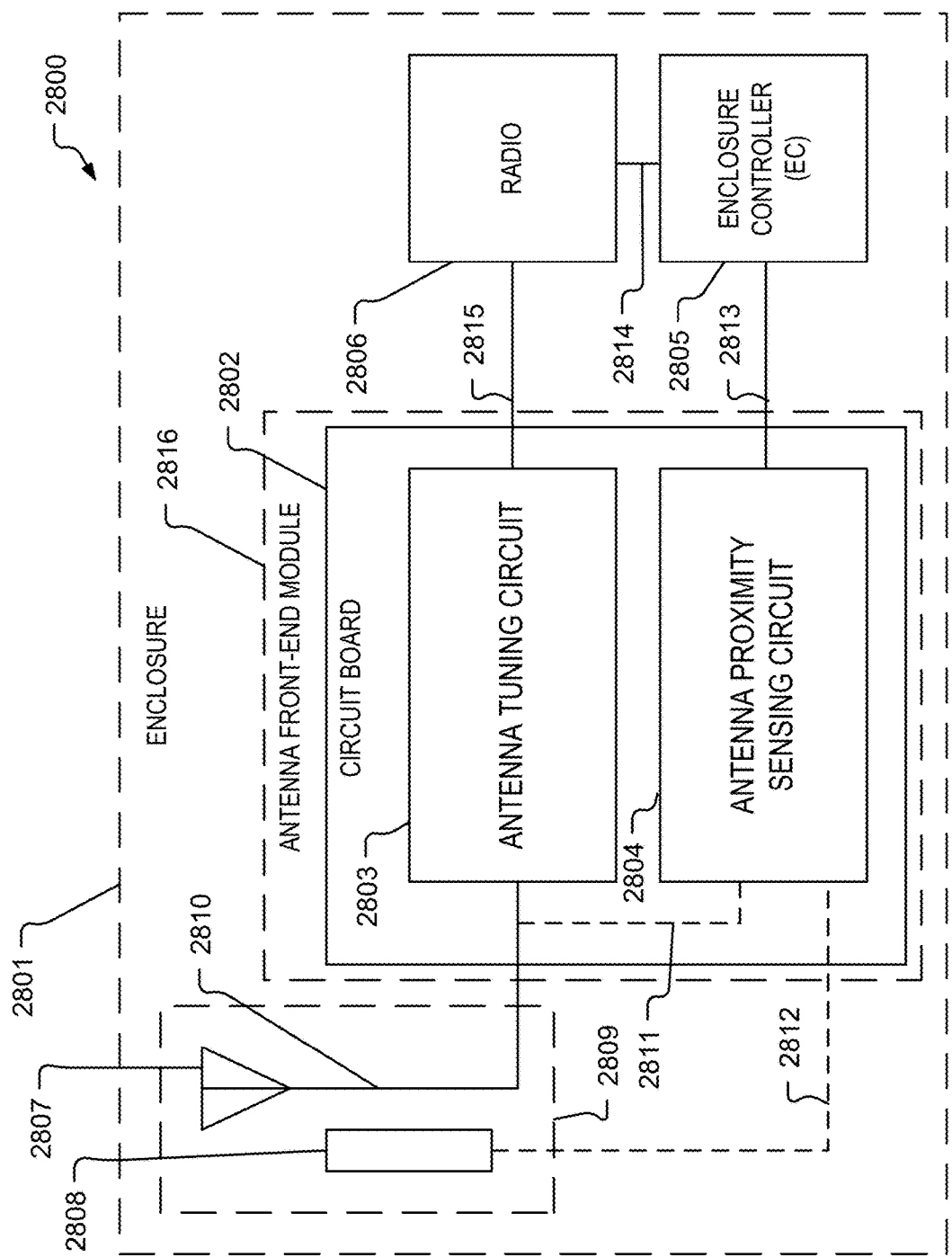
FIG. 28 is a block diagram of an information handling system comprising an antenna front-end module according to an embodiment of the present disclosure.

FIG. 28 shows an information handling system comprising an antenna front-end module according to an embodiment of the present disclosure. Information handling system 2800 comprises circuit board 2802. Circuit board 2802 comprises antenna tuning circuit 2803 and antenna proximity sensing circuit 2804. Information handling system 2800 can also comprise enclosure controller 2805. Information handling system 2800 can also comprise radio 2806. Information handling system 2800 can also comprise enclosure 2801. Information handling system 2800 can also comprise antenna 2807. Information handling system 2800 can also comprise proximity sensing element 2808. Proximity sensing element 2808 can be located within an antenna volume 2809 of antenna 2807. Proximity sensing element 2808 can be located partially or fully outside of antenna volume 2809.

Enclosure controller 2805 is located within enclosure 2801 and controls components within enclosure 2801. Circuit board 2802 is located within enclosure 2801. Radio 2806 may be a WWAN radio, such as a LTE radio. Radio 2806 may be capable of fourth-generation (4G) cellular communication. Radio 2806 may be capable of fifth-generation (5G) cellular communication. As an example, radio 2806 may be an Evolved-Universal Mobile Telecommunications System (UMTS) Terrestrial Radio Access Network (E-UTRAN) New Radio-Dual Connectivity (EN-DC) radio. Radio 2806 is located within enclosure 2801. Antenna 2807 is located within enclosure 2801. Proximity sensing element 2808 is located within enclosure 2801.

Radio 2806 is connected via interconnect 2815 to antenna tuning circuit 2803. Antenna tuning circuit 2803 is connected via antenna feedline 2810 to antenna 2807. Proximity sensing element 2808 is connected via proximity sensing interconnect 2812 to antenna proximity sensing circuit 2804. Antenna proximity sensing circuit 2804 is connected via interconnect 2813 to enclosure controller (EC) 2805. EC 2805 is connected via interconnect 2814 to radio 2806. Antenna 2807 may be used as a proximity sensing element, for example, by providing an electrical connection, such as interconnect 2811, to provide an electrical path from antenna 2807 to antenna proximity sensing circuit 2804. Interconnect 2811 may physically connect to antenna 2807, to antenna feedline 2809, or to antenna tuning circuit 2803 to form the electrical path. The electrical path may be resistive, reactive, or have a complex impedance comprising a resistive component and a reactive component. The interconnection of interconnect 2811 may provide a diplexing function, providing a higher frequency electrical path for radio frequency (RF) signals between antenna 2807 and antenna tuning circuit 2803 and a lower frequency electrical path for proximity sensing signals between antenna 2807 and antenna proximity sensing circuit 2804. A direct-current (DC) blocking feature may be provided, for example, using a series capacitance. A DC blocking feature may be used to prevent a DC offset voltage from influencing proximity sensing.

Radio communication can be provided using radio 2806, antenna tuning circuit 2803, and antenna 2807. A transmit RF signal from radio 2806 can be passed to antenna 2807 via interconnect 2815, antenna tuning circuit 2803, antenna feedline 2810. A receive RF signal from antenna 2807 can be passed to radio 2806 via antenna feedline 2810, antenna tuning circuit 2803, and interconnect 2815. Antenna proximity sensing circuit 2804 can receive a proximity sensing signal, for example, via proximity sensing element 2808 and proximity sensing interconnect 2812, via interconnect 2811, or via both interconnect 2811 and the combination of proximity sensing element 2808 and proximity sensing interconnect 2812.

Antenna proximity sensing circuit 2804 can obtain proximity sensing information indicative of proximity of a part of a human body to an antenna. Antenna proximity sensing circuit 2804, using, for example, a proximity-sensing integrated circuit (IC) located either on the circuit board where antenna proximity sensing circuit 2804 is located or at a separate location, may trigger a notification of EC 2805 via interconnect 2813 in response to the obtaining the proximity sensing information. EC 2805 can provide a proximity indication via interconnect 2814 to radio 2806 in response to the receiving of the notification at EC 2805. One of EC 2805 or radio 2806 can provide to antenna tuning circuit 2803 a tuning parameter value to adapt antenna tuning for the proximity of the part of the human body to the antenna. Accordingly, an antenna front-end module comprising antenna tuning circuit 2803 and antenna proximity sensing circuit 2804 can provide both proximity sensing functionality and antenna tuning functionality, and the antenna tuning functionality can be responsive to the proximity sensing functionality.

Figure 29:
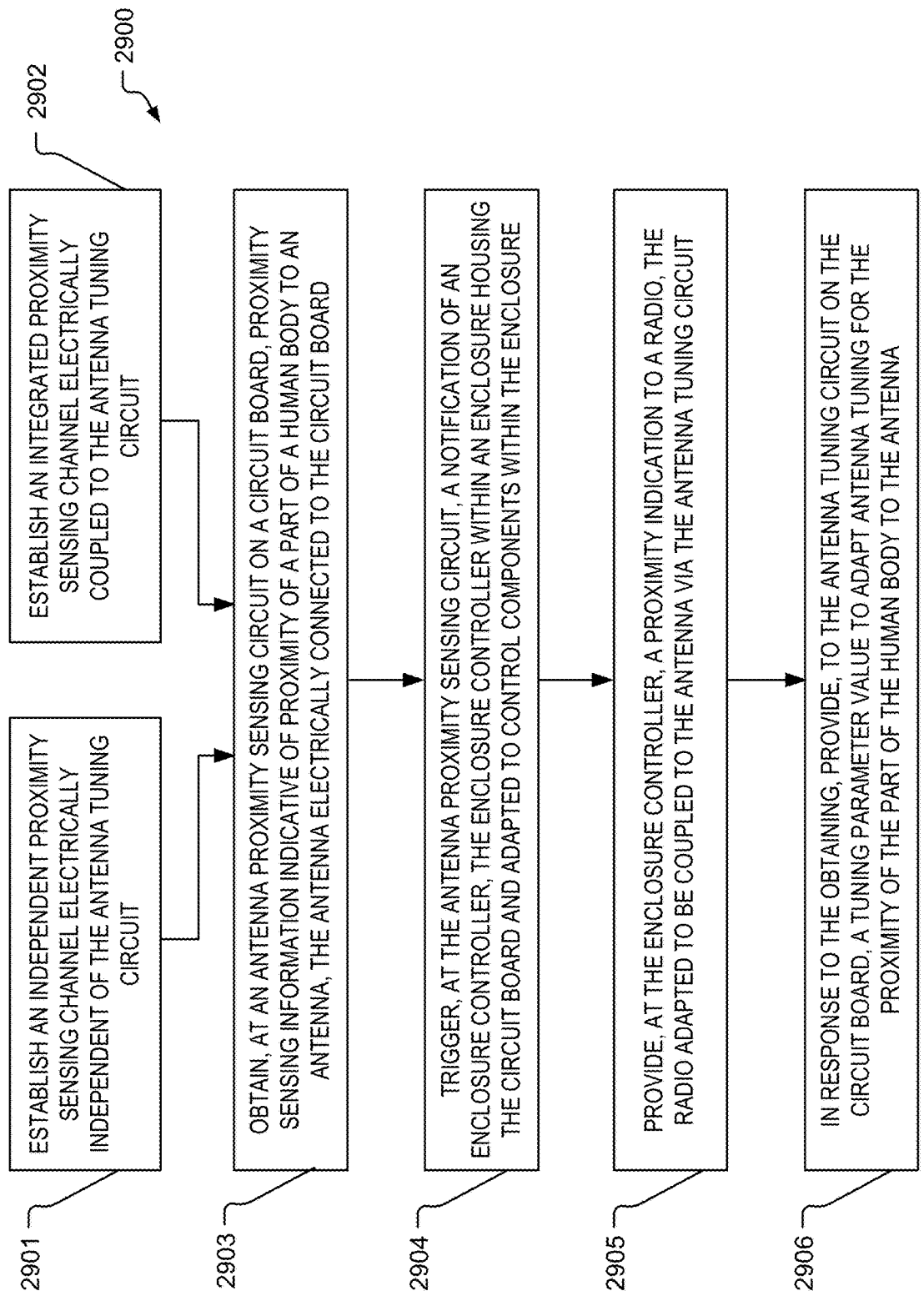
FIG. 29 is a flow diagram of a method to responsively perform antenna tuning based on proximity sensing according to an embodiment of the present disclosure.

FIG. 29 shows a method to responsively perform antenna tuning based on proximity sensing according to an embodiment of the present disclosure. As an example for an independent proximity sensing channel, a method can begin at block 2901, where an independent proximity sensing channel is established. The independent proximity sensing channel is independent of the antenna tuning circuit. As an example for an integrated proximity sensing channel, a method can begin at block 2902, where an integrated proximity sensing channel is electrically coupled to the antenna tuning circuit. In either case, the method continues from block 2901 or block 2902, respectively, to block 2903. At block 2093, proximity sensing information indicative of proximity of a part of the human body to an antenna is obtained at an antenna proximity sensing circuit on a circuit board. The antenna is electrically connected to the circuit board. If no proximity sensing information indicative of proximity of a part of the human body to an antenna has yet been obtained, method 2900 can remain at block 2093 until such proximity sensing information is received.

From block 2093, upon receipt of such proximity sensing information, method 2900 continues to block 2904. At block 2904, a notification of an enclosure controller is triggered at the antenna proximity sensing circuit. The enclosure controller is disposed within an enclosure. The enclosure houses the circuit board. The enclosure controller is adapted to control components within the enclosure. From block 2904, method 2900 continues to block 2905. At block 2905, a proximity indication is provided, at the enclosure controller, to a radio. The radio is adapted to be coupled to the antenna via the antenna tuning circuit. From block 2905, method 2900 continues to block 2906. At block 2906, a tuning parameter value to adapt antenna tuning of the antenna tuning circuit for the proximity of the part of the human body to the antenna is provided to the antenna tuning circuit on the circuit board. The tuning parameter value is provided in response to the obtaining the proximity sensing information of block 2903.

As one example, the tuning parameter value may be provided directly in response to the obtaining the proximity sensing information of block 2903. As another example, the tuning parameter value may be provided responsive to the providing the proximity indication of block 2905 in response to the obtaining the proximity sensing information of block 2903. As another example, the tuning parameter value may be provided responsive to the triggering the notification of block 2904 in response to the obtaining the proximity sensing information of block 2903. From block 2906, method 2900 can return to a previous block, such as block 2903, for continued operation. As an example, further antenna tuning according to an updated tuning parameter value can be provided responsive to a change in proximity sensing, such as closer proximity or proximity of a larger portion of the human body or farther proximity, lack of proximity, or proximity of a smaller portion of the human body. Thus, antenna tuning can be adaptively performed in response to any antenna proximity sensing condition in a repetitive and ongoing manner.

Figure 30:
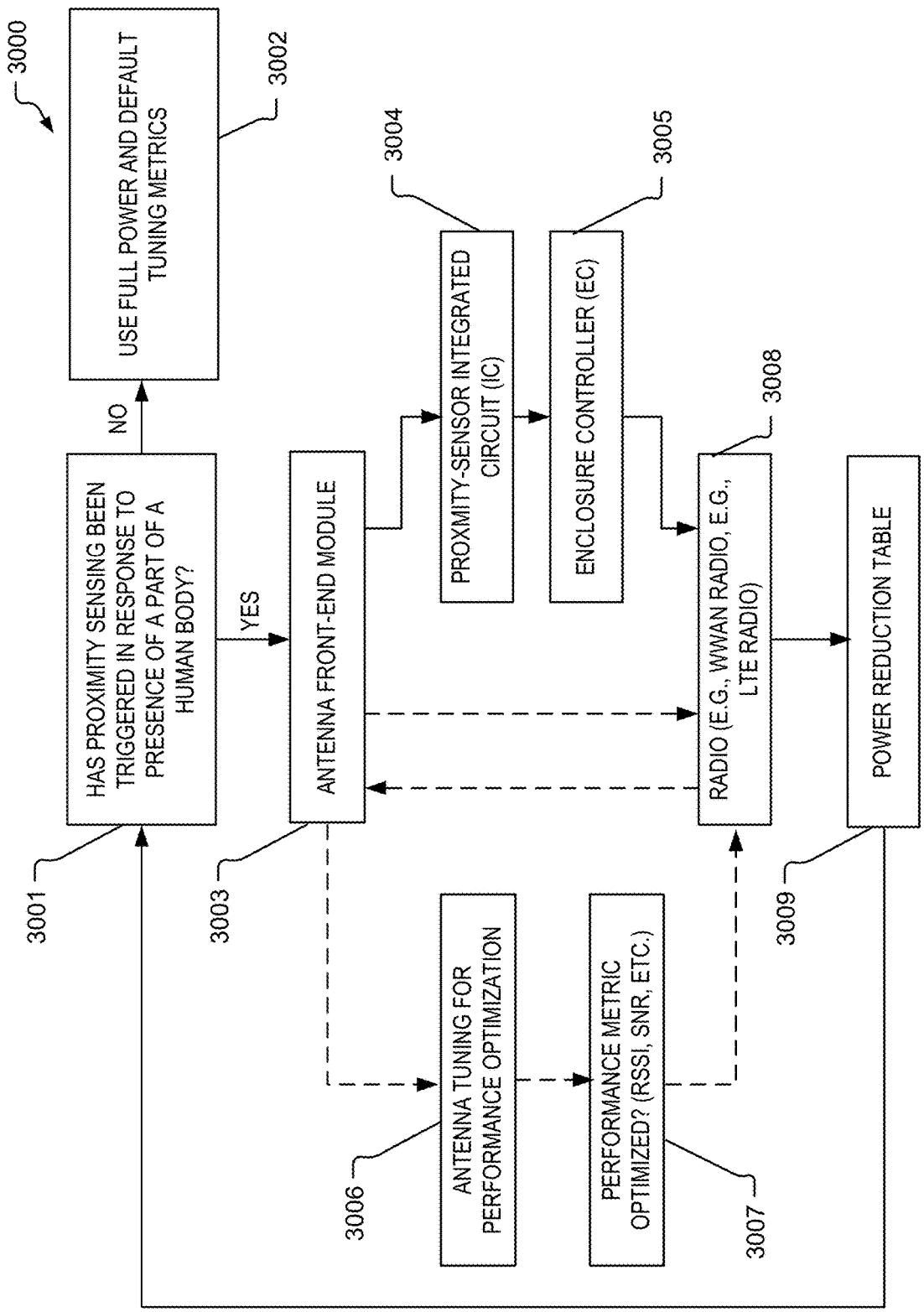
FIG. 30 is a flow diagram of a method for closed-loop control based on proximity sensing according to an embodiment of the present disclosure.

FIG. 30 shows a method for closed-loop control based on proximity sensing according to an embodiment of the present disclosure. Method 3000 begins at block 3001, where a decision is made whether or not proximity sensing has been triggered in response to presence of a part of the human body. If not, method 3000 continues to block 3002, where full power and default tuning metrics are used by a radio and an antenna tuning circuit. However, if the proximity sensing has been triggered, method 3000 continues to block 3003. At block 3003, a detailed explanation of component interactions leading to and following the affirmative decision of block 3001 begins. At block 3003, an antenna front-end module obtains proximity sensing information indicative of proximity of a part of a human body to an antenna.

As an example, an antenna proximity sensing circuit of the antenna front-end module may obtain the proximity sensing information. The antenna proximity sensing circuit is on a circuit board of the antenna front-end module. The antenna proximity sensing circuit of the antenna front-end module may provide an antenna proximity sensing information to a proximity-sensing integrated circuit (IC). As an example, the proximity-sensing IC may be located outside of the antenna front-end module but within an enclosure of an information handling system enclosing the components. As an example, the proximity-sensing IC may be located within the antenna front-end module. At block 3004, the proximity-sensor IC receives the antenna proximity sensing information from the antenna proximity sensing circuit and triggers a notification to an enclosure controller (EC). At block 3005, the EC receives the notification and provides a proximity indication to a radio.

At block 3008, the radio receives the proximity indication. As an example, the radio may be a WWAN radio. As an example, the radio may be a LTE radio. At block 3009, the radio accesses a power reduction table to obtain power reduction information to provide to an antenna tuning circuit on the circuit board of the antenna front-end tuning module with a tuning parameter value to adapt antenna tuning for the proximity of the part of the human body to the antenna. From block 3009, method 3000 returns to block 3001 to remain responsive to changes in the presence of a part of a human body in proximity to the antenna. As shown in FIG. 30, the antenna front-end module is connected to the radio. The radio sends signals to the antenna front-end module, and the antenna front-end module sends signals to the radio.

As an example, the radio sends a transmit RF signal to the antenna front-end module for transmission via the antenna. As an example, the antenna front-end module sends a receive RF signal from the antenna to the radio. As shown in FIG. 30, the antenna front-end module can perform antenna tuning for performance optimization at block 3006. At block 3007, a decision can be made whether or not a performance metric has been optimized. As an example, a decision can be made whether or not a received signal strength indication (RSSI) has been optimized. As an example, a decision can be made whether or not a signal-to-noise radio (SNR) has been optimized. As an example, a decision can be made whether or not another RF performance parameter has been optimized. Such optimization can include as examples, peaking of a performance parameter value, improving a performance parameter value, and adjusting performance to satisfy a specified value. Information from the decision as to whether or not the performance parameter has been optimized can be provided to the radio, which can, for example, by accessing the power reduction table, can provide further adjustment of performance on a repetitive and ongoing manner.

In accordance with at least one embodiment, a dual-function module is provided with a built-in sensing function as well as an antenna tuning function. In accordance with at least one embodiment, an apparatus is provided for integrating a human sensing function into an antenna front-end module. In accordance with at least one embodiment, a sensing channel is added to an antenna front-end module, allowing a capability of using a dedicated chain for sensing human proximity. The sensing of human proximity can include the sensing of the presence of a part of a human body in relation to one or more antennas such that either the RF performance of the system is impaired or safeguards based on RF exposure levels are indicated.

A sensing channel can be configured as an individual sensing chain or can be combined with an RF path of an antenna front-end module. A sensing channel can have a built-in direct-current (DC) block to ensure the capacitance detected is transferred back to a proximity-sensor IC without the capacitance measurement being corrupted by a DC voltage component.

A human proximity sensing path can include the antenna radiator, the sensing chain traces on the antenna front end module, and the cabling between the antenna front-end module and the proximity-sensor IC co-optimized to detect the human presence. An antenna module can be used as a sensing element in conjunction with an antenna element integrated at the antenna.

In accordance with at least one embodiment, an antenna front-end module comprises a circuit board. The circuit board comprises an antenna tuning circuit and an antenna proximity sensing circuit. The antenna tuning circuit is adapted to tune a feed impedance of an antenna. The antenna is electrically connected to the circuit board. The antenna proximity sensing circuit is adapted to obtain proximity sensing information indicative of proximity of a part of a human body to the antenna. In accordance with at least one embodiment, the antenna proximity sensing circuit provides an independent proximity sensing channel. The independent proximity sensing channel is electrically independent of the antenna tuning circuit. In accordance with at least one embodiment, the antenna proximity sensing circuit provides an integrated proximity sensing channel. The integrated proximity sensing channel is electrically coupled to the antenna tuning circuit. In accordance with at least one embodiment, the integrated proximity sensing channel utilizes an antenna volume of the antenna as a proximity sensing element. In accordance with at least one embodiment, the antenna proximity sensing circuit is adapted to trigger a notification of an enclosure controller. The enclosure controller is located within an enclosure housing the circuit board. The enclosure controller is adapted to control components within the enclosure. In accordance with at least one embodiment, the enclosure controller is adapted to provide a proximity indication to a radio. The radio is adapted to be coupled to the antenna via the antenna tuning circuit. In accordance with at least one embodiment, the radio is adapted to provide a tuning parameter value to the antenna tuning circuit to adapt antenna tuning for the proximity of the part of the human body to the antenna. In accordance with at least one embodiment, the tuning parameter value is provided to the antenna tuning circuit via a mobile industry processor interface (MIPI).

In accordance with at least one embodiment, a method comprises obtaining, at an antenna proximity sensing circuit on a circuit board, proximity sensing information indicative of proximity of a part of a human body to an antenna, the antenna electrically connected to the circuit board. The method further comprises, in response to the obtaining, providing, to an antenna tuning circuit on the circuit board, a tuning parameter value to adapt antenna tuning for the proximity of the part of the human body to the antenna. In accordance with at least one embodiment, the method further comprises establishing an independent proximity sensing channel, the independent proximity sensing channel electrically independent of the antenna tuning circuit. In accordance with at least one embodiment, the method further comprises establishing an integrated proximity sensing channel, the integrated proximity sensing channel electrically coupled to the antenna tuning circuit. In accordance with at least one embodiment, the integrated proximity sensing channel utilizes an antenna volume of the antenna as a proximity sensing element. In accordance with at least one embodiment, the method further comprises triggering, at the antenna proximity sensing circuit, a notification of an enclosure controller, the enclosure controller within an enclosure housing the circuit board and adapted to control components within the enclosure. In accordance with at least one embodiment, the method further comprises providing, at the enclosure controller, a proximity indication to a radio, the radio adapted to be coupled to the antenna via the antenna tuning circuit. In accordance with at least one embodiment, the method further comprises providing, at the radio, in response to the notification, a tuning parameter value to the antenna tuning circuit to adapt antenna tuning for the proximity of the part of the human body to the antenna. In accordance with at least one embodiment, the method further comprises providing, at the enclosure controller, in response to the notification, a tuning parameter value to the antenna tuning circuit to adapt antenna tuning for the proximity of the part of the human body to the antenna.

In accordance with at least one embodiment, an information handling system (IHS) comprises an enclosure enclosing the information handling system and an antenna front-end module within the enclosure. The antenna-front-end module comprises a circuit board. The circuit board comprises an antenna tuning circuit adapted to tune a feed impedance of an antenna and an antenna proximity sensing circuit adapted to obtain proximity sensing information indicative of proximity of a part of a human body to the antenna. In accordance with at least one embodiment, the antenna proximity sensing circuit provides an independent proximity sensing channel. The independent proximity sensing channel is electrically independent of the antenna tuning circuit. In accordance with at least one embodiment, the antenna proximity sensing circuit provides an integrated proximity sensing channel. The integrated proximity sensing channel is electrically coupled to the antenna tuning circuit. The integrated proximity sensing channel utilizes an antenna volume of the antenna as a proximity sensing element. In accordance with at least one embodiment, the information handling system further comprises an enclosure controller within the enclosure, the enclosure controller adapted to control components within the enclosure, wherein the antenna proximity sensing circuit is adapted to trigger a notification of the enclosure controller. In accordance with at least one embodiment, the information handling system further comprises a radio. The enclosure controller is adapted to provide a proximity indication to the radio. The radio is adapted to be coupled to the antenna via the antenna tuning circuit. In accordance with at least one embodiment, the radio is adapted to provide a tuning parameter value to the antenna tuning circuit to adapt the antenna tuning for the proximity of the part of the human body to the antenna.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An antenna front-end module comprising:
a circuit board including:
an antenna tuning circuit adapted to tune for proximity of a part of a human body to an antenna; and
an antenna proximity sensing circuit adapted to obtain proximity sensing information indicative of the proximity of the part of the human body to the antenna and provide to the antenna tuning circuit a tuning parameter value; and
an antenna including an interconnect adapted to provide a higher frequency electrical path between the antenna and the antenna tuning circuit and a lower frequency electrical path from the antenna to the antenna proximity sensing circuit.

2. The antenna front-end module of claim 1, wherein the antenna proximity sensing circuit establishes an independent proximity sensing channel, the independent proximity sensing channel electrically independent of the antenna tuning circuit.

3. The antenna front-end module of claim 1, wherein the antenna proximity sensing circuit establishes an integrated proximity sensing channel, the integrated proximity sensing channel electrically coupled to the antenna tuning circuit.

4. The antenna front-end module of claim 3, wherein the integrated proximity sensing channel utilizes the antenna as a proximity sensing element.

5. The antenna front-end module of claim 1, wherein the antenna proximity sensing circuit is adapted to trigger a notification of an enclosure controller, the enclosure controller within an enclosure housing the circuit board and adapted to control components within the enclosure.

6. The antenna front-end module of claim 5, wherein the enclosure controller is adapted to:
provide in response to the notification, a proximity indication to a radio, the radio adapted to be coupled to the antenna via the antenna tuning circuit; and
provide in response to the notification, the tuning parameter value to the antenna tuning circuit to adapt antenna tuning for the proximity of the part of the human body to the antenna.

7. The antenna front-end module of claim 1, wherein the antenna electrically connected to the circuit board.

8. An information handling system (IHS) comprising:
an enclosure; and
an antenna front-end module within the enclosure, the antenna front-end module including a circuit board having:
an antenna tuning circuit adapted to tune for proximity of a part of a human body to an antenna; and
an antenna proximity sensing circuit adapted to obtain proximity sensing information indicative of the proximity of the part of the human body to the antenna and provide to the antenna tuning circuit a tuning parameter value; and
an antenna including an interconnect adapted to provide a higher frequency electrical path between the antenna and the antenna tuning circuit and a lower frequency electrical path from the antenna to the antenna proximity sensing circuit.

9. The information handling system of claim 8, wherein the antenna proximity sensing circuit establishes an independent proximity sensing channel, the independent proximity sensing channel electrically independent of the antenna tuning circuit.

10. The information handling system of claim 8, wherein the antenna proximity sensing circuit establishes an integrated proximity sensing channel, the integrated proximity sensing channel electrically coupled to the antenna tuning circuit.

11. The information handling system of claim 10, wherein the integrated proximity sensing channel utilizes the antenna as a proximity sensing element.

12. The information handling system of claim 8, wherein the antenna proximity sensing circuit is adapted to trigger a notification of an enclosure controller, the enclosure controller within the enclosure housing the circuit board and adapted to control components within the enclosure.

13. The information handling system of claim 12, wherein the enclosure controller is adapted to:
provide in response to the notification, a proximity indication to a radio, the radio adapted to be coupled to the antenna via the antenna tuning circuit; and
provide in response to the notification, the tuning parameter value to the antenna tuning circuit to adapt antenna tuning for the proximity of the part of the human body to the antenna.

14. The information handling system of claim 8, wherein the antenna electrically connected to the circuit board.

15. A method comprising:
obtaining, at an antenna proximity sensing circuit on a circuit board, proximity sensing information indicative of proximity of a part of a human body to an antenna, the antenna electrically connected to the circuit board via an interconnect adapted to provide a higher frequency electrical path between the antenna and an antenna tuning circuit and a lower frequency electrical path from the antenna to the antenna proximity sensing circuit; and
in response to the obtaining, providing, to the antenna tuning circuit on the circuit board, a tuning parameter value to adapt antenna tuning for the proximity of the part of the human body to the antenna.

16. The method of claim 15, further comprising establishing an independent proximity sensing channel, the independent proximity sensing channel electrically independent of the antenna tuning circuit.

17. The method of claim 15, further comprising establishing an integrated proximity sensing channel, the integrated proximity sensing channel electrically coupled to the antenna tuning circuit.

18. The method of claim 17, wherein the integrated proximity sensing channel utilizes the antenna as a proximity sensing element.

19. The method of claim 15, further comprising triggering, at the antenna proximity sensing circuit, a notification of an enclosure controller, the enclosure controller within an enclosure housing the circuit board and adapted to control components within the enclosure.

20. The method of claim 19, further comprising:
providing, at the enclosure controller, in response to the notification, a proximity indication to a radio, the radio adapted to be coupled to the antenna via the antenna tuning circuit; and
providing in response to the notification, the tuning parameter value to the antenna tuning circuit to adapt antenna tuning for the proximity of the part of the human body to the antenna.

\* \* \* \* \*